(12) United States Patent
Shorty et al.

(10) Patent No.: US 8,194,569 B2
(45) Date of Patent: Jun. 5, 2012

(54) STATIC UPDATE CONTROLLER ENABLEMENT IN A MESH NETWORK

(75) Inventors: Peter Shorty, Frederiksberg C (DK); Jorgen Franck, Bagsvaerd (DK); Niels Thybo Johansen, Sorgenfri (DK)

(73) Assignee: Sigma Designs, Inc., Milpitas, CA (US)

( * ) Notice: Subject to any disclaimer, the term of this patent is extended or adjusted under 35 U.S.C. 154(b) by 468 days.

(21) Appl. No.: 11/552,418

(22) Filed: Oct. 24, 2006

(65) Prior Publication Data

US 2007/0177613 A1 Aug. 2, 2007

Related U.S. Application Data

(63) Continuation-in-part of application No. 11/425,917, filed on Jun. 22, 2006, and a continuation-in-part of application No. 11/456,029, filed on Jul. 6, 2006.

(60) Provisional application No. 60/763,835, filed on Jan. 31, 2006, provisional application No. 60/764,394, filed on Feb. 1, 2006, provisional application No. 60/765,810, filed on Feb. 7, 2006, provisional application No. 60/772,089, filed on Feb. 10, 2006.

(51) Int. Cl.
*H04L 12/28* (2006.01)

(52) U.S. Cl. .................. 370/254; 370/401; 370/406

(58) Field of Classification Search .................. None
See application file for complete search history.

(56) References Cited

U.S. PATENT DOCUMENTS

| | | | |
|---|---|---|---|
| 5,371,782 A | 12/1994 | Casey, III et al. | |
| 5,388,149 A | 2/1995 | Lynn et al. | |
| 5,935,213 A | 8/1999 | Rananand et al. | |
| 5,946,462 A | 8/1999 | Rangan et al. | |

(Continued)

FOREIGN PATENT DOCUMENTS

JP 2002185559 A 6/2002

(Continued)

OTHER PUBLICATIONS

"Application U.S. Appl. No. 11/456,029, Non-Final Office Action mailed Nov. 12, 2008.", 9 pgs.

(Continued)

*Primary Examiner* — Chirag Shah
*Assistant Examiner* — Jenkey Van
(74) *Attorney, Agent, or Firm* — Strategic Patents, P.C.

(57) ABSTRACT

In embodiments of the present invention improved capabilities are described for using a primary controller in a mesh network to instruct a static update controller to enable node information server functionality to form a static update controller information server. Capabilities are described for using the static update controller information server to enable other controllers in the mesh network to command other nodes in the mesh network on behalf of the static update controller information server, to distribute an installation process to a plurality of controllers in a mesh network, and the like. The present invention further describes improved capabilities for associating a static update controller with an inclusion controller within a mesh network, associating the inclusion controller with a node slave within the mesh network, transmitting a first data between the static update controller and the inclusion controller, wherein the first data relates at least in part to the node slave, and transmitting a second data between the inclusion controller and the node slave, wherein the second data relates at least in part to the first data transmitted.

20 Claims, 39 Drawing Sheets

U.S. PATENT DOCUMENTS

| | | |
|---|---|---|
| 6,285,665 B1 | 9/2001 | Chuah |
| 6,462,507 B2 | 10/2002 | Fisher, Jr. |
| 6,477,171 B1 | 11/2002 | Wakeley et al. |
| 6,480,497 B1 | 11/2002 | Flammer, III et al. |
| 6,532,222 B1 | 3/2003 | Rege et al. |
| 6,549,513 B1 | 4/2003 | Chao et al. |
| 6,631,134 B1 | 10/2003 | Zadikian et al. |
| 6,901,439 B1* | 5/2005 | Bonasia et al. ............... 709/220 |
| 6,912,221 B1 | 6/2005 | Zadikian et al. |
| 6,915,130 B1 | 7/2005 | Chapman et al. |
| 6,950,391 B1 | 9/2005 | Zadikian et al. |
| 6,990,111 B2 | 1/2006 | Lemoff et al. |
| 7,053,770 B2 | 5/2006 | Ratiu et al. |
| 7,069,483 B2 | 6/2006 | Gillies et al. |
| 7,075,919 B1 | 7/2006 | Wendt et al. |
| 7,088,676 B1 | 8/2006 | Doverspike et al. |
| 7,248,217 B2 | 7/2007 | Mani et al. |
| 7,382,731 B1 | 6/2008 | Zhao et al. |
| 7,428,212 B2 | 9/2008 | Saleh et al. |
| 7,433,702 B2 | 10/2008 | Lindskog et al. |
| 7,437,079 B1 | 10/2008 | Hofmeister et al. |
| 7,487,221 B2 | 2/2009 | Araki |
| 7,522,540 B1 | 4/2009 | Maufer |
| 7,554,998 B2 | 6/2009 | Simonsson et al. |
| 7,680,041 B2 | 3/2010 | Johansen |
| 2002/0010641 A1 | 1/2002 | Stevens et al. |
| 2002/0124097 A1 | 9/2002 | Isely et al. |
| 2003/0103088 A1* | 6/2003 | Dresti et al. ............... 345/835 |
| 2003/0135797 A1 | 7/2003 | Choi |
| 2004/0208180 A1 | 10/2004 | Light et al. |
| 2005/0002533 A1 | 1/2005 | Langin-Hooper et al. |
| 2005/0037787 A1 | 2/2005 | Bachner et al. |
| 2005/0136972 A1 | 6/2005 | Smith et al. |
| 2005/0204385 A1 | 9/2005 | Sull et al. |
| 2005/0243765 A1 | 11/2005 | Schrader et al. |
| 2005/0249139 A1 | 11/2005 | Nesbit |
| 2006/0007001 A1 | 1/2006 | Rastegar et al. |
| 2006/0056368 A1 | 3/2006 | Ratiu et al. |
| 2006/0056456 A1 | 3/2006 | Ratiu et al. |
| 2006/0066455 A1 | 3/2006 | Hancock et al. |
| 2006/0104291 A1* | 5/2006 | Rodriguez et al. ............ 370/401 |
| 2006/0109787 A1 | 5/2006 | Strutt et al. |
| 2006/0126617 A1 | 6/2006 | Cregg et al. |
| 2006/0145842 A1 | 7/2006 | Stilp |
| 2006/0146875 A1 | 7/2006 | Yang |
| 2006/0215556 A1 | 9/2006 | Wu et al. |
| 2006/0215627 A1 | 9/2006 | Waxman |
| 2006/0253735 A1 | 11/2006 | Kwak et al. |
| 2006/0268685 A1 | 11/2006 | Bender et al. |
| 2006/0271244 A1 | 11/2006 | Cumming et al. |
| 2006/0271703 A1 | 11/2006 | Kim et al. |
| 2007/0022185 A1* | 1/2007 | Hamilton et al. ............. 709/220 |
| 2007/0112939 A1* | 5/2007 | Wilson et al. ................ 709/219 |
| 2007/0162536 A1* | 7/2007 | Ostrovsky et al. ............ 709/200 |
| 2007/0177538 A1 | 8/2007 | Christensen et al. |
| 2007/0177576 A1 | 8/2007 | Johansen et al. |
| 2007/0183457 A1 | 8/2007 | Leitch |
| 2007/0195808 A1 | 8/2007 | Ehrlich et al. |
| 2007/0201504 A1 | 8/2007 | Christensen et al. |
| 2007/0204009 A1 | 8/2007 | Shorty et al. |
| 2007/0222585 A1 | 9/2007 | Sabol et al. |
| 2007/0248047 A1 | 10/2007 | Shorty et al. |
| 2007/0258508 A1 | 11/2007 | Werb et al. |
| 2007/0263647 A1 | 11/2007 | Shorty et al. |
| 2007/0286205 A1 | 12/2007 | Johansen |
| 2008/0151795 A1 | 6/2008 | Shorty et al. |
| 2008/0151824 A1 | 6/2008 | Shorty et al. |
| 2008/0151825 A1 | 6/2008 | Shorty et al. |
| 2008/0151826 A1 | 6/2008 | Shorty et al. |
| 2008/0151827 A1 | 6/2008 | Shorty et al. |
| 2008/0154396 A1 | 6/2008 | Shorty et al. |
| 2008/0159213 A1 | 7/2008 | Shorty et al. |
| 2008/0165712 A1 | 7/2008 | Shorty et al. |
| 2008/0170511 A1 | 7/2008 | Shorty et al. |
| 2008/0316048 A1 | 12/2008 | Abdallah |
| 2009/0077405 A1 | 3/2009 | Johansen |
| 2009/0082888 A1 | 3/2009 | Johansen |
| 2010/0149967 A1 | 6/2010 | Johansen |

FOREIGN PATENT DOCUMENTS

| | | |
|---|---|---|
| JP | 200650549 | 2/2006 |
| WO | WO0159607 A2 | 8/2001 |
| WO | WO-2008006066 A3 | 1/2008 |

OTHER PUBLICATIONS

"Application U.S. Appl. No. 11/425,917, Non-Final Office Action mailed Nov. 25, 2008", 9 pgs.

"Application U.S. Appl. No. 11/681,401, Non-Final Office Action mailed Feb. 12, 2009", 13 pgs.

ISR, "International Search Report and Preliminary Report on Patentability", (Jan. 15, 2009),all.

"Application U.S. Appl. No. 11/684,430, Non-Final Office Action mailed Jun. 22, 2009", 7 pgs.

"Application U.S. Appl. No. 11/737,717, Non-Final Office Action mailed Jul. 8, 2009", 12 Pgs.

Leventis, A. et al., "Intelligent DevicesforAppliances Controlin Home Networks", *IEEE Transactions onconsumer Electronics*, vol. 49, No., (May 2, 2003),pp. 328-336.

"Application U.S. Appl. No. 11/875,916, Non-Final Office Action mailed Jul. 10, 2009", 7 pgs.

"Application U.S. Appl. No. 11/875,914, Non-Final Office Action mailed Jul. 9, 2009", 8 pgs.

"Application U.S. Appl. No. 11/684,442, Non-Final Office Action mailed Jul. 20, 2009", 13 pgs.

"Application U.S. Appl. No. 11/875,919, Non-Final Office Action mailed Jul. 24, 2009", 7 Pgs.

"Application U.S. Appl. No. 11/875,917, Non Final Office Action mailed Jul. 23, 2009", 17.

"Application U.S. Appl. No. 11/456,029, Final Office Action mailed Aug. 17, 2009", 15.

"Application U.S. Appl. No. 11/875,923, Non Final Office Action mailed Aug. 24, 2009", 12.

"Application U.S. Appl. No. 11/875,924, Non-Final Office Action mailed Aug. 28, 2009", 2 Pgs.

"Application U.S. Appl. No. 11/875,926, Non-Final Office Action mailed Sep. 11, 2009", 7 Pgs.

, "Application U.S. Appl. No. 11/425,917, Final Office Action mailed Sep. 16, 2009", 12 Pgs.

, "Application U.S. Appl. No. 11/425,917, Non-Final Office Action mailed Apr. 2, 2010", 15.

, "Application U.S. Appl. No. 11/456,029, Non-Final Office Action mailed May 11, 2010", 19.

, "Application U.S. Appl. No. 11/681,401, Final Office Action mailed Oct. 29, 2009", 17.

, "Application U.S. Appl. No. 11/681,401, Non-Final Office Action mailed Jun. 9, 2010", 12.

, "Application U.S. Appl. No. 11/684,430, Notice of Allowance mailed Dec. 11, 2009", 10.

, "Application U.S. Appl. No. 11/875,915, Non-Final Office Action mailed Oct. 8, 2009", 10.

, "Application U.S. Appl. No. 11/875,921, Non-Final Office Action mailed Oct. 8, 2009", 7 Pgs.

, "Application U.S. Appl. No. 11/875,927, Non-Final Office Action mailed Sep. 25, 2009", 7 pgs.

, "Application U.S. Appl. No. 11/684,442, Final Office Action mailed Mar. 16, 2010", 23.

, "Application U.S. Appl. No. 11/737,717, Final Office Action mailed Mar. 11, 2010", 18.

Leventis, A et al., ""Intelligent Devices for Appliances Control in Home Networks",", *IEEE Transactions on consumer Electronics* vol. 49, No. 2," May 2003, pp. 328-336.

, "Application U.S. Appl. No. 11/737,717, Non-Final Office Action mailed Nov. 10, 2010", 18.

, "Application U.S. Appl. no. 11/456,029 (Atty Ref Zsys-0005-P01 ), Final Office Action mailed 01-19-11"19.

, "Application U.S. Appl. no. 11/681,401 (Zsys-0007-P01 ), Final Office Action mailed 12-22-10"12.

"Application U.S. Appl. No. 11/681,417, Final Office Action mailed Mar. 4, 2011", 12.

, "Application U.S. Appl. No. 12/691,244, Non-Final Office Action mailed Sep. 1, 2010", 14.

, "Application U.S. Appl. No. 11/425,917, Non-Final Office Action mailed Oct. 13, 2010", 10 pgs.

, "Application U.S. Appl. No. 11/684,442, Non-Final Office Action mailed Oct. 4, 2010", 16 pgs.

"JP2009-518,642 English Translation", Aug. 9, 2011.

"Application Serial No. JP2009-518,642, FOA", Aug. 24, 2011, 1-47.

"Application U.S. Appl. No. 11/737,717, Final Office Action mailed Jun. 30, 2011", 25.

"Application U.S. Appl. No. 12/691,244, Notice of Allowance Mailed Aug. 26, 2011", 8.

"U.S. Appl. No. 11/681,401, Non-Final Office Action mailed Apr. 22, 2011", 13.

"U.S. Appl. No. 12/198,241, Non-Final Office Action mailed Apr. 5, 2011", 20.

"U.S. Appl. No. 12/198,250, Non-Final Office Action mailed Mar. 31, 2011", 18.

"U.S. Appl. No. 11/456,029, Final Office Action mailed Apr. 27, 2011", 19.

"U.S. Appl. No. 11/684,442, Final Office Action mailed May 23, 2011", 22.

"U.S. Appl. No. 12/691,244, Final Office Action mailed May 12, 2011", 8.

* cited by examiner

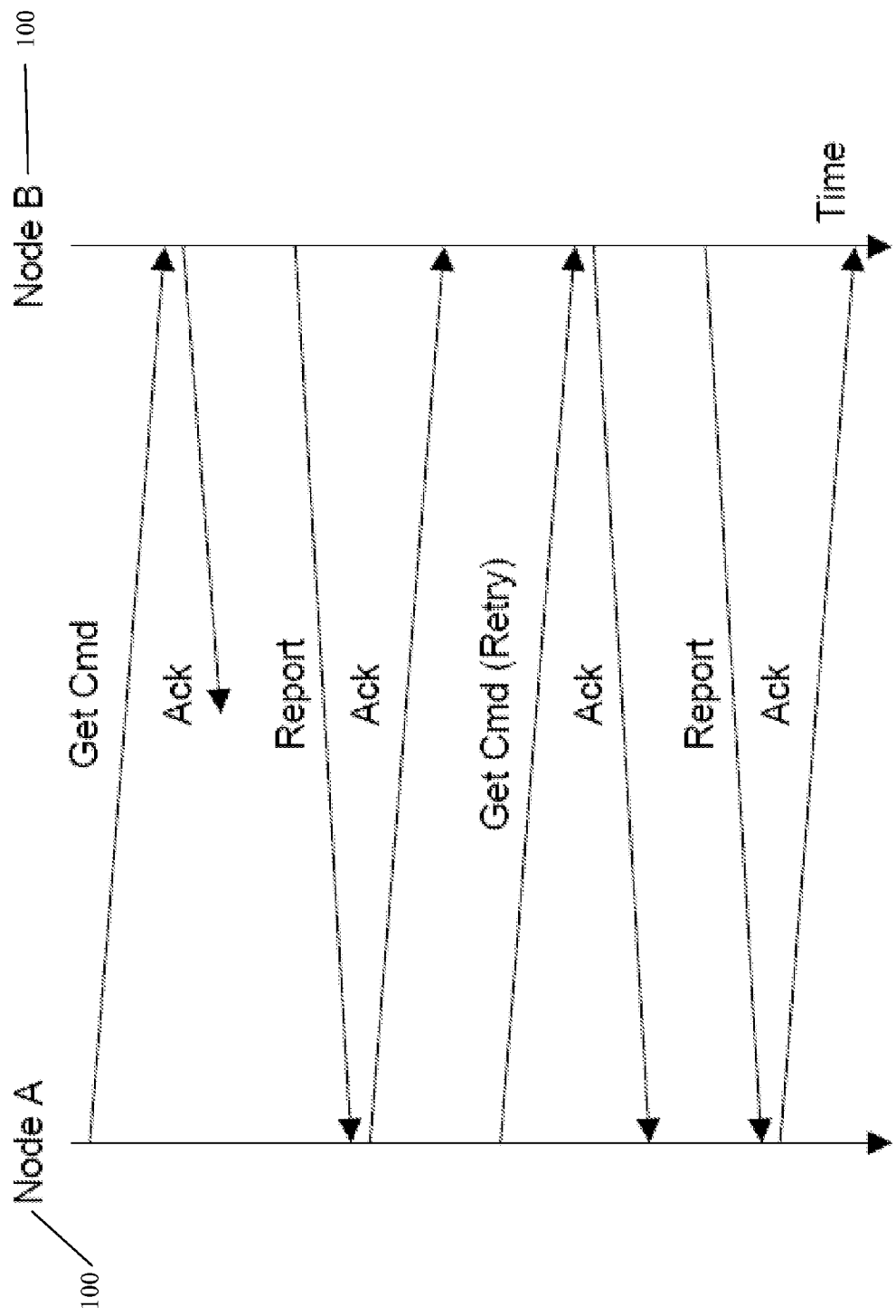

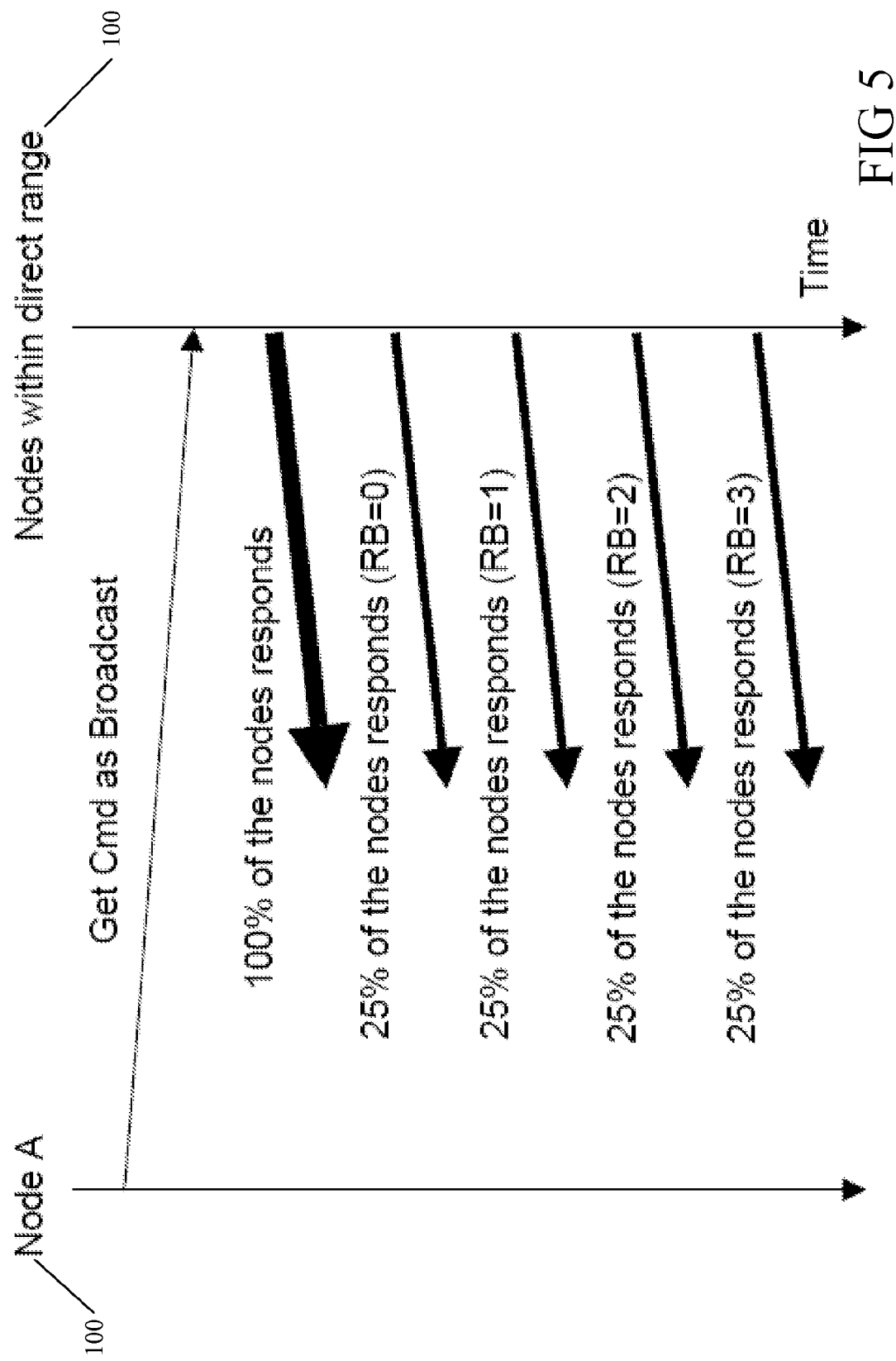

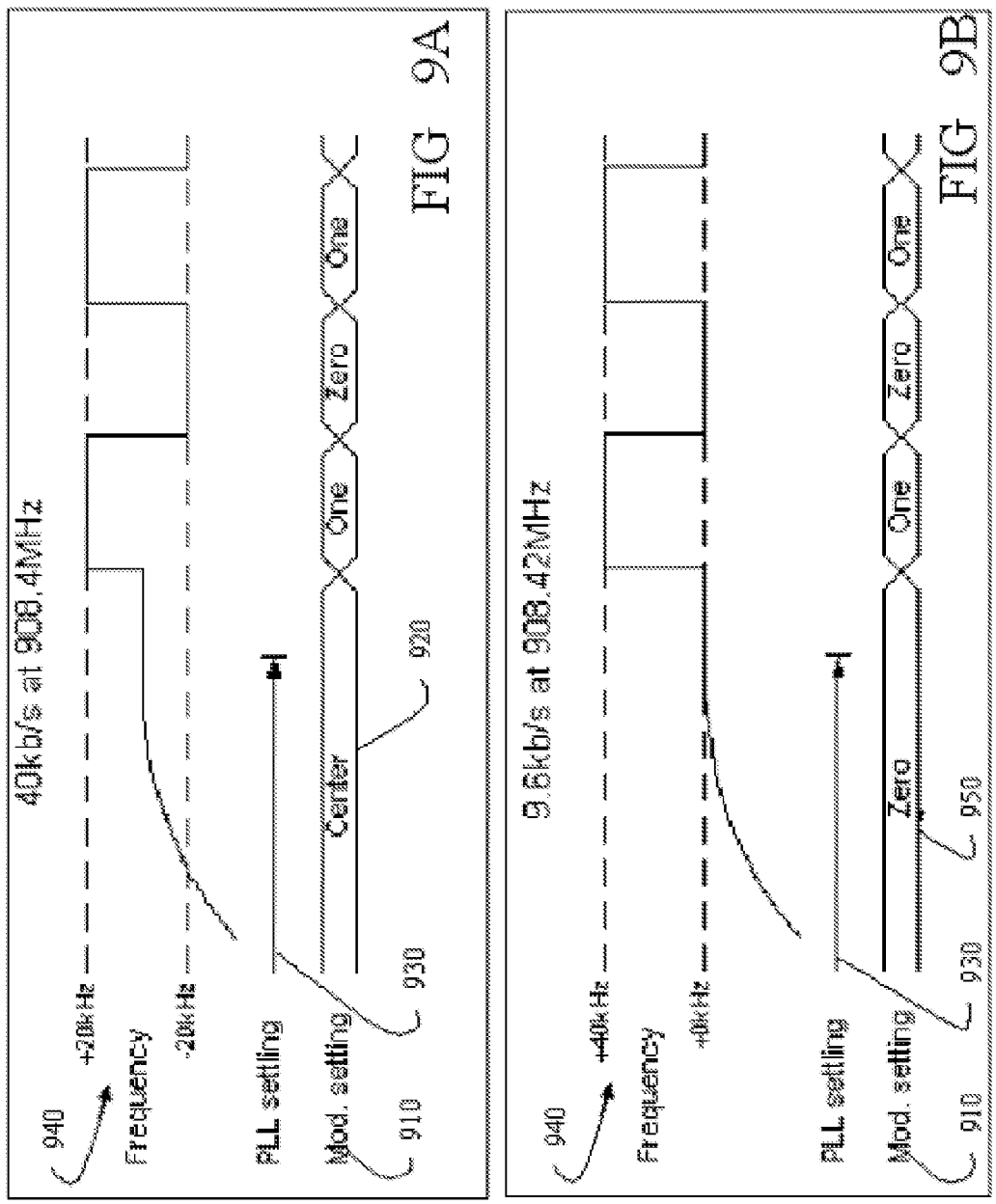

STATIC UPDATE CONTROLLER ENABLEMENT IN A MESH NETWORK

RELATED APPLICATIONS

This application claims the benefit of the following commonly-owned U.S. Provisional Patent Applications, each of which is incorporated herein by reference in its entirety: App. No. 60/763,835 filed on Jan. 31, 2006; App. No. 60/764,394 filed on Feb. 1, 2006; App. No. 60/765,810 filed on Feb. 7, 2006; and App. No. 60/772,089 filed on Feb. 10, 2006; and this application is a continuation-in-part of the following commonly-owned U.S. Utility Applications, each of which is incorporated herein by reference in its entirety: application Ser. No. 11/425,917 filed on Jun. 22, 2006; and application Ser. No. 11/456,029 filed on Jul. 6, 2006.

BACKGROUND

1. Field of the Invention

The invention herein disclosed generally refers to wireless networks, and specifically to using a primary controller in a mesh network to instruct a static update controller to enable node information server functionality to form a static update controller information server in order to enable a plurality of functions in a mesh network.

2. Description of the Related Art

Wireless communication networks have limitations when used for building automation. Structural barriers that deflect or cause the radio frequency signals of wireless networks can prevent timely transmission on the network. Introduction of noise sources from other radio frequency sources contribute to a reduction in quality and reliability. However, wiring building automation devices is very costly and intrusive, while severely limiting in flexibility and expandability.

Therefore there exists a need for a robust communication network for building automation that overcomes the problems associated with wireless networks without the high costs and inconvenience of wired networks.

SUMMARY

In embodiments, the present invention provides a method and system for using a primary controller in a mesh network to instruct a static update controller to enable node information server functionality to form a static update controller information server. The static update controller information server may be used to enable other controllers in the mesh network to command other nodes in the mesh network on behalf of the static update controller information server, to distribute an installation process to a plurality of controllers in a mesh network, and to perform other functions, commands, and the like.

In embodiments the method and system may be used for associating a static update controller with an inclusion controller within a mesh network, associating the inclusion controller with a node slave within the mesh network, transmitting a first data between the static update controller and the inclusion controller, wherein the first data relates at least in part to the node slave, and transmitting a second data between the inclusion controller and the node slave, wherein the second data relates at least in part to the first data transmitted.

In embodiments, the information server may be a server communicating identification information, installation information, and the like. The information server may be associated with network protocols, wherein the network protocols may be associated with security, communications, network topology, installation strategies, and the like.

The inclusion controller may be associated with network topology data, or other types of data. Network topology data may be dated from the last time a node was included in an update from the static update controller information server. In embodiments, the static update controller may include a static controller. A static controller may include an inclusion controller. The inclusion controller may be associated with network topology data, or other types of data. Network topology data may be dated from the last time a node was included in an update from the static update controller information server.

In embodiments, a command may relate to including a node in the mesh network, to excluding a node in a mesh network, to enabling a security functionality, to a communication speed, to a communication channel, to a communication channel availability, to a network security level, to a network topology, to a network routing strategy, to communicating data from the information server to a mesh network node for the purpose of assigning identifiers to new nodes, or some other functionality, purposes, or transmittal in a mesh network. A communication speed may be a network mandated speed, including but not limited to 9.6 kbps, 40 kbps, 100 kbps, or some other speed. A communication channel availability may be associated with a single channel, or a plurality of channels. A network security level may be high, medium, low, or some other security level. A command relating to a network topology may be associated with a change in the network topology. A change in network topology may be distributed to other nodes in the network by the static update controller.

In embodiments, a plurality of controllers may include a portable controller. The portable controller may include an inclusion controller. The inclusion controller may be associated with network topology data, or other types of data. Network topology data may be dated from the last time a node was included in an update from the static update controller information server. In embodiments, a plurality of controllers may include a static controller. A static controller may include an inclusion controller. The inclusion controller may be associated with network topology data, or other types of data. Network topology data may be dated from the last time a node was included in an update from the static update controller information server.

In embodiments, the installation assignment may be an installation strategy, may be distributed to all controllers in a mesh network, may be distributed to one controller in a mesh network, may be transferred from one node to another during the lifetime of the network, or some other installation assignment. An installation strategy may relate to a local installation, a central installation, or some other strategy.

In embodiments, the first data transmitted between the static update controller and the inclusion controller may be a request update, a topology update, a request for a node identifier, may relate to a reserved node identifier, may relate to adding a new node to a mesh network, may relate to a new range information, or some other data type. In embodiments, the second data transmitted between the inclusion controller and the node slave may be a node information, may relate to assigning a node identifier, may relate to a range information, or some other data type.

These and other systems, methods, objects, features, and advantages of the present invention will be apparent to those skilled in the art from the following detailed description of the preferred embodiment and the drawings.

BRIEF DESCRIPTION OF FIGURES

The invention will be more fully understood by reference to the detailed description, in conjunction with the following figures, wherein:

FIG. 4 shows an example of a type of re-transmission hand shaking;

FIG. 5 shows how simultaneous communication to even a small number of nodes impacts communication on a mesh network;

FIG. 9A and FIG. 9B are waveforms of asymmetric modulation;

DETAILED DESCRIPTION

The present invention relates to a reliable and low-cost control and monitoring technology which enables embedded intelligence and wireless communication for a variety of residential and light commercial applications such as lighting and appliance control, automated meter reading, thermostat and ventilation control, security, and residential gateway connectivity. In embodiments, a mesh network node may transform any stand-alone device into an intelligent networked device that may be controlled and monitored wirelessly. The mesh network delivers high reliability networking at a fraction of the cost of other technologies by focusing on narrow bandwidth applications and substituting costly hardware with innovative software solutions such as frame acknowledgement, retransmission, collision avoidance, frame checksum, and sophisticated routing algorithms to assure full home coverage.

One of the features of the mesh network technology is the routing capability of all the nodes in the network. The mesh network automatically routes the signal from one node to the next thereby extending the range. Rather than depending solely on line-of-sight communications like other technologies, the mesh network is able to get around obstacles by routing commands through other device-nodes in the network when required. The mesh network technology also minimizes noise and distortion problems caused by architectural obstacles and radio dead spots using innovative transmission techniques such as 2-way acknowledgement and alternative route seeking.

Figure 1:
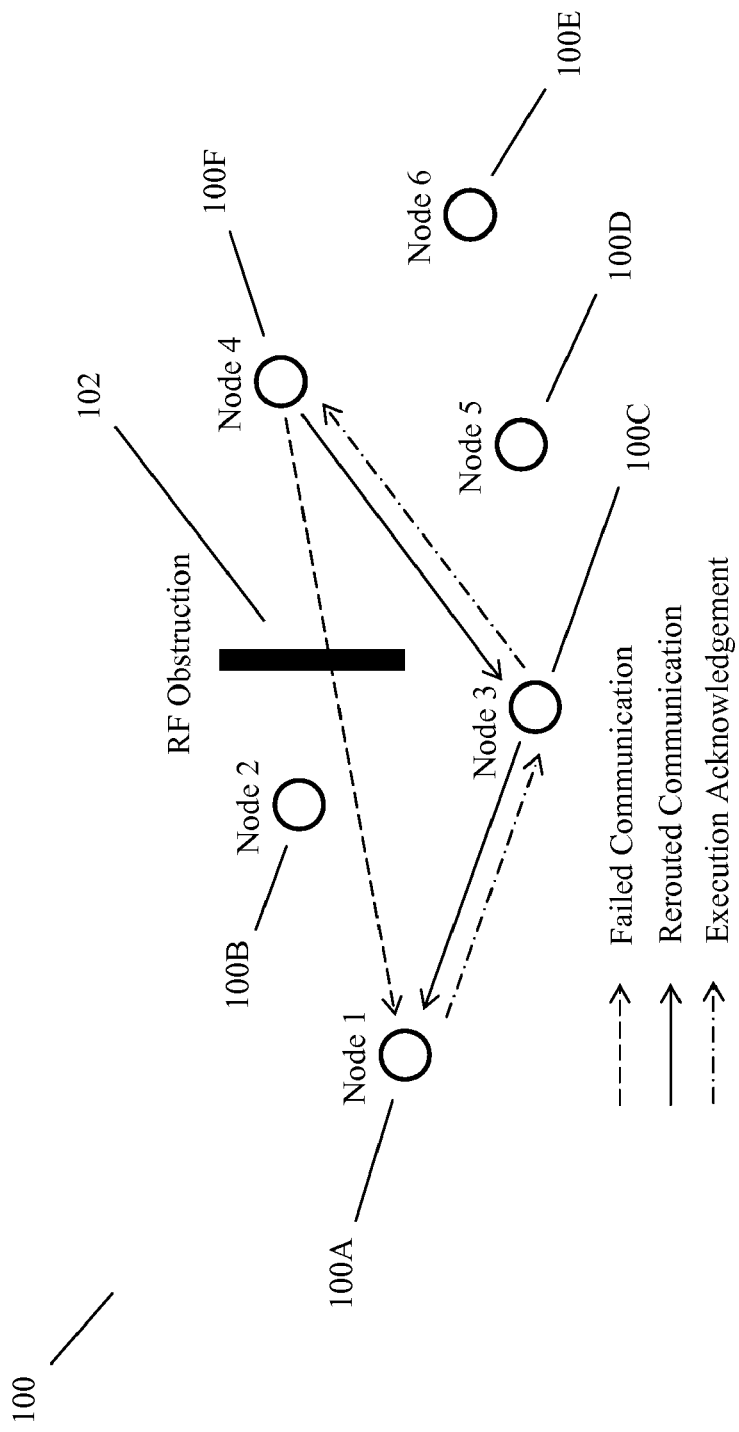
FIG. 1 illustrates a mesh network which includes a number of network nodes.

For example, FIG. 1 illustrates a mesh network 100 which includes a number of network nodes. The user may command a light associated with Node1 100A in a garage to turn off from Node4 100F in a master bedroom. If the direct transmission to Node1 100A is blocked by some Radio Frequency (RF) obstruction 102 (e.g. a stainless steel refrigerator in a kitchen) Node4 100F automatically selects an alternate route, such as through Node3 100C (e.g. a thermostat in a hallway), rerouting as many times as is necessary to complete delivery of a command. An acknowledgement is then sent back to Node4 100F confirming that the command has been executed by Node1 100A.

In embodiments, the present invention may include a method and system for silently acknowledging a successful transmission of a single case frame from a first node to a second node. For example, a single cast frame may be sent from a first node 3200 to a third node 3204 by using a second node 3202 as an intermediate relay of the single cast frame 3208 between the first 3200 and third nodes 3204. As the second node 3202 sends the single cast frame 3208 that it received from the first node 3200 onto the third node 3204, the first node 3202 may be able to detect the single cast frame 3208 sent from the second node 3202 to the third node 3204 using a routed acknowledgement frame 3210 sent from node two 3202, and interpret this routed acknowledgement frame 3210 as an acknowledgement of success in sending the single cast frame 3208 from the first node 3200 to the second node 3202. The first node 3200 may then send an acknowledgement 3212 to node two 3202 that it received the routed acknowledgement frame 3210 from node two 3202. This process may be repeated throughout a single cast frame transmission sequence, with subsequent nodes (e.g. the fourth or sixtieth node in a transmission sequence, etc.) wherein a sending node detects a transmission from a receiving node to a third node, and interprets this as acknowledgement that the receiving node successfully received a transmission from the sending node In embodiments, this silent acknowledgement routing schema may be implemented through an ASIC or any other consolidated processor platform described herein and or illustrated in the included figures.

In embodiments, a second single cast frame may be sent from the second node to a third node in a mesh network, and detection of the second single cast frame by the first node interpreted as an acknowledgement of success in sending the first single cast frame from the first node to the second node. A single cast frame may be a routed single cast frame. It may be routed based at least in part on a routing table. A single cast frame may be related to a metadata, a command, or some other form of data. A command may relate to including and or excluding a node in a mesh network, to enabling a security functionality, to a communication speed, to a communication channel, to a communication channel availability, to a network security level, to a network topology, to a network routing strategy, or some other command type.

In embodiments, a network mandated speed may be 9.6 kbps, 40 kbps, 100 kbps, or some other communication speed.

In embodiments, communication channel availability may be associated with a single channel or a plurality of channels.

In embodiments, a network security level may be high, medium, low, or some other network security level.

In embodiments, a single cast frame may be routed over a mesh network topology that is an automation system network for controlling a device. A device may be a plurality of devices. In embodiments, the mesh network topology may be implemented within a home. A home mesh network topology may be related to an audiovisual system, such as an audiovisual system including an entertainment device. An entertainment device may be a television, a signal conversion device, a DVR, a networked device, a UPnP networked device, a satellite receiver, a cable converter, a VCR, a digital video disc player, a video accessory, an audio amplifier, an audio tuner, an audio amplifier-tuner combination, a CD player, a DVD player, a high definition DVD player, an audio cassette player, a digital audio tape player, an audio equipment, an equalizer, a phonograph player, a video component, a streaming media player, an mp3 player, an audio file player, and audio component, an audio-visual component, or some other entertainment device.

In embodiments, the mesh network topology may be related to a security system. A security system may include an alarm, a lock, a sensor, a detector (such as a motion detector, and the like), or some other security system component.

In embodiments, the mesh network may be a wireless mesh network.

In embodiments, a node within the mesh network may be a multi-speed node.

The mesh network infrastructure is decentralized, with nodes running as both client and as repeater to avoid central points of failure and control. Every new component that is added to the network increases path redundancy and reliability, with the degree of redundancy and signal strength increasing as a function of node density. If the distance between nodes is decreased by a factor of two, the resulting signal is at least four times more powerful at the receiver.

A mesh network is also self-organizing and doesn't require manual configuration. Because of this, adding new equipment or relocating existing equipment may be as simple as plugging it in and turning it on. The network discovers the new node and may automatically incorporate it into the existing system. The mesh network technology may provide vastly improved area coverage and reliability with virtually unlimited range.

Figure 2:
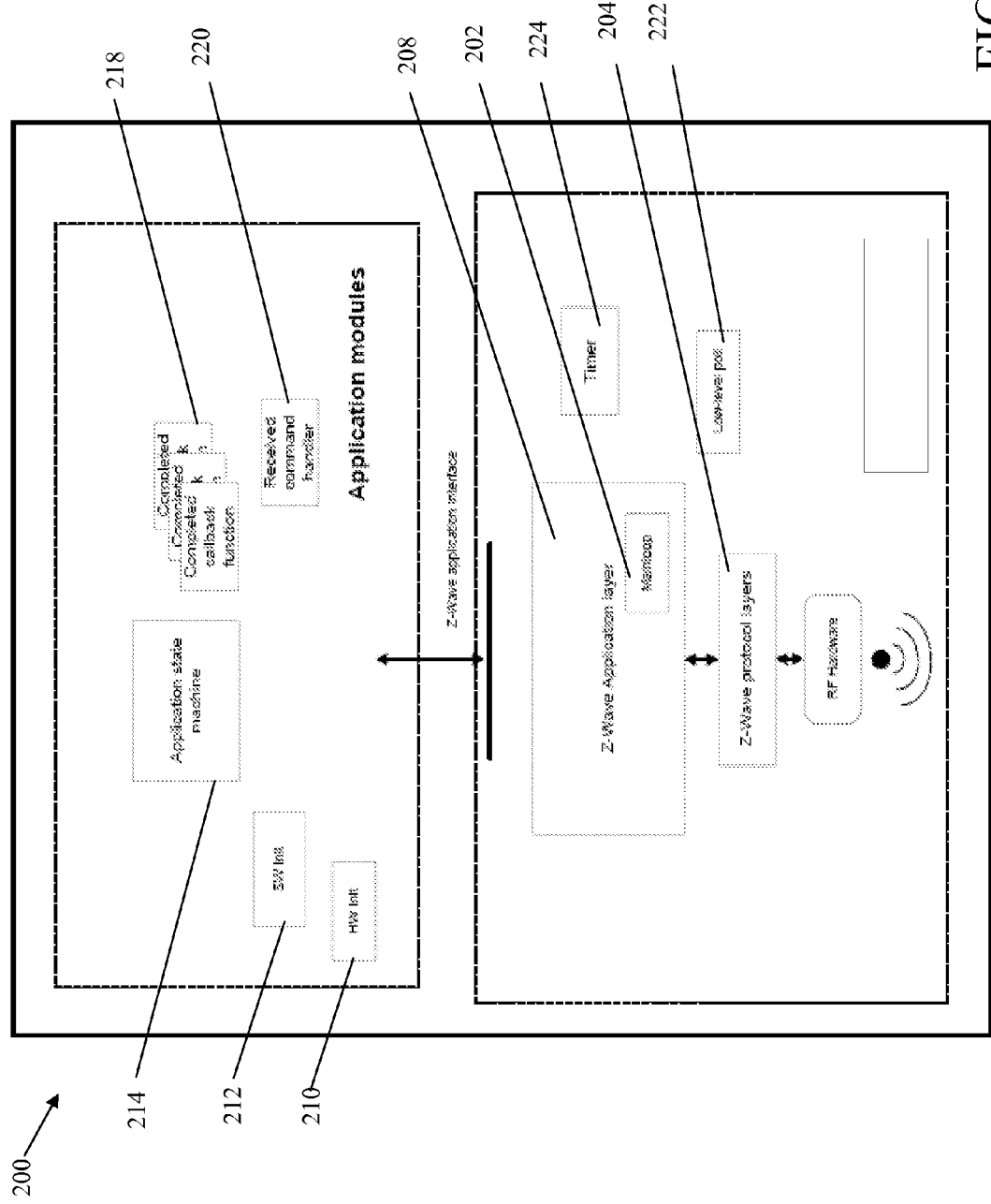
FIG. 2 illustrates a schematic of mesh network and node control software.

Referring to FIG. 2, mesh network software 200 may be designed on polling of functions, command complete callback function calls, and delayed function calls. Software 200 may be split into two groups of program modules: basis software and application software. Basis software may include system startup code, low-level poll function 222, main poll loop 202, protocol layers 204, and memory and timer 224 service functions. Application software may include application hardware initialization 210 and software initialization 212 functions, application state machine 214, command complete callback functions 218, and a received command handler 220 function. The application software may also include hardware drivers.

Main loop 202 may call a list of protocol functions. Functions may be designed to return to the caller as fast as possible to allow the Central Processing Unit (CPU) to do other tasks. It is possible to receive data, transfer data via the Universal Asynchronous Receive Transmit (UART) and check user-activated buttons simultaneously.

When the application layer 208 requests a transmission of data to another node in network 100, the protocol layer may add a frame header and a checksum to the data before transmission. The protocol layer may also handle frame retransmissions, as well as routing of frames through repeater nodes to nodes that are not within direct RF reach. When the frame transmission is completed an application specified transmit complete callback function 218 may be called. The transmission complete callback function 218 may include a parameter that indicates the transmission result.

Application layer 208 may provide the interface to the communications environment, which is used by the application process. The application software may consist of the following functions: the hardware initialization function 210, software initialization function 212, application state machine 214, command complete callback functions 218, and a receive command handler function 220. The application implements communication on the application level with other nodes in network 100. At the application level may be a framework defined of device and command classes to obtain interoperability between mesh network enabled products from different vendors. The basic structure of these commands may provide the capability to set parameters in a node and to request parameters from a node responding with a report containing the requested parameters.

Wireless communication is by nature unreliable because a well defined coverage area simply does not exist since propagation characteristics are dynamic and unpredictable. The mesh network protocol may minimize noise and distortion problems by using a transmission mechanism that may include two re-transmissions to ensure reliable communication. In addition, single casts are acknowledged by a receiving node so the application is notified about how the transmission went.

Figure 3:
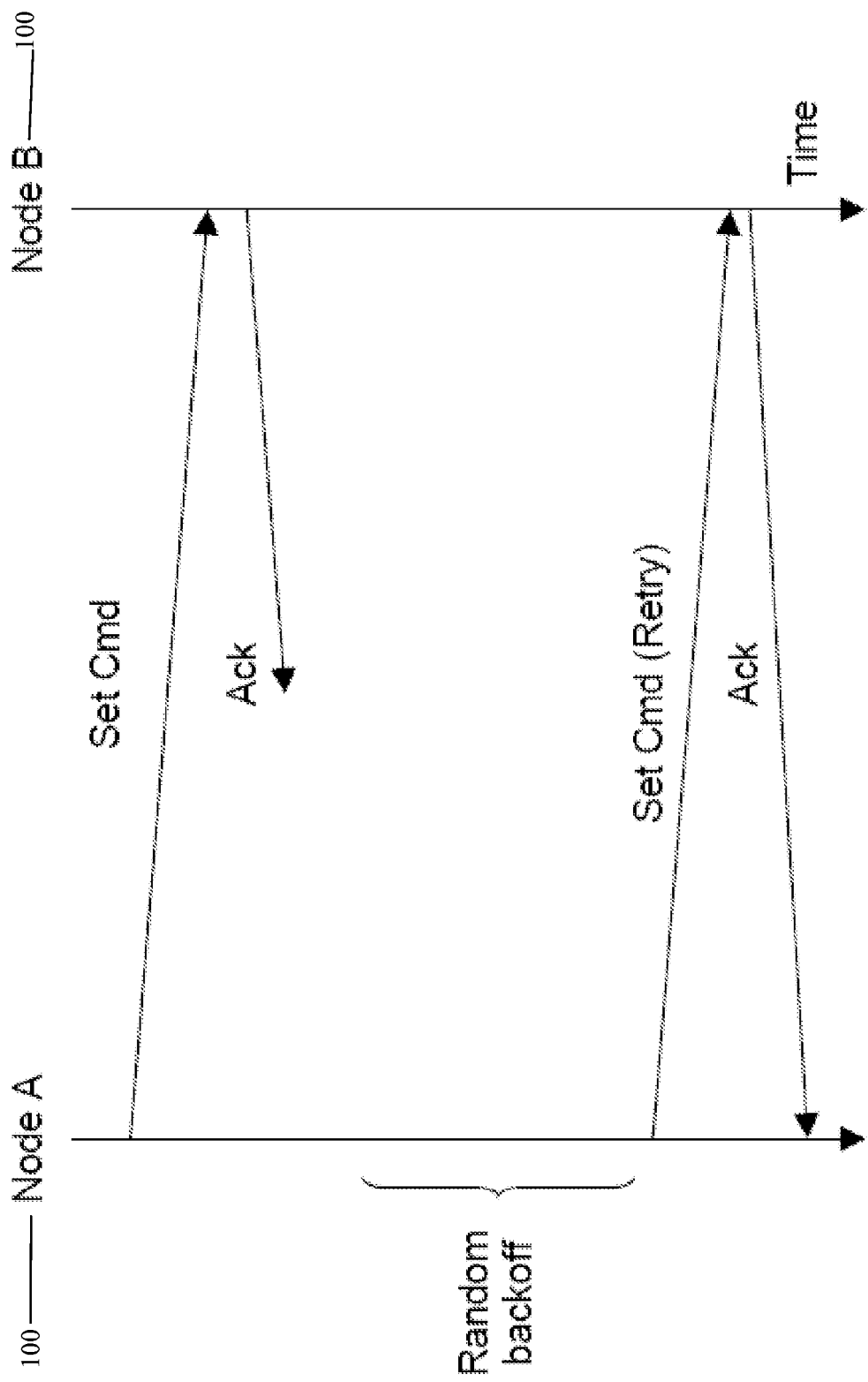
FIG. 3 shows an example of a type of re-transmission hand shaking.

FIGS. 3 and 4 show examples of this type of re-transmission hand shaking. The mesh network protocol may be designed to trade low latency at the expense of handling simultaneously communication to a number of nodes in the network. To obtain this the number of random backoff values is limited to 4 (0, 1, 2, and 3).

FIG. 5 shows how simultaneous communication to even a small number of nodes 100 may block the communication completely. Simultaneous communication to nodes in the network which require a response from the nodes in question should therefore be avoided in the application.

From a protocol point of view there may be many different types of nodes, for example: Control nodes, Static Controller nodes, Installer Controller nodes, Controller bridge nodes, Slave nodes, Routing Slave nodes, and Enhanced Slave nodes. Controller nodes may store information about other nodes in the network. The node information includes the nodes each of the nodes can communication with (routing information). The Installation node may present itself as a Controller node, which may include extra functionality to help a professional installer setup, configure, and troubleshoot a network. The Controller bridge node may store information about the nodes in the network and in addition it may generate Virtual Slave nodes. A virtual Slave node is a node residing on another network accessible through the bridge.

A network may consist of slaves, a primary controller, and secondary controllers. New nodes may be added and removed to or from the network by using the primary controller. This may cause secondary controllers and routing slaves to malfunction if, for instance, a preferred repeater node is removed. Without automatic network updating a new replication has to be made from the primary controller to all secondary controllers, routing slaves should also be manually updated with the changes. In networks with several controller and routing slave nodes, this could cause difficulties if the process is not automated. To automate the process, an automatic network update scheme may be included in the network protocol. To use this scheme a static controller could be available in the network. This static controller may be dedicated to hold a copy of the network topology and the latest changes that have occurred to the network. The static controller used in the automatic update scheme is called the Static Update Controller (SUC).

Each time a node is added, deleted or a routing change occurs, the primary controller may send the node information to the SUC. Secondary controllers may then ask the SUC if any updates are pending. The SUC may then in turn respond with any changes since last time this controller asked for updates. The controller requesting an update may be called to notify the application that a new node may have been added or removed in the network. The SUC may hold a large number of changes of the network. If a secondary controller requests an update after more than the maximum changes occurred, then it may not get updates and the request may fail. In this situation a manual replication from the primary controller may be necessary to update information on the secondary controller. Routing slaves may have the ability to request updates for its known destination nodes. If any changes have occurred to the network, the SUC may send updated route information for the destination nodes to the Routing slave that requested the update. The Routing slave application may be notified when the process is done, but may not get information about changes to its routes. Routing slaves may have the ability to request updates for its known destination nodes. If any changes have occurred to the network, the SUC may send updated route information for the designation nodes to the Routing slave that requested the update. The Routing slave application may be notified when the process is done.

A network may have a SUC with enabled node ID server functionality resulting in a SUC information Server (SIS) 530. The SIS 530 may enable other controllers to include/exclude nodes in the network on its behalf, distribute an installation process to controllers in the mesh network, and perform other functions, commands, and the like. This may make it easier to install complex networks because multiple controllers support inclusion of nodes instead of one dedicated primary controller.

The SIS 530 may be the primary controller in the network and have the latest update of the network topology and capability to include/exclude nodes in the network. Further, it may be safer to keep the latest network topology on the SIS 530 (static controller) than on a portable primary controller used extensively during network installation. In embodiments, a network may contain only one SIS 530. A primary controller may instruct a SUC to enable the node ID server functionality (SIS). In case the SUC is primary then the SUC application may enable the node ID server functionality locally.

When including additional controllers to a network containing a SIS 530 they may become inclusion controllers 510 and as such they may obtain the capability to include/exclude nodes in the network on behalf of the SIS 530. Both portable and static controllers may be inclusion controllers 510. The inclusion controller's 510 network topology data may be dated from last time a node was included or the last time it requested a network update from the SIS 530 and therefore it may not be classified as a primary controller.

Figure 5A:
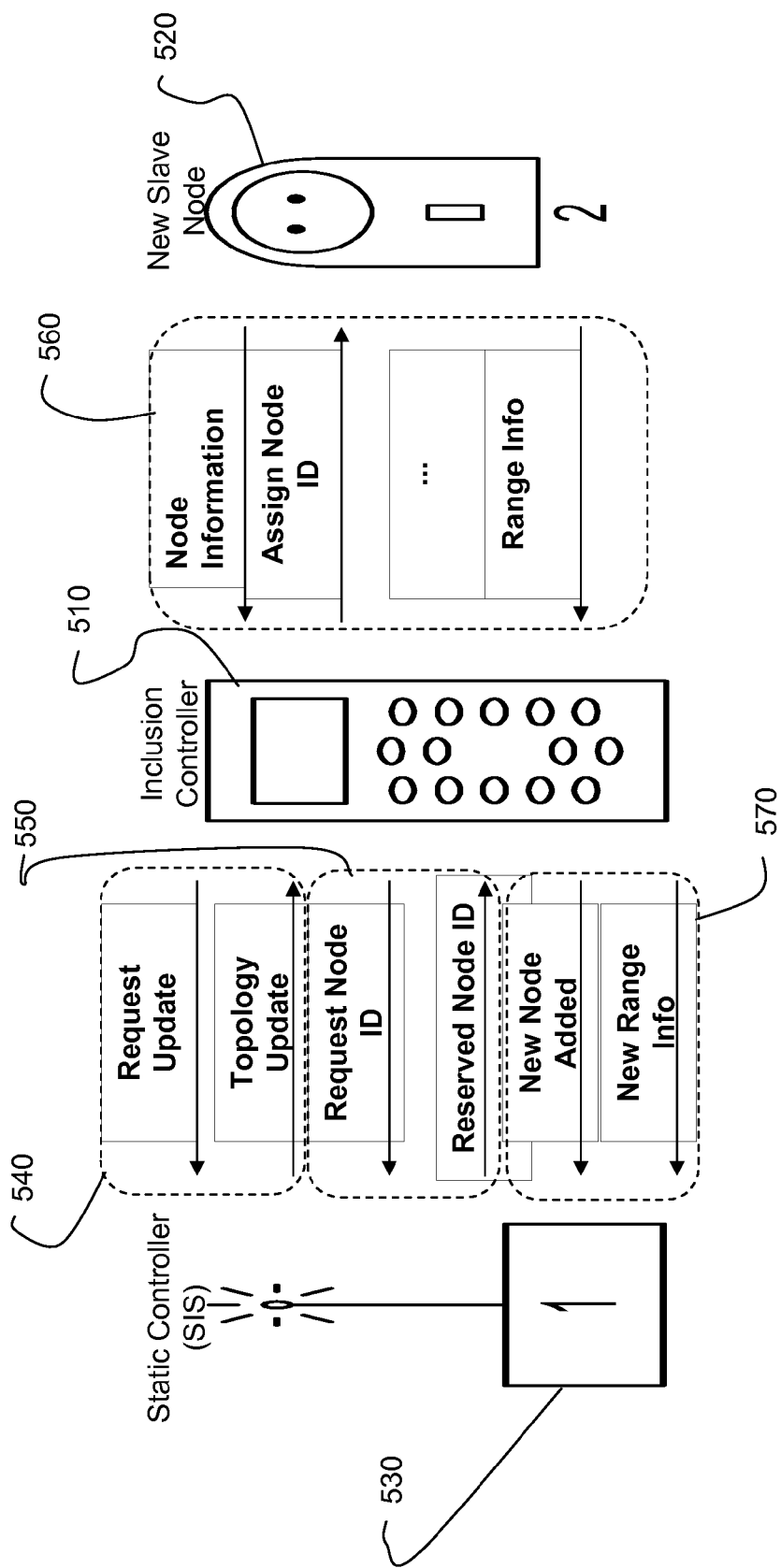
FIG. 5A shows an inclusion controller used to include a new slave on behalf of the network SIS.

FIG. 5A shows an inclusion controller 510 used to include a new slave node 520 on behalf of an SIS 530. Inclusion controller 510 performing the inclusion may first request the latest network topology changes 540 and a free node ID 550 from SIS 530. Inclusion controller 510 may receive node information and range information 560 from newly included slave 520 and may forward such information 570 onto SIS 530. In embodiments, inclusion controller 510 may be within direct range of the node to include.

In embodiments the SIS may be associated with an inclusion controller 510 within a mesh network, where the inclusion controller 510 is in turn associated with a slave node 520 within the mesh network. Data transmitted between the SIS and the inclusion controller 510 may be associated with data transmitted between the inclusion controller 510 and the slave node 520. The first data transmitted between the SIS 530 and the inclusion controller 510 may relate at least in part to the slave node 520, and transmitting a second data between the inclusion controller 510 and the slave node 520, may relate at least in part to the first data transmitted. In embodiments, the first data transmitted between the SIS 530 and the inclusion controller may be a request update, a topology update, a request for a node identifier, may relate to a reserved node identifier, may relate to adding a new node to a mesh network, may relate to a new range information, or some other data type. In embodiments, the second data transmitted between the inclusion controller 510 and the slave node 520 may be node information, may relate to assigning a node identifier, may relate to range information, or some other data type.

The inclusion controller 510 may be associated with network topology data, or other types of data. Network topology data may be dated from the last time a node was included in an update from the SIS 530. The inclusion controller may be associated with network topology data, or other types of data, where the network topology data may be dated from the last time a node was included in an update from the SIS 530.

In embodiments, SIS 530 commanding may involve a different protocol from operational network commanding. For example, in operational network commanding, the network topology may be relatively static, where nodes are not being added or removed, household obstructions 102 are not changing, and network commanding is typically related to the operational commanding of electrical devices associated with nodes, such as turning a light on, raising a blind, changing the temperature setting of a thermostat, and the like. SIS 530 commanding may be associated with commanding that is not typical of daily operational commanding. An example of SIS 530 commanding may be associated with a new addition to a house, where a relatively large number of nodes are being added to the network, or changes in the security level of the network when the family is going on extended vacation, or when changes in the network topology require changes in communication speed, channel availability, routing strategies, and the like, or other like atypical network commanding.

In embodiments, SIS 530 commanding may include a plurality of network configuration commands, such as enabling security, changing security level, changing communication speed, changing communication channel, updates to channel availability, changes in network topology, implementing installation strategies, energy management, and the like.

In embodiments, SIS 530 commands across the mesh network may relate to including or excluding a node in the mesh network. The SIS 530 controller may maintain the master list of network updates, and may supply the updates to other controllers while nodes are being included or excluded from the network. An example of this would be the addition or removal of a new light fixture, alarm component, garage door opener, sprinkler, window shade, thermostat, or the like. When the component node is added, it may be capable of discovering its neighboring nodes and distributing this information to others automatically. In this way, the system is self-organizing. In the event that a component node is removed or non-functioning, the system may be capable of self-healing by redirecting communications. In executing the SIS 530 commanding for including or excluding a node in the mesh network, the SIS 530 controller may increase the level of security associated with such commanding in order to prevent unauthorized changes to the network. Changes in the level of security may involve encryption of commands, password protection, audile signals indicating a change in the network, and the like.

In embodiments, SIS 530 commands across the mesh network may relate to enabling a security function such as doors opening, windows opening, motion detection, alarms, and the like. An example of enabling a security function may be the activation of the alarm system when the family is asleep or away. Another example may be the detection of someone on the grounds, coming up the driveway, at one of the doors, or the like. In executing the SIS 530 commanding related to enabling a security function, the SIS 530 command protocol may involve encoded commanding, password protection, audible signals indicating changes in the security of the network, and the like.

In embodiments, SIS 530 commands across the mesh network may relate to a network security level. A network security level may be high, medium, low, or some other security level. An example of a security level command may be the setting of a high security level when the family is away on vacation. In a high security level command sequence, the windows, doors, and grounds may be monitored, and the police or a security agency may be alerted when sensors are tripped. An example of a low security level command may be the monitoring of doors and windows opening during the day when small children are around. A minor audible indication may indicate that someone just opened the front door. In executing the SIS 530 commanding related to changing a network security level, the SIS 530 command protocol may involve encoded commanding, password protection, audible signals indicating a change in the security level of the network, and the like.

In embodiments, SIS 530 commands across the mesh network may relate to a communication speed. A communication speed may be a network mandated speed, including but not limited to 9.6 kbps, 40 kbps, 100 kbps, or some other speed. An example of a communication speed command may be the addition of a new slave node 520 that is of an older generation, and has a slower communications speed. This information may be used to adjust communications speed when the system attempts to deliver a command to the new unit, or to update the system's routing information table. Another example of a communications speed command may be the addition of a node that is capable of receiving and/or transmitting at different speeds. In executing the SIS 530 commanding related to changes in communication speed, controllers that are local to the node(s) involved may request update information from the SIS 530 controller. The SIS 530 controller may in turn assign a node ID to new nodes, or enable the local controller to be an inclusion controller 510. SIS 530 commanding for changes in communication speed may also involve communication protocols that are associated with changes in security, channel availability, routing strategies, and the like. For example, changes in communications speed may be associated with including or excluding node, that in turn, may require changes in routing strategies to optimize the performance due to changes in the network topology. SIS 530 command protocols may make these optimizations easier to implement.

In embodiments, SIS 530 commands across the mesh network may relate to a communication channel. The command may be in connection to various types of channels. Channels may be different frequencies, different pathways through the mesh network, multiplexed channels along the same pathway through the mesh network, or other communication channel schemes known to the art, or the like. An example of commands being sent across the mesh network by way of different frequencies may be a retry-strategy in the case of interfering noise disrupting the primary transmission frequency, or the simultaneous transmission to different nodes from the same source, but with different frequencies. An example of commands associated with different pathways through the mesh network may be the redirection of communications due to an RF obstruction 102. An example of multiplexed channels along the same pathway through the mesh network, the system may utilize common portions of a pathway during two or more simultaneous network communications. In executing the SIS 530 commanding related to a communication channel, the SIS 530 command protocol may make these changes easier to implement.

In embodiments, SIS 530 commands across the mesh network may relate to communication channel availability. Communication channel availability may be associated with a single channel, or a plurality of channels. The availability of channels throughout the mesh network allows the system to reliably communicate across the network with the least amount of command delivery latency. An example of a command related to communication channel availability may be the distribution to controllers within the network changes in communications pathways due to changes in the environment, such as moved furniture or appliances, newly installed nodes, temporary disruptions due to a party with many guests, or the like. By updating the list of available pathways, the system may increase reliability and decrease latency. In executing the SIS 530 commanding related to a communication channel, the SIS 530 command protocol may make these changes easier to implement.

In embodiments, SIS 530 commands across the mesh network may relate to a network topology. A command relating to network topology may be associated with a change in the network topology. A change in network topology may be distributed to other nodes in the network by the SIS 530. The SIS 530 controller may maintain the master list of network updates, and may supply network topology updates to other controllers in the network. Topology may relate to new installations, such as an addition to the house, or changes to the environment, such as moving furniture or appliances around, or a party with a lot of people obstructing the pathways. An example of a command related to topology may be the closing off of an opening in the house that formally provided an often used command pathway through the house, and the subsequent commanding to controllers as to what the new command pathways are. Another example may be the addition of an outside installation, say around a pool area. The new nodes may communicate to the existing system; the primary controller may record the location of the new nodes, establish communication pathways to the new nodes, and communicate the necessary information about the new nodes to the controllers across the network. In executing the SIS 530 commanding related to changes in topology, potentially involving changes in pathways, or the inclusion and exclusion of nodes, the SIS 530 command protocol may involve encoded commanding, password protection, audible signals indicating changes in the network, and the like.

In embodiments, SIS 530 commands across the mesh network may relate to a network routing strategy. For example, the network routing strategy may involve how to handle retries in the event of a communication failing on the first attempt. For instance, the routing strategy may call for a fixed number of retries across the same pathway before changing the command pathway. The change in the pathway may involve a different physical path or different frequency, or the like. The network routing strategy may involve periodically polling the system in order to establish available paths for each node on the network, recording those available paths, choosing a primary pathway, and storing the rest as alternates. In executing the SIS 530 commanding related to a routing strategy, the SIS 530 command protocol may make these changes easier to implement.

In embodiments, SIS 530 commands across the mesh network may relate to an installation strategy. The installation strategy may be distributed by the SIS 530 to all controllers in a mesh network, distributed to one controller in a mesh network, be transferred from one node to another during the lifetime of the network, or some other installation assignment. An example of an installation strategy may be to have all controllers become inclusion controllers to maximize the flexibility of installation to any portion of the house. Another example would be for the SIS 530 to be an installer's personal computer, and have the installer's portable controllers be an inclusion controller 510 for ease of installation. A further example of how the SIS 530 may be utilized to ease the installation process is to assign one non-portable SUC as the SIS 530, and make all portable controllers inclusion controllers. In this manner, the master update list may reside with a stationary SIS 530 in the network, and installers may include and exclude nodes utilizing portable inclusion controllers. The SIS 530 may enable the inclusion controllers to assign node IDs on its behalf, with the inclusion controllers using the SIS 530 protocols to request the latest updates from the SIS 530. The use of SIS 530 controllers, and command protocols associated with the SIS 530, may make installation easier to implement.

In embodiments, a SIS 530 installation strategy may relate to a local installation. The SIS 530 protocols associated with a local installation may be ideal for small, low cost systems, for example, 5 light remotes plus 30 lamp modules. A local installation may be installed by a homeowner or installer. The local installation process may activate both the node and the controller in order to install the new product. The activation may be simultaneous or skewed, and it may be initiated once, or for all new nodes, depending on the installation scenario. The new node may send out a request to join the network, which may be acknowledged by a SIS 530 controller, or an inclusion controller 510 assigned by the SIS 530, by assigning an ID to the node. Finally the new node may report back its list of nodes within direct RF range to the SIS 530 controller to have full network topology information. The use of SIS 530 controllers, and command protocols associated with the SIS 530, may make local installation easier to implement.

In embodiments, a SIS 530 installation strategy may relate to a central installation. The SIS 530 protocols associated with a central installation may be ideal for a more complex installation. In embodiments, the central installation may be utilized by an installer, and may involve the use of a SIS 530 controller. The SIS 530 may be implemented in a personal computer or equivalent intelligent device, allowing the installer to maximize remote control and monitoring of all the steps in the installation process. The use of SIS 530 controllers, and command protocols associated with the SIS 530, may make central installation easier to implement.

In embodiments, a SIS 530 command across the mesh network may relate to communicating data to a mesh network node for the purpose of assigning identifiers to new nodes, or some other functionality, purposes, or transmittal in a mesh network. The SIS 530 may utilize SIS 530 command protocols to execute the assignment of identifiers to the new nodes, or the SIS 530 may utilize SIS 530 command protocols to assign other controllers as inclusion controllers, and thus enable the inclusion controllers to perform the assignment of identifiers. The use of SIS 530 controllers, and command protocols associated with the SIS 530, may make the assignment of identifiers easier to implement.

In embodiments, a SIS 530 command across the mesh network may relate to energy management. The SIS 530 may distribute energy management configuration information to nodes and associated devices. An example of energy management commanding may involve the SIS 530 configuring the network into a power conservation mode. Once commanded into power conservation mode, nodes may respond to operational commands to minimize the electrical power required for the function commanded, such as changing the temperature set point in a room, or on the floor, more slowly in order to save power. Another example of energy management commanding may involve the SIS 530 configuring the network into a rapid temperature-change mode. Once commanded into the rapid temperature-change mode, nodes may respond to operational commands to minimize the time the house takes to change temperature, such as when the family returns from a vacation, and the house may need to warm up or cool down quickly. Commanding related to energy management may require local memory or local software/firmware in order to implement the commanded energy management mode. For example, when the SIS 530 commands a temperature controller to increase its set point, the temperature controller may require local memory to store temperature control profiles for the different modes, and local software/firmware to choose between the stored temperature control profiles.

A failing node may be replaced with a node inheriting the node ID from the failed node. Thereby the user avoids updating nodes having associations to the failed node. Associations within the failed node may be re-established in the new node.

Software components of a system according to the present invention may allow a routing slave to extend to a particular number of destinations (e.g. five) having return routes in very low latency applications. In embodiments a routing slave may need to support more than the particular number of destinations and this may require the controller to support favoring return routes for destinations out of direct range with the routing slave. In embodiments, software components may enable a controller to determine if two nodes are within direct range. A routing slave can request new return route destinations from the SUC/SIS node in case the available return routes fails. Furthermore the routing slave can check if a node ID is within direct range in any of the existing return routes.

A software component may be used to cancel ongoing routing attempts. This software component can be used to abort a transmission to a malfunctioning node, thereby eliminating a large amount of routing attempts in a large network.

The software components of a mesh network controller may be split into the controller application and the controller basis software, which may include the mesh network protocol layers and control of the various data stored into memory. Controller nodes may include an external memory in which the application data area may be placed. The controller node may have a unique home ID number assigned, which may be stored in the basis area of memory. When the new slave nodes are registered to the mesh network, the controller node may assign the home ID and a unique node ID to the slave node. The slave node may store the home ID and the node ID. When a controller is primary, it may send any network changes from the SUC node. The use of macros while developing application software may allow adjustments to the interface without changing the application source files.

The software components of a mesh network static controller node may be split into a static controller application and the static controller basis software, which may include the mesh network protocol layers and control of the various data stored into memory. The difference between the Static Controller Node and the Controller Node is that the static controller may not be powered down, that is it may not be used for battery-operated devices. The static controller may have the ability to look for neighbors when requested by a controller. This ability may make it possible for a primary controller to assign static routes from a routing slave to a static controller. The static controller may be set as a SUC node, so it may send network topology updates to any requesting secondary controller. A secondary static controller not functioning as SUC may also request network topology updates.

The software components of a mesh network installer controller may be split into an installer controller application and static controller basis software, which includes the mesh network protocol layer. The installer controller may be a mesh network controller node, which incorporates extra functionality that may be used to implement controllers especially targeted towards professional installers who support and setup a large number of networks.

The software components of a mesh network controller bridge node may be split into a controller bridge application and basis software, which may include the mesh network protocol layer. The controller bridge node may be a mesh network static controller node, which incorporates extra functionality targeted for bridging between the mesh network and other networks.

The software components of a mesh network slave node may be split into a slave application and basis software, which may include the mesh network protocol layer. Slave nodes may have a block of memory reserved for storing data, and may have limited direct access to the block. The home ID and node ID of a new node may be zero. When registering a slave node to a mesh network the slave node may receive home and node ID from the networks primary controller node. These ID's may be stored in the basis data area in memory. The slave may send unsolicited broadcasts and non-routed singlecasts. Further it may be able to respond with a routed singlecast (response route) in case another node has requested this by sending a routed singlecast to it. A received multicast or broadcast may result in a response route without routing.

Figure 6:
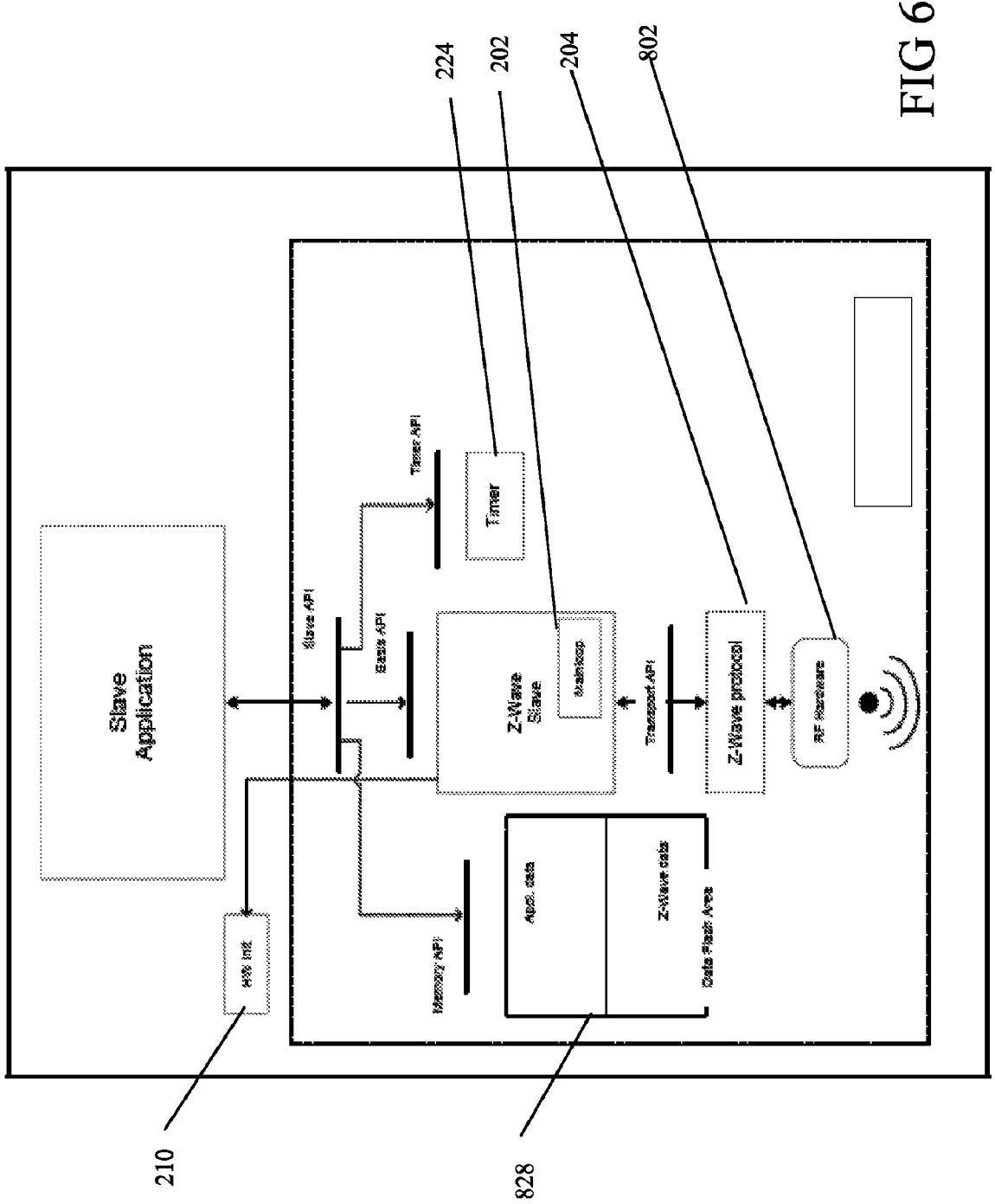
FIG. 6 shows software components of a mesh network split into a slave application and basis software.

FIG. 6 shows how the software components of a mesh network routing slave node may be split into a slave application and basis software, which may include the mesh network protocol layer. Routing slave nodes have a block of memory reserved for storing data, and may have limited direct access to the block. The mesh network basis software may reserve the first part of this area, and the last part of the area may be reserved for the application data. The home ID and node ID of a new node may be zero. When registering a slave node to a mesh network the slave node may receive home and node ID from the network's primary controller node. These ID's may be stored in the mesh network basis data area in memory. The routing slave may send unsolicited broadcasts and single casts (routed or non-routed). Further it may respond with a routed singlecast (response route) in case another node has requested this by sending a routed singlecast to it. A received multicast or broadcast results in a response route without routing.

Figure 7:
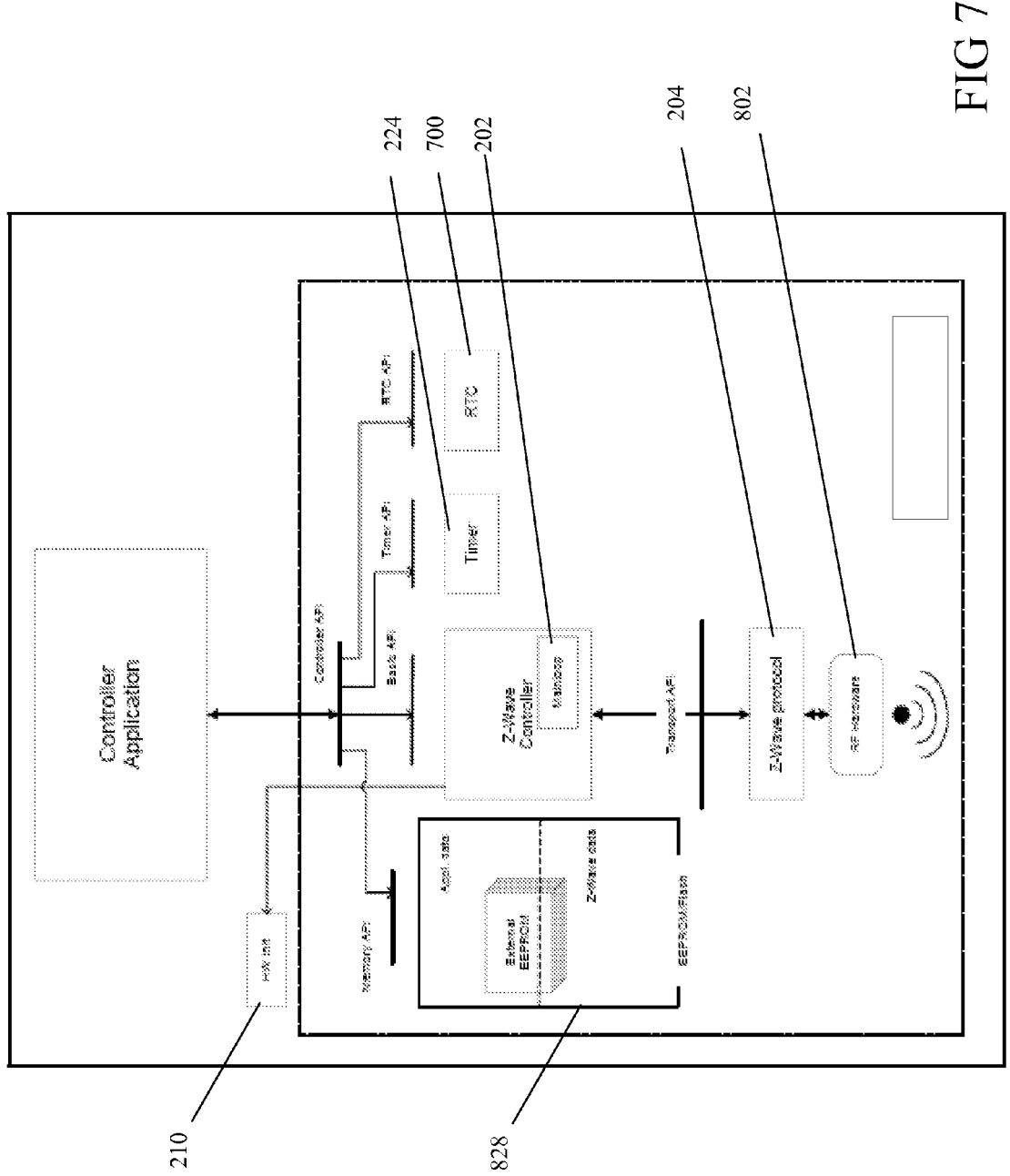
FIG. 7 shows controller node software features.

FIG. 7 shows how the enhanced slave node may have the same basic functionality as a routing slave node, but because it may have more features on the hardware, more software components may be available. Enhanced slave nodes may have an external memory and a Real-Time Clock (RTC) 700 and Wake-Up Timer (WUT) 824. The basis software may reserve the first area of external memory, and the last area of external memory may be reserved for the application data.

An internal ring oscillator is used as a base for a wake up timer. The oscillator has a very low power consumption but is highly dependant on temperature, supply voltage and process variation. In order to compensate for the high variation a calibration circuit is built into the chip. The calibration circuit measures the oscillation frequency against the system clock and derives a calibration constant. As the ring oscillator runs at several kHz the calibration is as fast compared to wake up period. The calibration is performed automatically before entering WUT mode (wake up timer mode).

Figure 8:
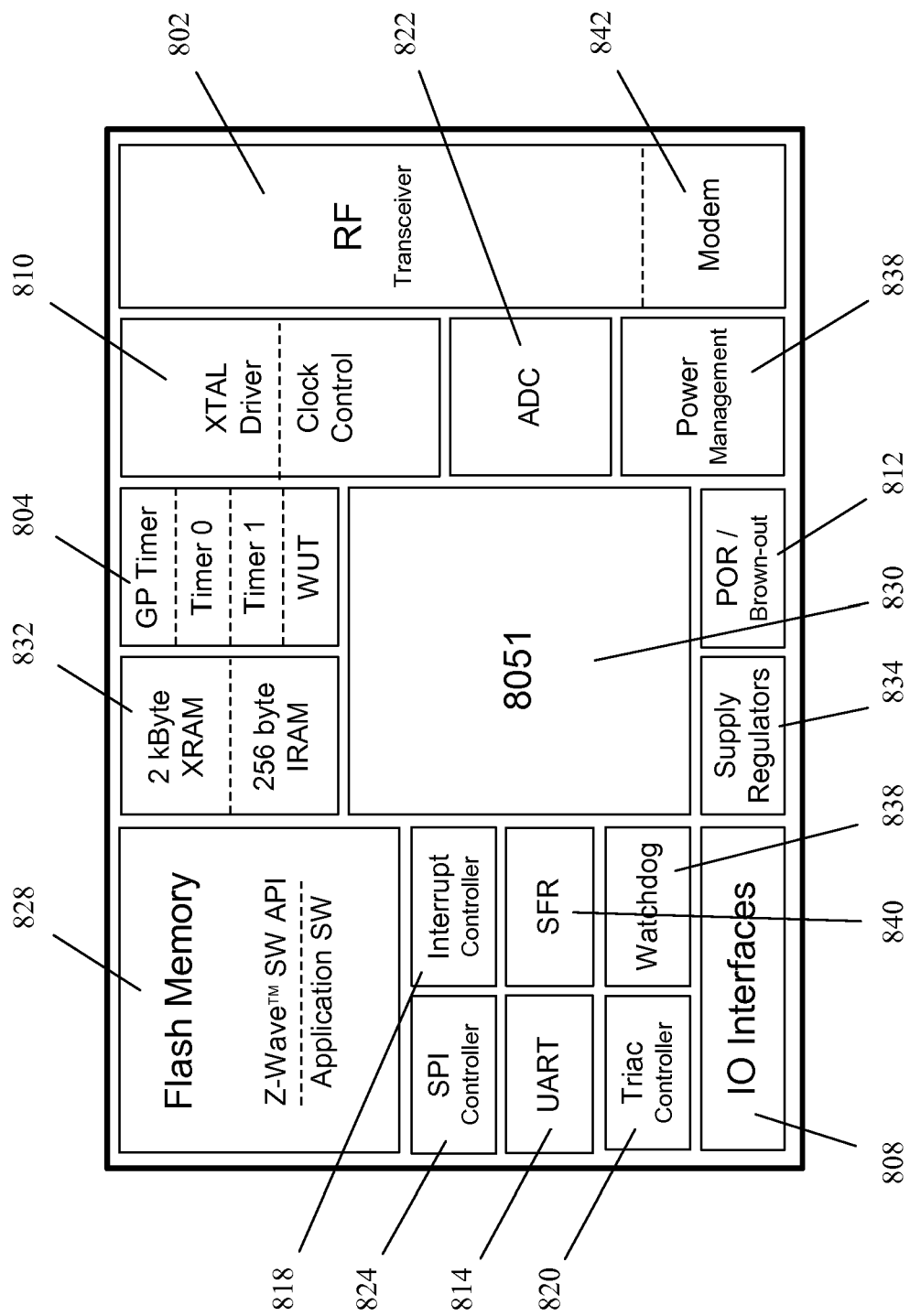
FIG. 8 shows a block diagram of the a mesh network node.

A node in mesh network 100 may be implemented with a single integrated circuit (e.g. an IC, ASIC, FPGA, etc.). FIG. 8 shows a block diagram of the a mesh network node, which may consist of many sub-components such as an integrated RF transceiver 802, an 8051 Microcontroller Unit (MCU) 830 with Random Access Memory (RAM) 832, mesh network software Application Programming Interface (API) 828, and memory storage for user application software 828 such as Flash memory. In addition to these major functional blocks a single chip implementation may contain an Analog-to-Digital Converter (ADC) 822, general purpose Input/Output (I/O) pins 808, Power-On Reset (POR) circuit/brown-out detector 812, Triac controller 820, Serial Peripheral Interface (SPI) 824, interrupt controller, and UART 814 serial interface for connecting to peripheral devices. Such a device may be designed for very low power and low voltage applications and highly optimized for battery-powered applications and easy integration to products with demanding size constraints.

Supply regulators 834 regulate the external supply down to a low internal voltage supply. Supply regulators 834 may significantly improve supply noise tolerance of the chip.

A single chip implementation of the embodiment of FIG. 8 may run on a system clock that is derived from an XTAL. For example, clock control 810 divides an external crystal (not shown) into two internal clocks. In the preferred embodiment of FIG. 1, an external crystal of either 16 MHz or 32 MHZ would allow clock control 810 to generate an 8 MHz clock for RF circuits and a 16 MHz clock for MCU 830 and peripherals. Alternatively, clock control 810 may interface to an external crystal controlled oscillator.

The POR circuit 812 may eliminate the need for external reset circuitry, holding reset during power-on and brown-out situations. POR 812 may be designed with glitch immunity and hysteresis for noise and transient stability. POR 810 circuit may have extremely low power consumption and is active even in a sleep mode.

Figure 9:
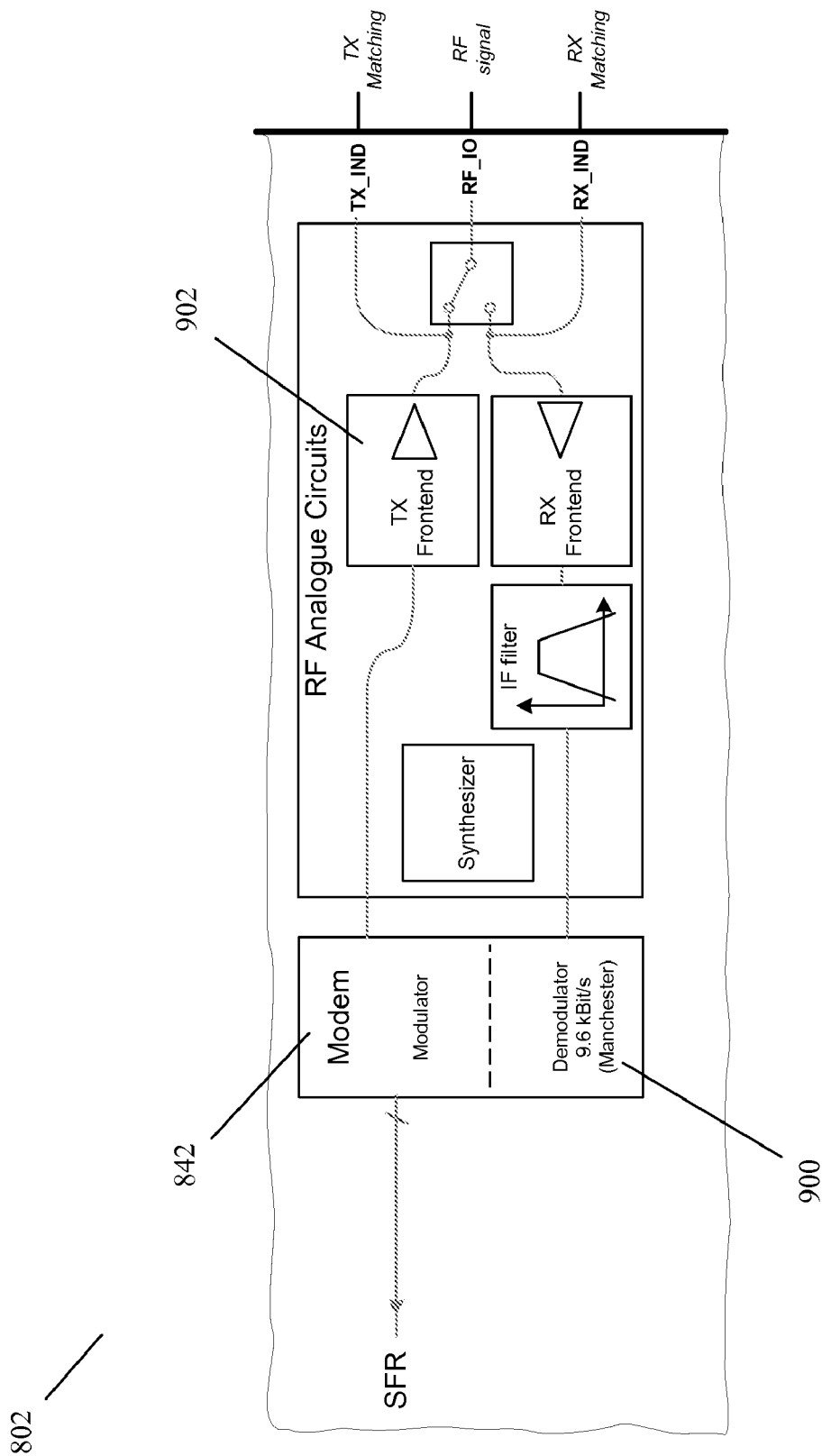
FIG. 9 illustrates a block diagram of a transceiver and RF modem.

Referring further to FIG. 8 and FIG. 9, a transceiver 802 may be able to transmit and receive Manchester coded data 9.6 kbits. FIG. 9 shows the invention communicating NRZ coded data at approximately 40 kb/s. RF transceiver 802 may handle all the RF related functions such as Manchester encoding/decoding 900, preamble detection and serialization/deserialization. The output power of the transmitter Power Amplifier 902 may be adjustable in steps of 2 dB. The different parts of the RF transceiver 802 may be powered up and down so only the required circuits may be powered at a time. The RF transceiver 802 may only need external components for input and output matching. A block diagram of the Transceiver 802 including RF modem 842 is given in FIG. 9.

Transceiver 802 includes multiple parallel receive demodulators, each for detecting a different received communication signal frequency, enabling the single chip embodiment to operate in an environment with a plurality of communication signal frequencies as may occur in networks of current and older technology devices, and/or different types of devices. The multiple demodulators are configured to receive output signals from RF transceiver 802 interface, allowing the first demodulator that detects a valid signal to take control, thus transparently receiving a signal at any of a plurality of supported data rates, without prior negotiation with an external device. No communication overhead results from supporting multiple receive data frequencies, allowing fast reception of unsolicited transmissions from unknown sources.

An auto-speed receiver may include feeding the output of one radio front-end to multiple demodulators, each for a different data rate, and then allowing the first demodulator detecting a valid signal to take control, thus transparently receiving a signal at any of the supported data rates without prior negotiation. This results in benefits including no overhead from using multiple data rates, and fast reception of unsolicited transmissions from unknown source without overhead of data rate negotiation.

The solution provides seamless installation of nodes only supporting multi-speed nodes (e.g. 9.6 kbps and 9.6/40 kbps) in the same network. The transceiver 802 is used to detect speed (e.g. 9.6/40 kbps) of the frames received to make a speed independent receiver. In embodiments, an optimal speed (e.g. fastest speed) to the destination node may be known (e.g. through testing and storing of information in association with a routing table) and a transmitting node may transmit at the optimal speed.

The transmitter side may use a method where the highest known speed that can be used to reach the end destination will be used. In embodiments, a controller may send a multicast frame using the optimal speed. For example, if a transmitter knows all destination nodes of a multicast frame supports 40 kbps, the transmitter will transmit the multicast at 40 kps. As a further example, to ensure all nodes within direct range of a transmitter receive a broadcast frame, a transmitter will send a the broadcast frame at 9.6 kbps A transmitting controller may select a specific route of nodes for a single cast or a routed single cast frame based on the route comprising only nodes which support a preferred transmission speed. For example, if a transmission controller can determine a route of nodes in which all the nodes support 40 kbps, the controller may select this route for a routed single cast frame. Alternatively if such a route cannot be determined, the controller will transmit at the optimal speed for any route. Continuing the example of above, in such a route the controller would transmit a single cast or routed single cast frame at 9.6 kbps.

Likewise the controller may try to achieve the highest possible speed when assigning return routes to a routing slave. Since a routing slave may store the speed for each route to a destination, a routing slave can have a mixed set of stored speeds (e.g. 40 kbps and 9.6 kbps) for routes to each destination.

A node information frame or a transfer presentation frame may be sent out at a low speed (for example 9.6 kbps) to allow nodes that support only the low speed, or nodes that support a plurality of speeds, to be included/excluded by the controller.

In embodiments, channel selection may be dynamically performed locally on each node without a need for distributing network information, nor requiring user intervention. Dynamic channel selection may not require additional installation steps. The dynamic nature may also enable the network to maximize the usage of free communications slots on the available channels. The nodes in the network may listen on the available channels based at least in part on a predefined algorithm (e.g., limited to round robin). A node may select a next communication channel, and stay on each selected channel for a predefined duration. The node may stay on the selected communication channel and receive messages. Once the node is ready to receive new frames, it may once again select a next communication channel and repeat the process.

In embodiments, a communication channel may have multi-speed capabilities within a single carrier frequency, and/or it may have multi-speed capabilities across multiple carrier frequencies.

In embodiments, a node in a mesh network may be used to perceive a plurality of channels within a mesh network. A node may select a first channel from the plurality of channels within the mesh network and remain on the first channel for a predefined duration. If during the predefined duration, a signal is not detected, the node may select a second channel and remain on the second channel for predefined duration in order to detect a signal. If during the predefined duration of remaining on the first channel a signal is detected, the node may remain on that channel beyond the predefined duration in order to receive a message. The node may then select a second channel once the message on the first channel is received. This process of channel selection may include a plurality of nodes and or a plurality of channels within a mesh network.

Figure 33A:
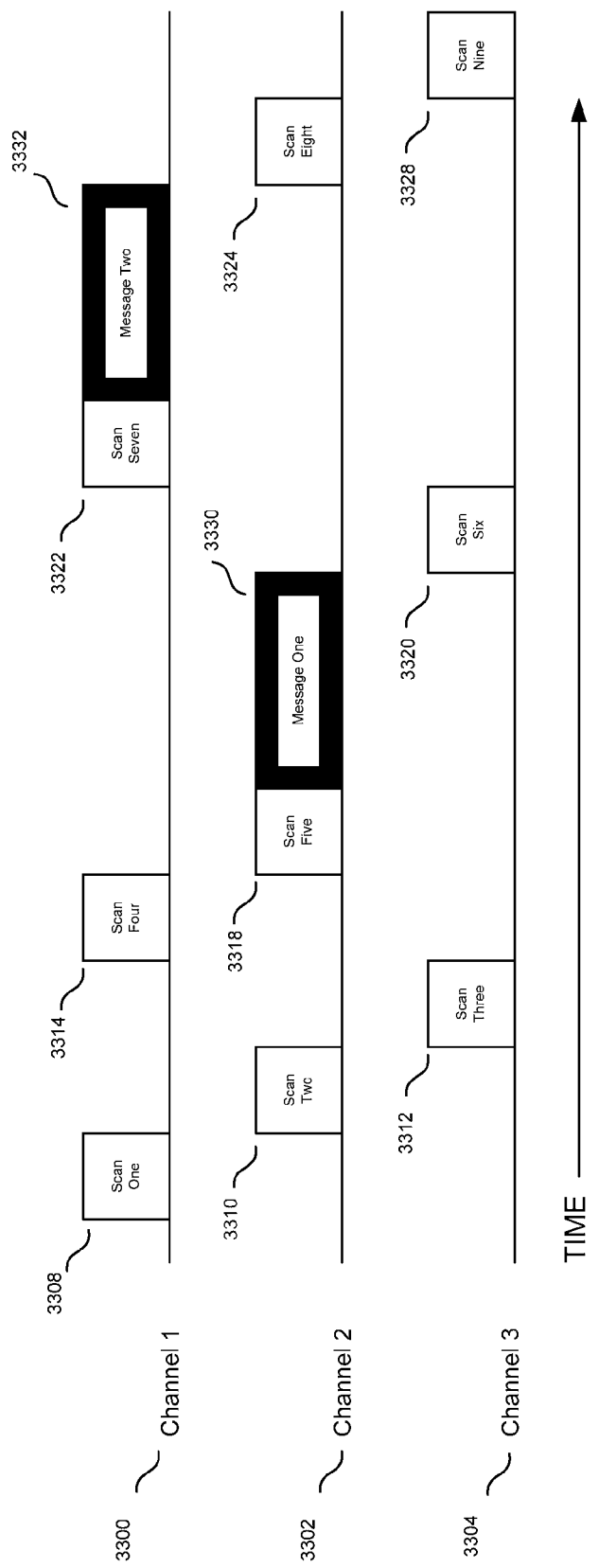
FIG. 33A illustrates a simplified embodiment of dynamic enablement of a secondary channel selection.
Figure 33B:
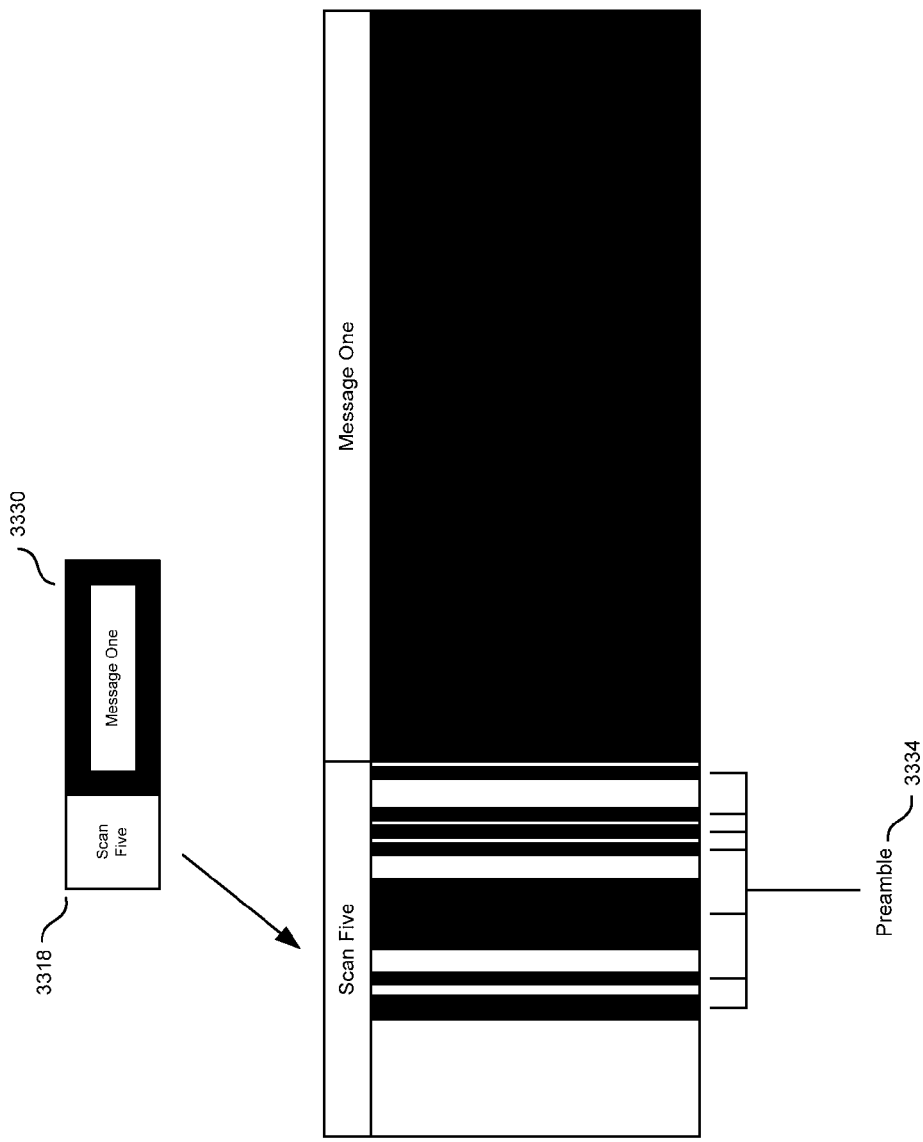
FIG. 33B illustrates a simplified embodiment of the use of a preamble during a dynamic enablement of a secondary channel selection.

FIG. 33A illustrates a simplified embodiment for dynamically enabling channel selection within a mesh network containing three channels. A node may begin a scan one 3308 on channel one 3300 and remain on the channel for a predefined duration. If the node does not detect a signal, the node may switch to channel two 3302 and begin scan two 3310. If during scan two 3310 a signal is not detected, the node may switch to channel three 3304 and begin scan three 3312. If no signal is detected during scan three 3312, the node may cycle back to channel one 3300 and begin scan four 3314. If no signal is detected during scan four 3314, the node may switch to channel two 3302 and begin scan five 3318. In this simplified hypothetical example, a signal may be detected during scan five 3318 on channel two 3302. As depicted in FIG. 33B, the signal that is detected during scan five 3318 may be a preamble 3334 that indicates to the node that a message is to follow and that the node should remain on channel two 3302 beyond the predefined duration originally set for scan five 3318. Following receipt of the preamble or plurality of preambles, the node may receive message one 3330 over channel two 3302. Following receipt of message one 3330, the node may switch to channel three 3304 and remain on the channel for the predefined duration of scan six 3320. If no signal is received during scan six 3320, the node may switch back to channel one 3300 and begin scan seven 3322. Scan seven may include a signal, such as a preamble or plurality of preambles, and remain on channel one 3300 beyond the predefined duration in order to receive message two 3332. Following receipt of message two 3332, the node may continue switching channels in scan eight 3324, scan nine 3328, and so forth, remaining on a channel for a predefined duration in order to detect a signal, and switching channels once the predefined duration has expired without a signal detected.

In embodiments, the message received by a node may be a plurality of messages. The message may be a command. A command may relate to including and or excluding a node in a mesh network, to enabling a security functionality, to a communication speed, to a communication channel, to a communication channel availability, to a network security level, to a network topology, to a network routing strategy, or some other command type.

In embodiments, the dynamic enablement of a secondary channel described herein may be implemented through an ASIC or any other consolidated processor platform described herein and or illustrated in the included figures.

In embodiments, a network mandated speed may be 9.6 kbps, 40 kbps, 100 kbps, or some other communication speed. In embodiments, communication channel availability may be associated with a single channel or a plurality of channels. In embodiments, a network security level may be high, medium, low, or some other network security level. In embodiments, the signal may be a predefined signal type.

In embodiments, the signal may be an implementation specific preamble signal. The implementation specific preamble signal may be predefined. The implementation specific preamble signal may be dynamically defined. In embodiments, the implementation specific preamble signal may equal a specific number of preamble signals. A preamble with less than the specific number of preamble signals may generate a command for a node to change to another channel. A preamble with equal the specific number of preamble signals may generate a command for a node to remain on the current channel. A preamble with greater the specific number of preamble signals may generate a command for a node to remain on the current channel. The selection of the second channel may be based at least in part on a combination of receiving the signal and a round robin algorithm, a combination of receiving the signal and a predefined algorithm, a combination of receiving the signal and a locally based heuristic, or some other signal-rule combination.

In embodiments, the mesh network is a wireless mesh network.

In embodiments, the present invention may provide a method and system for using a first node to select a first channel in a mesh network; transmitting a frame over the first channel to a second node in the mesh network; and using the first node to select a second channel over which to transmit the frame to the second node if failure of the transmission over the first channel to the second node is detected by the first node.

An aspect of the present invention relates to a portable node (e.g. portable mesh node) where the portable node may be associated with a user interface or other device. The portable node may be similar to other nodes as described herein and it may communicate to and from the network either directly to a master controller or through other nodes in the mesh network. The portable node may be discoverable as other nodes are discoverable. For example, the portable node may be located by other nodes sending 'find' requests to the portable node. Once the portable node receives a find request, it may respond and a communication link and hand-offs to other nodes in the network may then be completed. In other embodiments, the portable node may be programmed to send 'find' identifiers periodically. For example, the portable node may send a data packet to all nodes in the area (i.e. within its range) and the nearby nodes may identify that they can communicate with the portable node. In other embodiments, the surrounding nodes may be used to physically locate the portable node through triangulation techniques or the like.

Software components of a system according to the present invention may involve interfacing with or otherwise controlling streaming data within a network. For example, a user interface may be associated with the portable node and it may be adapted to scan through a set of entertainment titles (e.g. music titles, video titles, movie titles) to select a title to play on an entertainment device (e.g. audio/video equipment) controlled by another node in the network. The entertainment system may provide functionality similar to known high-end mp3 players for example. In embodiments, an entertainment device may be a television, a signal conversion device, a DVR, a networked device, a UPnP networked device, a satellite receiver, a cable converter, a VCR, a digital video disc player, a video accessory, an audio amplifier, an audio tuner, an audio amplifier-tuner combination, a CD player, a DVD player, a high definition DVD player, an audio cassette player, a digital audio tape player, an audio equipment, an equalizer, a phonograph player, a video component, a streaming media player, an mp3 player, an audio file player, and audio component, an audio-visual component, or some other entertainment device.

In embodiments, information relating to entertainment devices and/or entertainment media may be distributed through a mesh network in a data structure. A data structure may include metadata. In embodiments, metadata may be related to an image, a photo, audio, a music track, an audio broadcast, an audio book, a video, a movie, a video broadcast, a stored video, a live video, a digital video recorder file, a music video, audio-visual equipment, an appliance, a content directory, and other metadata types. Metadata may be a description of content being delivered, a rating, a title, a music title, a movie title, a publisher, a right, a plurality of rights, a genre, a language, a relation, a region, a radio call signal, a radio station, a radio band, a channel number, an image name, an artist name, a music track, a playlist, a storage medium, a contributor, a date, a producer, a director, a DVD region code, a channel name, a scheduled start time, a scheduled end time, an icon, and the like.

Figure 30:
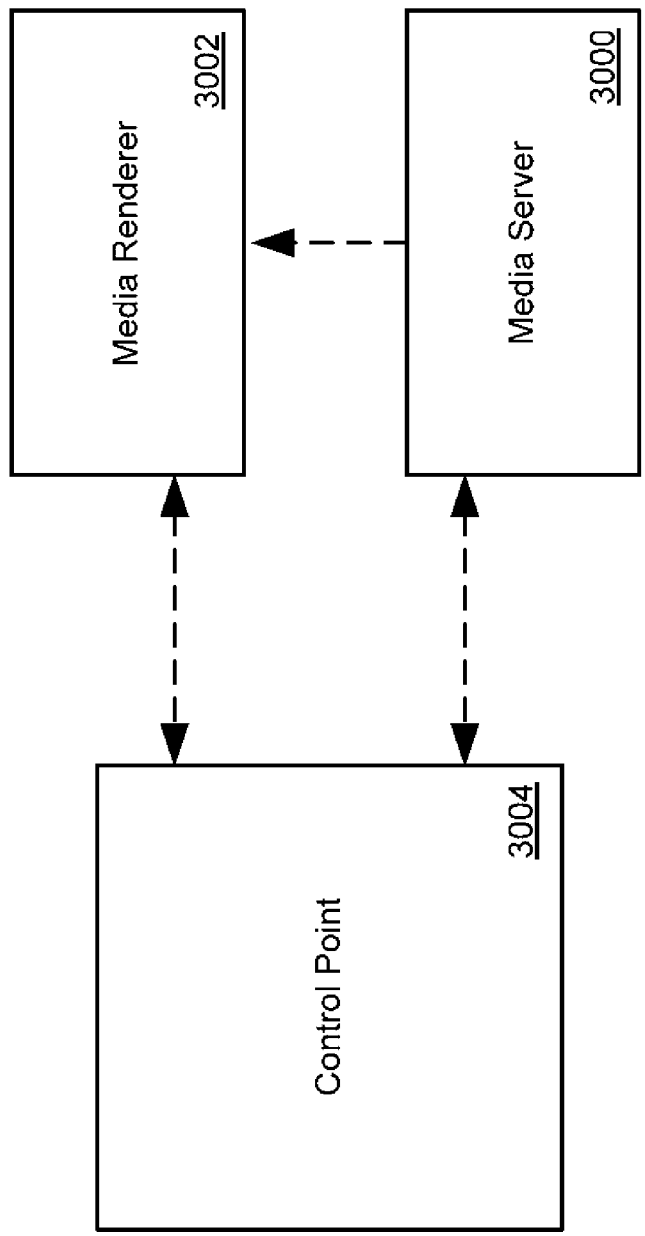
FIG. 30 illustrates the potential relations between a media server, media renderer, and control point.
Figure 31:
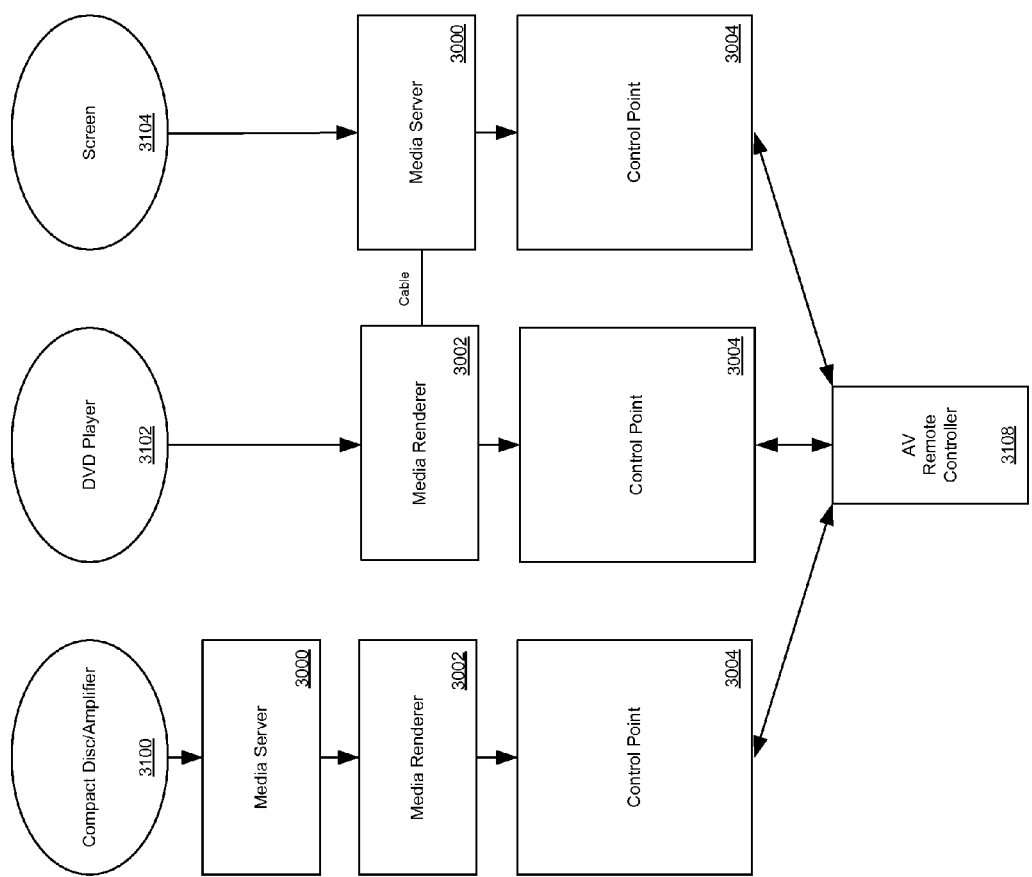
FIG. 31 illustrates a simplified embodiment of a media server, media renderer, and control point combination within a home audio-visual system.
Figure 32:
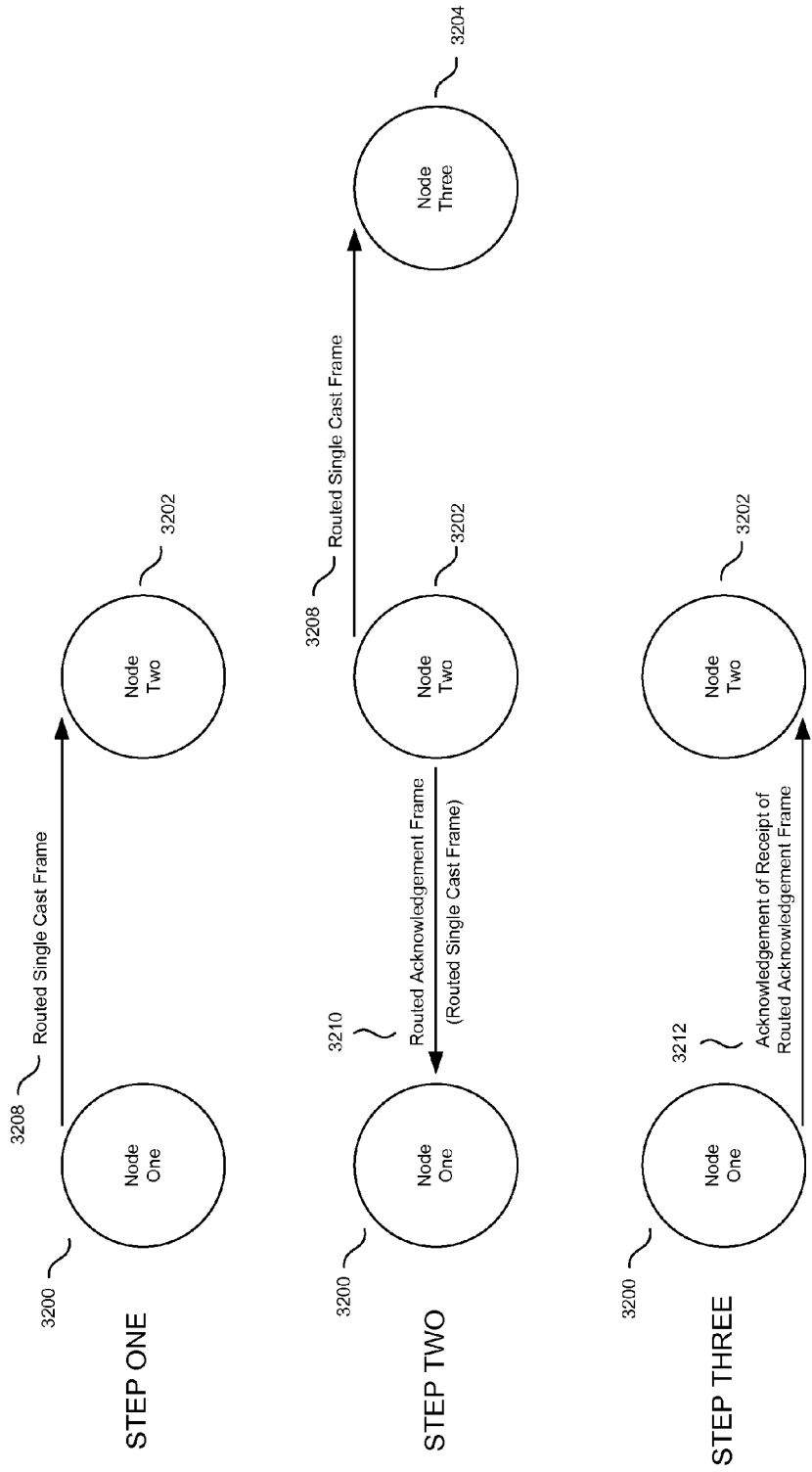
FIG. 32 illustrates a simplified embodiment of silent acknowledgement of a single cast frame routed over a mesh network.

In embodiments, such as that illustrated in FIG. 30, a media server 3000 may provide entertainment content (e.g., video, song, image, etc.) and may provide the content to a media renderer 3002. A media renderer 3002 may be capable of rendering entertainment content provided by a media server 3000. A media renderer 3002 may be identified with an endpoint identifier that is unique to a media renderer 3002. A control point 3004 may coordinate the operation of a media server and media renderer 3002. For example, through a control point, an end-user may be able to select what they want to view and/or hear, and where they want to hear and/or view it. Content that is available on a media server 3000 may be accessed through a control point's 3004 content directory functionality. This directory may comprise a hierarchical organization of content categories in which a superhierarchy is "Music," a sub-category within Music is "Artist," a sub-category within Artist is "Album 1," and so forth.

In embodiments, to cite one example among many potential embodiments, a media server 3000, media renderer 3002, and control point 3004 combination may be used to control a home audio visual system such as one including a compact disc player 3100, DVD player 3102 and a projection screen 3104. In this home audio-visual example, a remote controller 3108 may be used to communicate with a plurality of control points 3004, each of which is associated with a device within the audio-visual system. For example, the remote controller 3108 may communicate with a control point 3004 associated with a compact disc player 3100. The compact disc player 3100 may relay data to a media server 3000 that, in turn, relays the data to the media renderer 3002 and on to the control point 3004. Similarly, a DVD player 3102 and screen 3104 may be controlled by a remote controller using a media server 3000, media renderer 3002, and control point 3004 combination.

In embodiments, the portable node may be associated with a user interface for controlling other aspects of the entertainment system. For example, a user may be able to control output channels, input channels, volume, pitch, balance, treble, bass, brightness, sharpness, HDTV functions and the like. A portable node with a user interface may be adapted as a controller/receiver for other devices, sensors and the like in the network.

A Subscriber Identity/Information Module (SIM) may uniquely identify a connected mobile device and permit a mobile communication device to interface with a mesh network. A SIM card may also provide configurable storage for additional information related to a subscriber. As an example, a SIM card may provide storage for subscriber personal information such as address books, preferences, telephone numbers, network passwords, and such other information that may be beneficial or useful for a mobile user for accessing a wireless network.

Additionally, the SIM may facilitate accessing a mobile network. In an example, the SIM may contain unique information that a GSM mobile device network may detect when the SIM is installed in a GSM compatible phone and operated in a GSM network coverage area. Therefore when a mobile communication device, such as a mobile phone, is operating with a SIM in the range of a wireless network, such as a wireless mesh network, the mobile device may be detected by the network. In this way a SIM may facilitate making a mobile or portable device discoverable by a mesh network. Additionally, subscriber and/or network node identification information on the SIM may be used in an authentication process prior to allowing the mobile phone to join the wireless mesh network.

In embodiments, a mobile communication device equipped with a SIM card may facilitate a user of the mobile device gaining authorized access to a mesh network and further access facilities on the mesh network. For example, an authenticated user of a mobile device on a mesh network may download to the configurable memory of the SIM a list of movies stored on a digital video recorder connected to the network. The mobile device may then use the downloaded list along with display format information stored in the SIM to display the list in a user interface on the mobile device display. In another example, the user may upload digital content such as photos or a video on the mobile device (e.g. a camera phone with video capability) to a home entertainment system for presentation to a user viewing the display of the home entertainment system. Such an example may be used by an international traveler wishing to show images from their travels, or an Emergency Medical Technician providing images of an emergency patient in the field to an emergency room doctor.

Because a SIM may provide both access to a wireless network and may provide authentication for access to a mesh network, a SIM based mobile device, such as a cell phone, may be used to access the facilities of a mesh network from a location that may be far outside the range of nodes on the wireless mesh network by accessing the mesh network through a portal from the mesh network to the cell phone network.

A portable or mobile node may be discoverable through information contained in the SIM, as other nodes are discoverable. For example, the portable node may be located by other nodes sending 'find' requests to the portable node. Once the portable node configured with a SIM card receives a find request, it may respond and a communication link that hand-offs to other nodes in the network may then be completed. In other embodiments, the SIM card may include configured storage information that directs the mobile device or portable node to send 'find' identifiers periodically. For example, the mobile device may send a broadcast type data packet such that the nearby nodes that receive the data may identify that they can communicate with the SIM based mobile device.

An aspect of the present invention relates to streaming data (e.g. entertainment data) through the mesh network. Streaming data may be adapted such that control frames can be transmitted over the mesh network while streaming data is transmitted. In embodiments, a software component supporting streaming data may include a minimum delay of 35 ms after each frame carrying streaming data for example.

In embodiments, streaming data is preferably performed at a high transmission rate (e.g. a 40 kbps transmission rate). A controller streaming the data may determine and select the optimal speed, preferably high speed (e.g. 40 kbps, or the highest speed available), for the stream transmission. Depending on the network topology, a slave may not check communication speed of routed streaming data, and therefore the controller may preferably select a low speed (for example 9.6 kbps) for a routed data stream. In embodiments, a master controller and/or the nodes in the mesh network that are handling the streaming information may select the highest speed path available for transmission of the streaming data. For example, the streaming data may reach a node and the node may have the ability to pass the information to anyone of a plurality of nodes because the plurality is in range. The node may determine that one of the plurality is a high speed node and select that node for receiving the next data transmission. Once a high-speed path from source to ultimate receiver is determined, the routing information for the high-speed path may be saved and used for later transmissions requiring high-speed transmissions.

In embodiments, a number of methods and systems may be used for large data file transmission. For example, large data files, such as text files, audio files, video files, and like, may be transferred in a single block of data for an end-processing element to utilize when a transfer is complete. A large file may also be transferred in such a way that the end-processing element buffers the incoming data, and after a short delay, begins to utilize the data before the transfer is complete. A large data file may also be transferred in such a way that the data is sent to the user in real-time, or near real-time.

Transferring a large data file, which may not be used immediately by the end-processing element, may be transferred as a single block of data. An example of this may be a television guide that is distributed to end-processing elements once a day for subsequent use. The lack of immediacy of this task may allow the sending unit to schedule the transfer when bandwidth is available, transfer the data with or without data compression, and data may only need to be stored, reducing processing requirements. This method of transferring a large data file may be the least burdensome for the processing elements, but may not be the best choice for large data files that may require immediate action, such as real-time audio and video files.

In embodiments, a large data file may be transferred for immediate use based at least in part on buffering the data at the receiving end of the transfer. This method is often referred to as progressive downloading or pseudo-streaming, and may not be fundamentally different from other methods for transferring data for subsequent use. As a result, the same data transfer protocols that the sending processing element uses for small data transfers may be utilized for progressive downloading. The data file may also be retained after transfer to the end-processing element. One addition to the end-processing element, in order to aid in the immediate use of the data by the user, is the addition of a data-buffering layer between the input from the source and the output to the user. As long as the available bandwidth during data transfer between processing elements is not less than the required data rate to the user, the user may not be aware that the data transfer is still ongoing while the initial data is being used. When available bandwidth during transfer is predicted to be less than that of the user, data compression may be employed to reduce the throughput requirement. Data compression rates may vary from low, for lossless data compression schemes, through high, for lossy data compression schemes. In general, the receiving data buffer may also be expanded as an alternative to the need for lossy data compression. This method generally maintains a high quality of file transfer, while allowing the user to begin using a file prior to it's completed download.

Another method for transferring a large data file for immediate use may involve the real-time transfer of data between the source and the user. This method is often referred to as streaming data. The process of transferring data in real-time may require unique data transfer protocols from those used in non-real-time file transfers. Data transferred in real-time may have to conform to predetermined data transfer rates. Audio and video are both examples where the real-time data rates are predetermined. In addition, when these predetermined data rates cannot be met by the source, data may have to be sacrificed in order to maintain the real-time data steam rate. For example, lossy data compression rates may have to be varied as bandwidth in the transfer medium becomes reduced. The increased data compression rates may reduce the quality of the real-time data, such as reduced quality audio or and increased graininess of a video file output. Another example may be the dropping of short portions of an audio stream, the reduction of the size of a video output, or the momentary freezing of a web-cast. These issues with streaming may be offset by the advantages of being able to skip around in a video file without waiting for a download to complete, or having the ability to monitor a scene real-time. In addition, since the data rates are known, being either predetermined or through communication between the send and receive processing elements, the sending processor element may be able to more effectively utilize available bandwidth. The end-processor element may also have no need to store the data it is receiving, and so memory storage may be reduced. This method is generally utilized when real-time data is a higher priority than the quality of the data transferred.

RF transceiver 802 benefits with improved sensitivity by employing a demodulator correlation function. The demodulator detects the frequency of the FSK input signal by counting clock pulses between positive zero-crosses. In order to separate the two input frequencies an average filter is run on the input signal. The DC is subtracted from the input signal and the result is sampled into a delay chain of registers. The demodulator then correlates this signal history to the pattern of the known NRZ/Manchester symbols. For NRZ the correlation value is computed as the sum of the sampled input signal over one NRZ bit period. For Manchester the correlation value is computed at the sum of the first half Manchester bit period minus the sum of the second half bit period. The bit slicing is performed by checking the sign of the correlation function at the rising edge of the recovered clock. This results in improved sensitivity.

Figure 29:
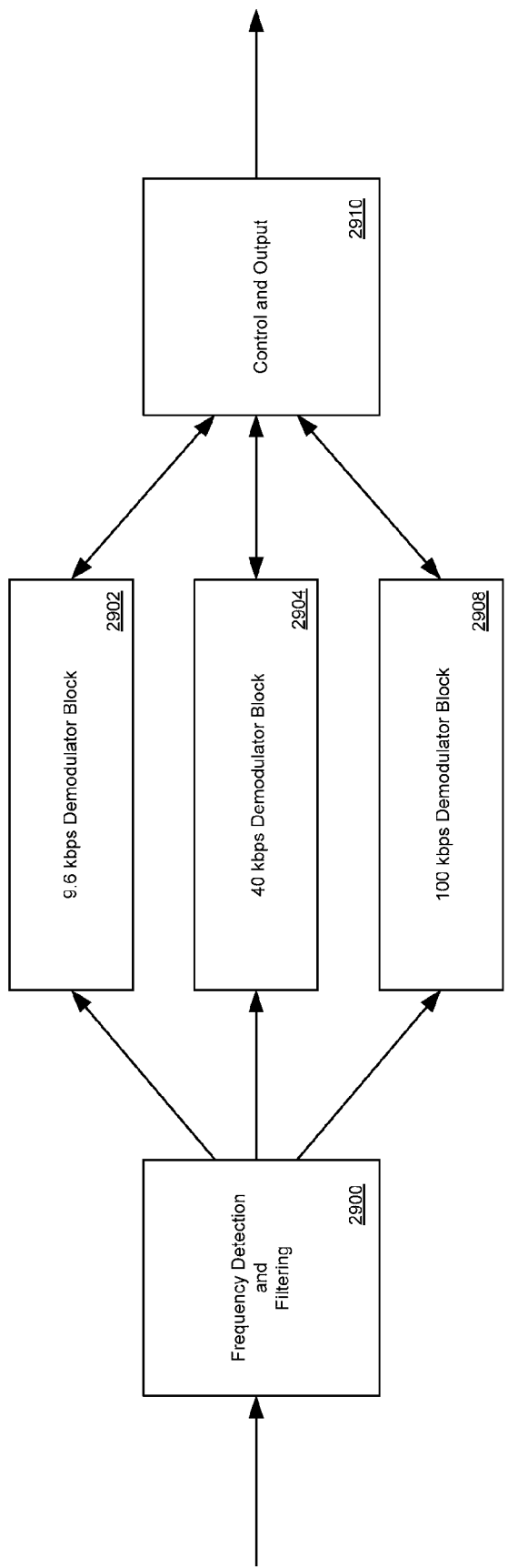
FIG. 29 illustrates a multi-speed demodulator.

In embodiments, a demodulator, such as that illustrated in FIG. 29, may be designed so that it can detect Manchester (MCH) code at 9.6 kbit/s 2902 and NRZ code at 40 kbit/s 2904 and 100 kbps 2908. It may be set in three different modes: (i) to detect and receive only MCH data (9.6 kbit/s) 2902; (ii) to detect and receive only NRZ data (40 kbit/s) 2904; or to detect and receive only NRZ data (100 kbit/s) 2908.

In embodiments, when a demodulator is in an auto mode, both MCH and NRZ data may be detected. Once a frame is detected as either MCH or NRZ, the demodulator may switch to this mode and start receiving data in an auto mode. In the auto mode the demodulator must simultaneously listen for Manchester (MCH) code at 9.6 kbit/s 2902 and NRZ code at 40 kbit/s 2904 and 100 kbps 2908. In order to do this the demodulator may contain three detectors, one for MCH and two for NRZ. However some part of the demodulator may be common for both detectors, such as the IF detection 2900, filtering 2900, and the control of the demodulator 2910.

RF communication error detection may be improved by the use of CRC16, or other similar robust error detection techniques, on elements of the communication signal including Z-wave frames.

Referring further to FIG. 9, transceiver 802 may transmit using a modulation frequency that is asymmetrical to a reference carrier/local oscillator frequency, resulting in a transmit frequency that is not supported by the reference frequency synthesizer. By supporting asymmetric radio frequency signal modulation, transceiver 802 has the ability to transmit on a frequency not supported by the frequency synthesizer.

Referring to FIG. 9A, a waveform diagram representing selection of asymmetric modulation, if offset control 910 is set at its center frequency 920 during settling of PLL 930, modulation 940 will go to both sides of PLL 930 frequency. As an example, this may correspond to binary FSK with a carrier frequency at an integer multiple of 200 kHz.

Referring to FIG. 9B, if offset control 910 is set at the zero symbol setting 950 during settling of PLL 930 then modulation 940 will only go to an upper side of PLL 930 frequency. As an example, this may correspond to binary FSK with a carrier frequency at half the modulation separation above an integer multiple of 200 kHz or N×200 kHz+20 kHz to N×200 kHz+25 kHz. Benefits of asymmetric modulation include the ability to transmit on a frequency not supported by the frequency synthesizer.

RF transceiver 802 may include a Phase Lock Loop (PLL) which may be synchronized while the system is powering up. Such synchronization may reduce locking time, afford faster RF turn-on, and lower power consumption PLL divider synchronization at start-up to reduces locking time. The VCO frequency is divided by a circuit denoted as the PLL divider, into a signal that matches a well defined reference signal. The reference signal is generated from the system clock and can be optionally 100 kHz or 200 kHz. During calibration, the center frequency of a Voltage Controlled Oscillator is adjusted so that the divided frequency after calibration is very close to the reference frequency. After calibration a PLL fine-tunes the divided VCO signal so that it locks completely onto the reference signal.

In order to minimize VCO lock settling time, the PLL and the reference signal are disabled and then released simultaneously after calibration. The result of simultaneous release is a synchronization action where both signals start at the beginning of their high period. The synchronization between the signals minimizes the PLL settling time, resulting in faster turn-on of radio, and lower power consumption.

RF transceiver 802 includes an RF transmitter including a transmitter digital to analog converter, which delivers the benefit of reduced cost. The transmitter chain contains a D/A converter, which has two functions. The first is to convert the digital encoded bit symbols to analog signals, and the second is to set the transmission power of the transmitted RF signal, since the D/A converter is followed by a fixed gain PA amplifier. The D/A converter is a digital symbol to sine-voltage converter. Each output voltage of the D/A is a discrete step on a sine-curve which is selected by the digital value on the input. A thermometer coded signal is applied, and each value of the input signal selects a step on the sine wave. Counting from 0 to 31 and back again is therefore generating a full sine-period. The advantage of having sine-sized D/A steps is, that a low number of control-bits can generate a high resolution sine-wave. Further more, the amplitude of the sine-wave is controllable, which means, that the transmission strength of the RF signal is set in the D/A.

Figure 9C:
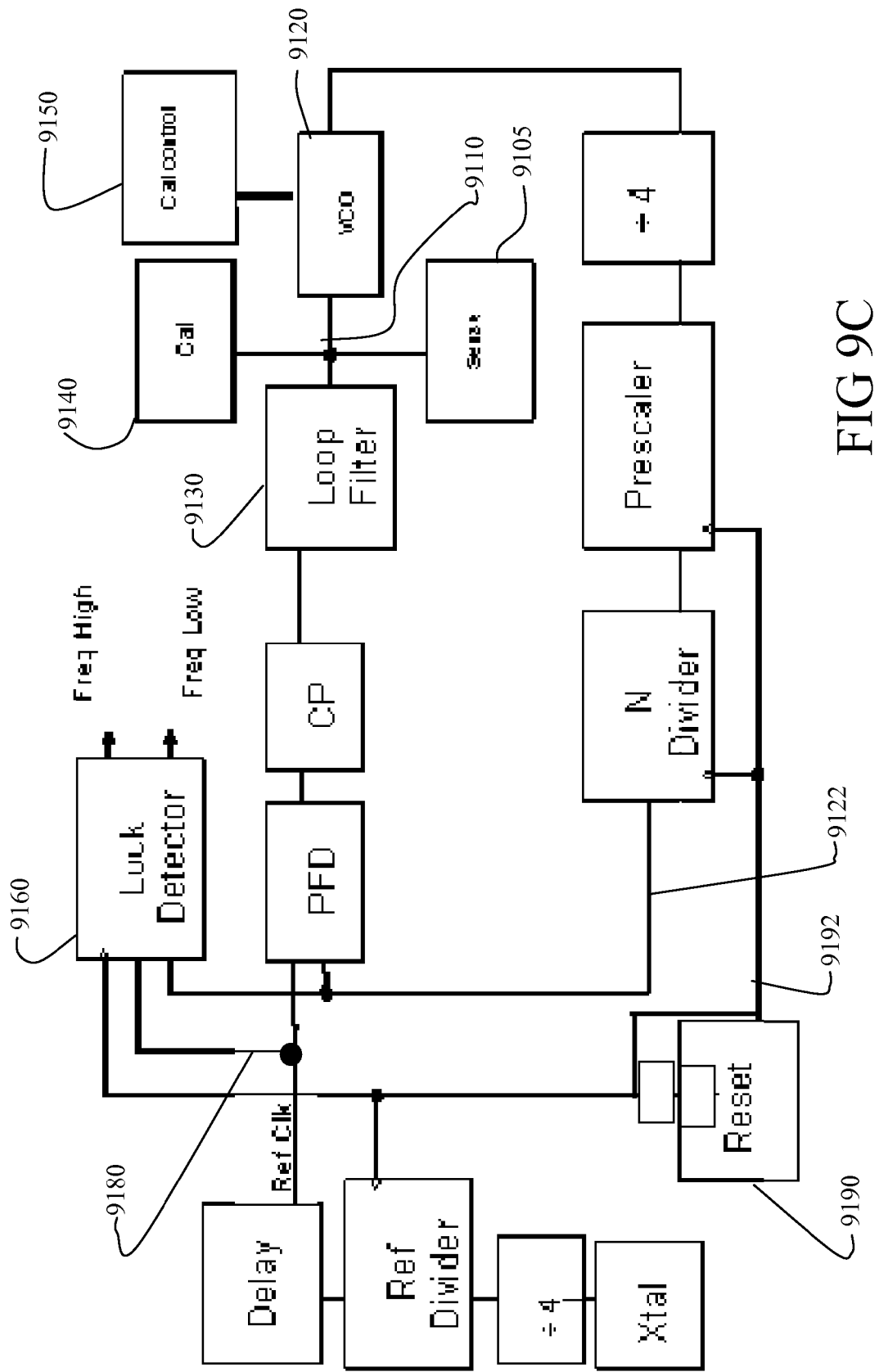
FIG. 9C is a block diagram of the Phase-Lock-Loop functionality of the invention.

Referring to FIG. 9C, VCO frequency calibration ensures that an analogue control voltage 9110 input to VCO 9120 is preferably within a narrow range and compensates for variation of on-chip capacitance which affects VCO 9120. During calibration, PLL loop filter 9130 is opened and Cal block 9140 sets VCO control voltage 9110 to a predetermined value. A calibration control block 9150 may adjust the frequency of VCO 9120 by changing capacitance values internal to VCO 9120.

Figure 9D:
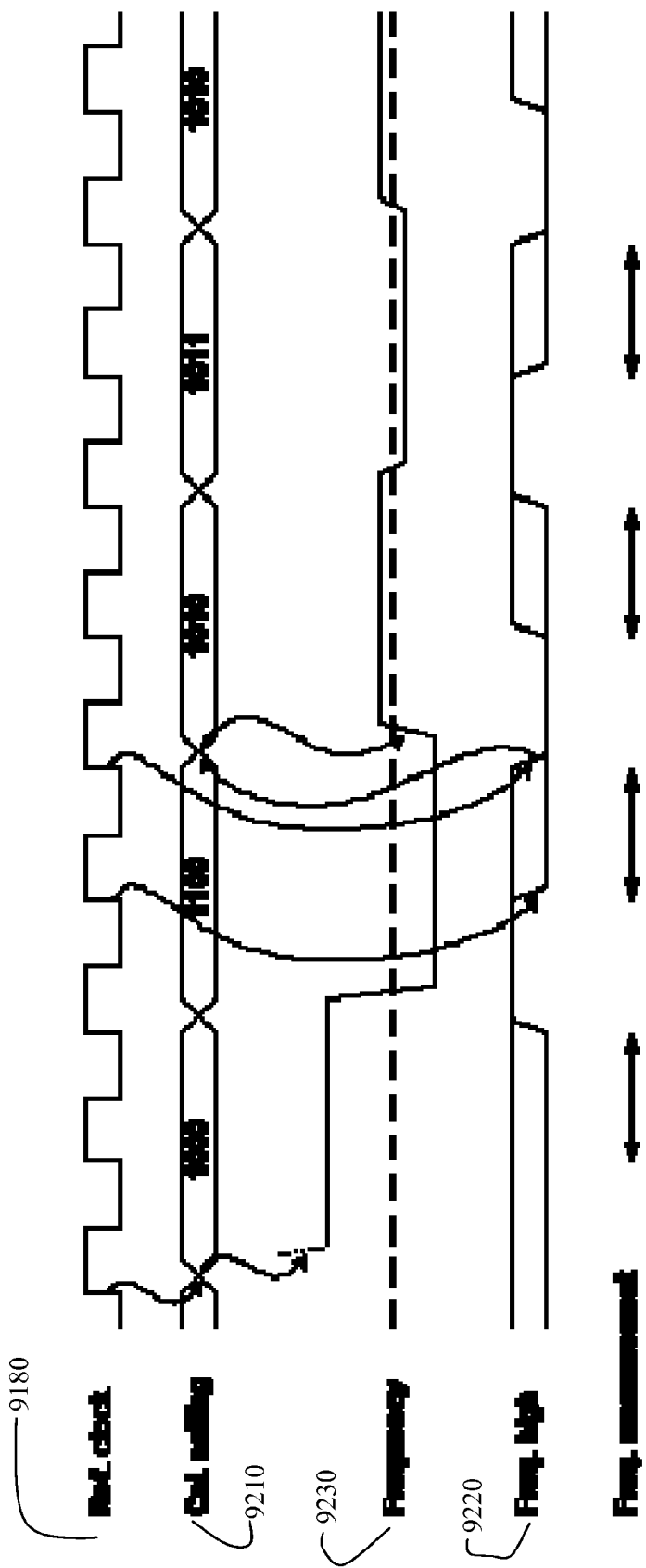
FIG. 9D is a timing diagram of the sequence for frequency calibration.

Referring further to FIG. 9D, for various cal control 9150 settings of VCO 9120 capacitors, output frequency of VCO 9120 is measured by using a lock detector 9160. After resetting of the different dividers to synchronize all blocks, lock detector 9160 may compare a subdivided version 9122 of VCO 9120 output frequency to a reference clock 9180. By using a successive approximation approach the correct calibration setting can be determined in very few reference clock 9180 cycles. FREQ High and FREQ Low bits generated by lock detector 9160 are used in calibration control circuit 9150 to indicate if VCO 9120 frequency is too high or too low.

To ensure the PLL locks precisely onto a predetermined frequency, reference clock 9180 and subdivided VCO output 9122 are preferably synchronously released. In embodiments, reset circuit 9190 may automatically issue synchronous reset signal 9192 upon receiving a signal from calibration control 9150. Alternatively, a software accessible control register can be used to signal reset circuit 9190 to issue synchronous reset signal 9192.

FIG. 9D illustrates a calibration sequence wherein 4 bits of calibration control information 9210 is passed from calibration control circuit 9150 to VCO 9120 (as shown in FIG. 9C). For each calibration information 9210 setting, freq high signal 9220 may respond on a rising edge of reference clock 9180, further enabling a change in calibration information 9210 setting. This sequence repeats until PLL frequency 9230 is substantially close to a predetermined value.

Figure 9E:
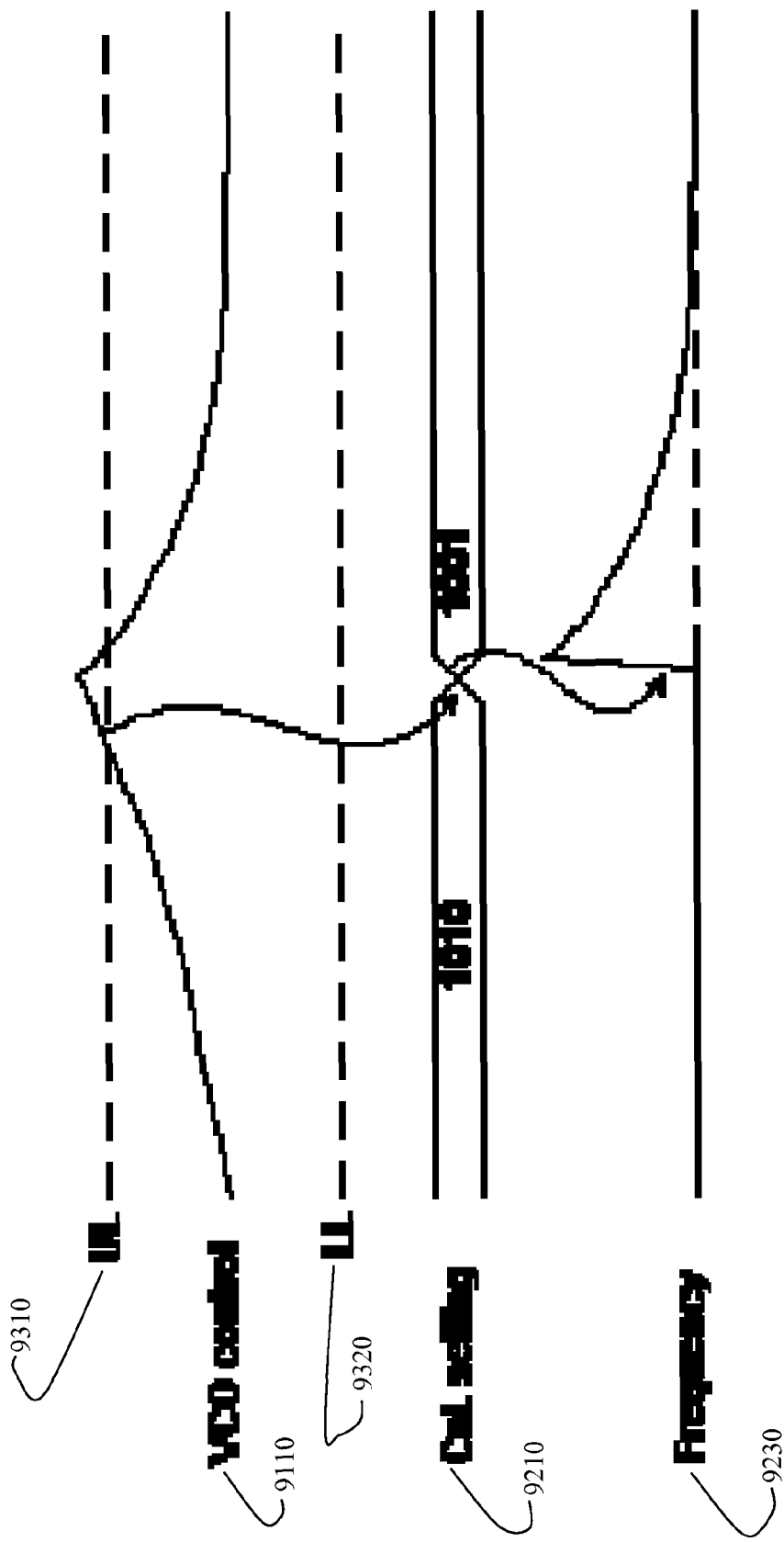
FIG. 9E is a waveform of VCO automatic self-calibration.

Referring to FIG. 9C and FIG. 9E, in receive mode during periods when no preamble or SOF has been detected and no data is currently being received, calibration control 9150 may adjust calibration setting whenever VCO control voltage 9110 has changed significantly. This function is done by sense block 9105 by comparing VCO control voltage 9110 with an upper limit 9310, and a lower limit 9320. As illustrated in the diagram in FIG. 9E, VCO control voltage 9110 may be monitored continuously such that when it falls outside sense block 9105 limits, calibration control 9150 adjusts calibration information setting 9210. In embodiments, a sudden change in calibration control 9150 output will result in PLL 9230 loosing lock, therefore calibration control 9150 may be disabled until lock detector 9160 indicates that PLL 9230 has settled again.

Additionally, voltage controlled oscillator (VCO) calibration may use portions of the PLL, thereby reducing hardware resources and cost. Additionally cost is reduced by IF calibration. In order to counteract the natural variation in resistors and capacitors, the IF filters of the ZW0201 has programmable resistors, which are set during a calibration process. This calibration process is able to reduce the variation of the IF filter center frequency, and this helps relax the requirements to the system clock. The calibration is performed using the components of the IF filter. The procedure is like this: One capacitor is discharged and another is charged. The voltages across the capacitors are compared, and when they cross each other, the charge/discharge time is recorded (as being the time from start of the process until the voltages cross each other). The two capacitors are reset, the programmable resistors of the IF filter is changed, and another charge/discharge sequence is done. Four charge/discharge periods are performed, and resistors are changed during each period, which results in a resistor setting that has a optimal charge/discharge period.

The single chip embodiment of FIG. 8 contains an embedded MCU 830. One example of a preferred MCU is embedded 8051 MCU core (Inventra M8051 Warp) including two standard 8051 timer/counters 804. MCU830 may be compatible with industry standard 803x/805x MCUs. The single chip solution may allow for optimisation of MCU 830. MCU 830 of the embodiment of FIG. 8 completes one instruction cycle per two clock cycles as opposed to a standard 8051 with 12 clock cycles per instruction cycle. This makes MCU 830 six times faster than the standard 8051.

Figure 10:
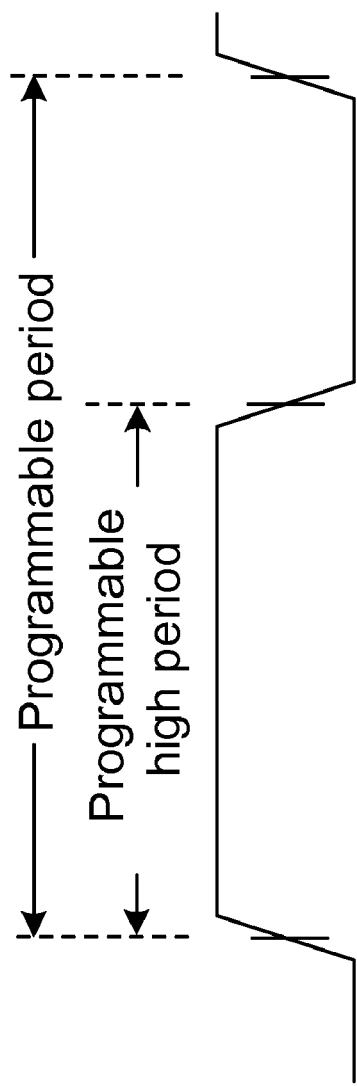
FIG. 10 illustrates a timing diagram of a pulse width modulated output (PWM)

Referring to FIG. 10, a timing diagram of a pulse width modulated output (PWM), general purpose timer 804 is a timer that may be polled or programmed to generate interrupts. Timer 804 may be an auto-reload counter with a fixed clock divider ratio. The timer of the single chip solution of FIG. 8 uses a 16-bit timer that may be an auto-reload counter with a fixed clock divider ratio of either 4 or 512. Timer 804 may also be set in Pulse Width Modulation (PWM) mode. The PWM may be controlled by setting the total period and the total high period. This embodiment utilizes an 8-bit register to set the total period and an 8-bit register to set the high period, therefore timer 804 counts using a fixed clock divider ratio of either 4 or 512.

Wake up timer 838 may be an ultra low power timer that may be enabled in a sleep mode or power down mode to wake up MCU 830 after a programmable time period. The sleep period may be configurable in number of seconds, such as in a range of 1 to 256 seconds. Wake up timer 838 is based on an internal oscillator that may be automatically calibrated against the system clock. IN the preferred embodiment of FIG. 10, wake up timer 838 may automatically calibrate during power-down mode, resulting in an easier to use system that automatically calibrates under the same conditions as when operating.

Special function registers 840 may contain registers that are used to control MCU 830 operating mode, and the operating mode of built-in peripherals.

Various memory technologies may be used for MCU program store, application store, and for internal/external data storage. In the preferred embodiment of FIG. 8, two types of memory are used.

A 32 kbytes of flash memory 828 is MCU 830 program memory containing mesh network 100 API and customer application software. MCU 830 also has the ability to read, write and erase the flash memory 828. Flash memory 828 has a built-in read back protection in order to prevent reverse engineering or design theft. Clearing a dedicated lock bit in flash memory 828 activates the read back protection. As long as the lock bit is cleared it is not possible to read from the flash memory 828 externally. Other lock bits may protect parts of the flash against writing. The lock bits may only be unlocked by erasing the entire flash memory.

256 bytes of Internal Random Access Memory (IRAM) 832 may be used by MCU 830 for 8051 internal data memory, and may also be accessed through direct instructions from MCU 830.

2 kbytes of External Random Access Memory (XRAM) 832 may be used by MCU 830 as 8051 external data memory. The single chip implementation of FIG. 8 may contain an interrupt controller 818, supporting 10 interrupt sources including two external interrupt sources on through General Purpose I/O's. Some of the interrupt sources may be reserved by the mesh network API. The Interrupt Controller controls the interrupt priority assignment. The priority may be fixed by the mesh network protocol. The external interrupt may also be enabled to wake up the chip from Sleep mode. The single chip implementation of FIG. 8 may further contain a Triac Controller 820 for power regulating applications. Triac Controller 820 may be compatible with 50-60 Hz external alternating current power. Using an external Triac and a few extra external passive components a complete phase control circuit may be designed. Triac controller 820 may be implemented in a separate circuit within the single chip in order to keep timing and operation independent of software and to minimise MCU 830 workload.

In embodiments, a Triac controller within an integrated circuit mesh network node may be used to deliver power to a load, wherein timing of the power delivery is based at least in part on a zero crossing point of an AC power signal. The load may be a resistive load or a non-resistive load (e.g., an inductive load). The power delivery may be based at least in part on a fire angle. The power delivery may be initiated in coordination with a fire angle. The power delivery may be terminated in coordination with the zero crossing point. In embodiments, the Triac controller may be associated with a noise mask adapted to reduce false indications of zero crossing.

The mesh network node 100 may contain an analog-to-digital converter (ADC) 822 with a resolution that may be set to 8-bit or 12-bit. An 8-bit conversion takes less than half the time of a 12-bit conversion. ADC 822 may be rail-to-rail and programmed to refer to various internal or external voltage references. The ADC block may include a battery-monitoring mode. ADC 822 may support both single and continuous multi conversion mode. ADC 822 may have a built-in comparator for generating interrupts when a threshold set by software is exceeded. The threshold may be either a low threshold or a high threshold. It is possible to shut down ADC 822 for reducing power consumption. ADC 822 also includes self-test capability, which may reduce test related costs.

The 8-bit part of the ADC is tested for missing codes, mismatch and missing connections in a simple and fast way. The precision of the test is better than ½ LSB. The 8 bit part of the LSB is made of 9 capacitors, 8 capacitors having an individual size ratio, which is binary, and 1 capacitor having the unit size. The largest of the 8 capacitors is $2^7$ units large, called C0, the next is $2^6$, called C1, down to C7, which is $2^0$ units large. The 9.th capacitor, having the unit size 1, is called Cs (for stationary). The capacitors presence and size ratio is tested by testing C0 against C1+C2+ ... C7+Cs and adding an extra test-capacitor having the size of ½ unit. Since C0 is =C1+C2+ ... C7+Cs, adding the extra ½ 1 sb capacitor (called Cc) ensures that the term. C1+C2+ ... C7+Cs+Cc is now for sure larger than C0. If any capacitor units misses in any of the 9 capacitors (C0 ... C7+Cs), the test will fail. Next, C1 is tested against C2+ ... C7+Cs, etc. The test is very fast to perform and does not require any high precision external stimuli or conventional ADC conversion cycles. If this test should be performed in a normal fashion, 256 ADC conversions with an input voltage ranging from 0V to Vdd would have to be performed. With the new approach, this test time is reduced to app. the time it takes to perform one ADC conversion.

A software programmable interface (SPI) 824 may be included in the implementation. Two examples of how SPI 824 may be used are: 1) to provide external access to the flash memory 828 and 2) to allow mesh network node 100 to communicate with an external memory. The SPI may act as a master or slave when interfacing to memory. For example, network node 100 acts as a master when accessing external Electrically Erasable Read Only Memory (EEPROM) and as a slave when accessing the flash memory 828. External flash memory may also be accessible by MCU 830.

The mesh network node embodiment of FIG. 8 may contain a UART 814 and may operate independent of MCU 830. UART 814 may support full duplex and may operate with the following three baud rates: 9.6 kbaud, 38.4 kbaud, or 115.2 kbaud.

Power Control Block 838 controls node 100's different power saving modes. For example two power saving modes are : Normal Mode and Sleep Mode/Power Down Mode. In Normal Mode MCU 830 is running and the RF circuits and ADC 822 may be powered up or down. Sleep Mode/Power Down Mode may be the lowest power mode, with everything shut down except the RAM's brown-out detection and low power timer. In addition ADC 822 may be powered up or down. In Sleep mode it is possible to wake MCU 830 up using an external interrupt source. The source may be active low or active high. MCU 830 may also be woken by the wake up timer 838, a reset, or by power cycling.

It is also possible to power down MCU 830 while keeping RF transceiver 802 operating, by automatically stopping MCU 830 before powering up RF transceiver 802. Additionally, it is possible to restart MCU 830 when transmission has completed and RF transmitter 802 has been powered down. This sequence of powering up and down these elements reduces power consumption and cuts peak current demand.

Two examples of how this may be executed is: automatically stopping the MCU before powering up the radio and transmitting, and restarting it when transmission has completed and the radio powered down; and automatically stopping the MCU before powering up the radio for reception and automatically powering up the MCU when a signal is received Depending on information frames contained within a signal received by RF transceiver 802, MCU 830 can be automatically powered up. A frame handler coupled to RF transceiver 802 automatically detects Z-wave frames and can automatically generate a signal to power-up MCU 830 or generate an interrupt to MCU 830 if it is already powered-up. The benefit of the frame handler functionality is reduced operating load on MCU 830, lowering memory requirements, and reducing power consumption.

This embodiment also has general-purpose I/O interfaces 808. For example, the ZW0201 has 10 configurable General Purpose I/O (GPIO) pins with optional weak internal pull-up. The GPIO pins may be organized as two ports. The GPIO pins may have dual or even triple functionality, user programmable from MCU and some special hardware functions (for instance SPI 824, ADC 822, UART 814, TRIAC controller 820, etc.). In this implementation four of the GPIO pins may be either analogue (for ADC) or configured for digital interfacing as an input, or output. Reset I/O may also be available. Two examples of reset I/O are 1) External reset and 2) Enable programming mode. For example, when the reset pin is pulled low a master reset is generated. If the reset is held low for an extended period then the chip accepts programming commands on SPI 824. The chip may not go into actual programming mode until an SPI 824 Programming Enable command is received. As an example five dedicated analogue pins are used for RF interface 802 and crystal connections 810. GPIO pins may be set as inputs during reset. This pin configuration may be maintained after the reset is released until the software changes the setting.

By using one or more of the invention interface circuits, an RC-oscillator may be used as a temperature sensor, lowering cost by reusing existing interface circuits for the additional function of sensing temperature. The Wake-up timer internal ring oscillator is designed in a way so the calibration value has a near linear temperature dependency. The calibration depends on temperature, supply voltage and process variation. Fortunately the supply voltage variation can be taken into account by using the built in battery monitoring circuit. The impact of process variation is mostly on the offset value. Consequently if the calibration value is known at a given temperature then the temperature can be estimated at another temperature. This results in the benefit of low cost from reuse of existing circuit as temperature sensor.

Figure 11:
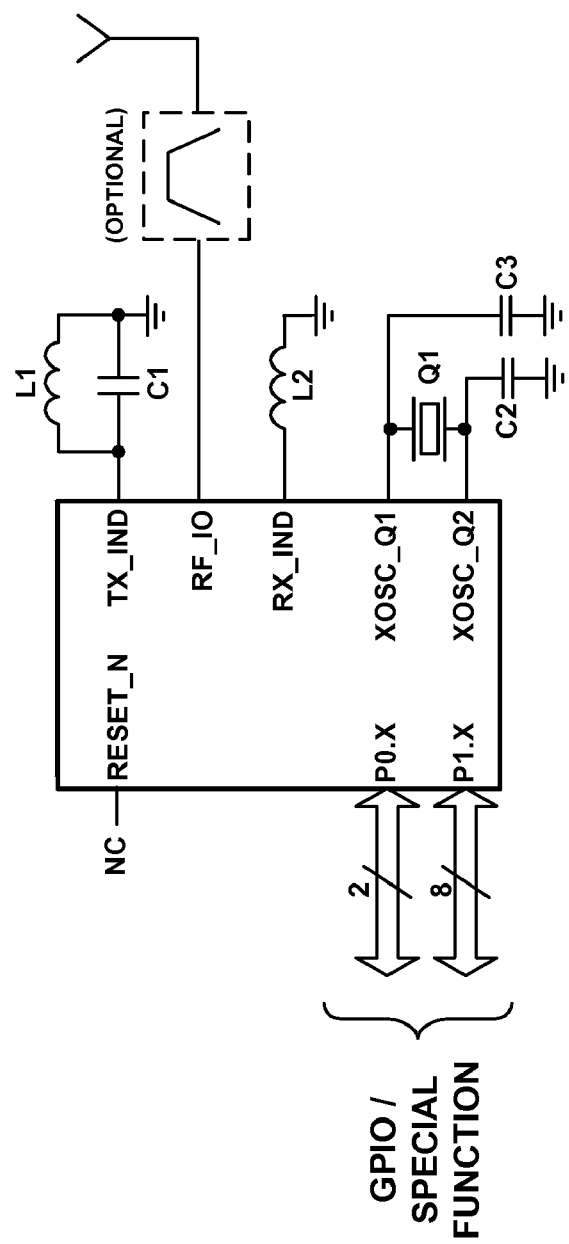
FIG. 11 shows I/O for a typical application circuit.

The single chip 100 implementation may contain a number of external interfaces including general I/O 808, clock signals 810, resets 812, transceiver I/O 802, UART 814, interrupts 818, Triac control 820, ADC 822, SPI 824, and external memory. FIG. 11 shows the I/O for a typical application circuit.

Figure 12:
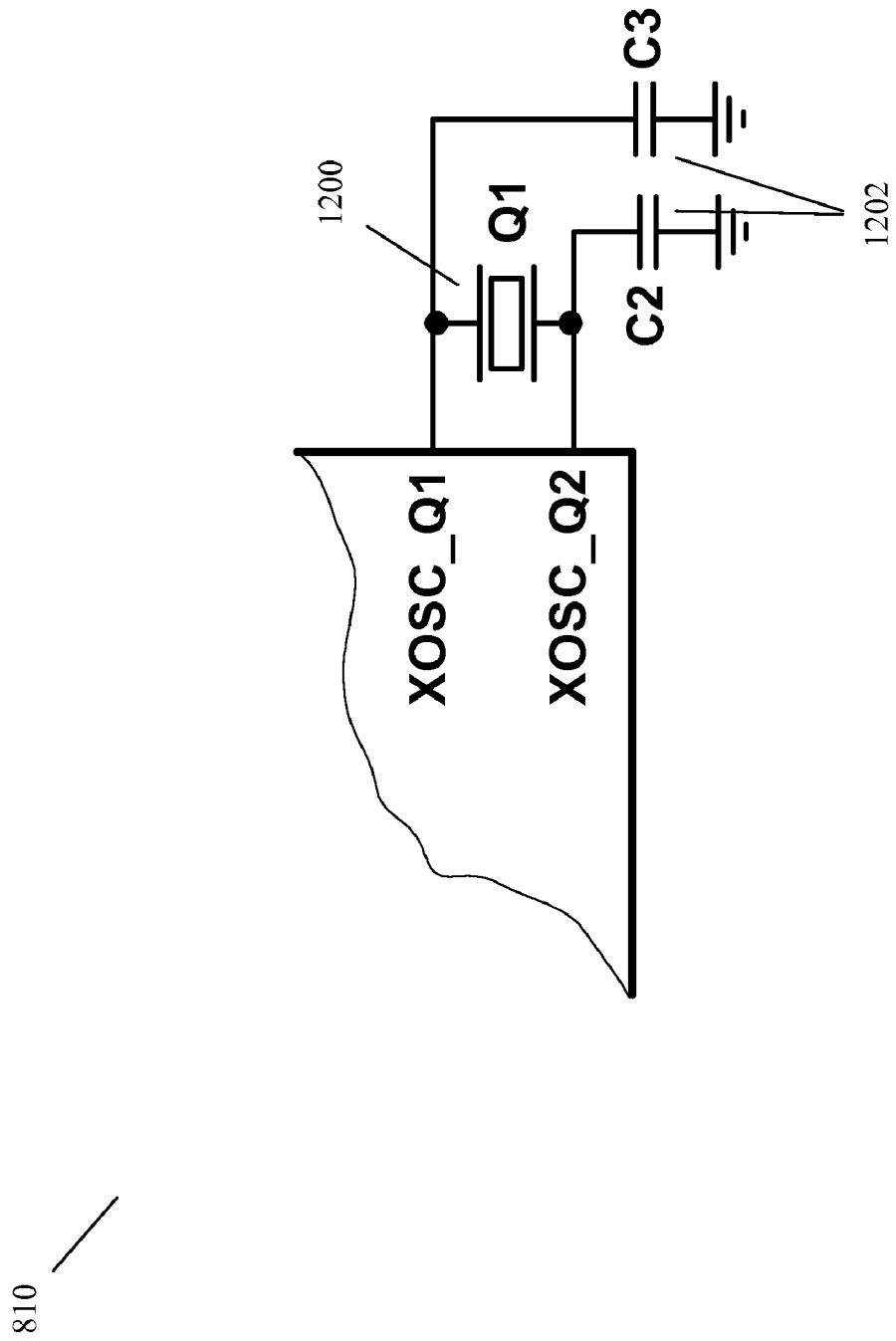
FIG. 12 shows external crystal connections.

Clock signals 810 may require external interfaces. For example FIG. 12 shows external crystal 1200 connections. Node 100 includes an on-chip crystal oscillator making it possible to drive a crystal directly and can operate with either a 32 MHz or a 16 MHz crystal. An external load capacitor 1202 may be required on each terminal of the crystal. The loading capacitor values may depend on the total load capacitance specified for the crystal.

Figure 13:
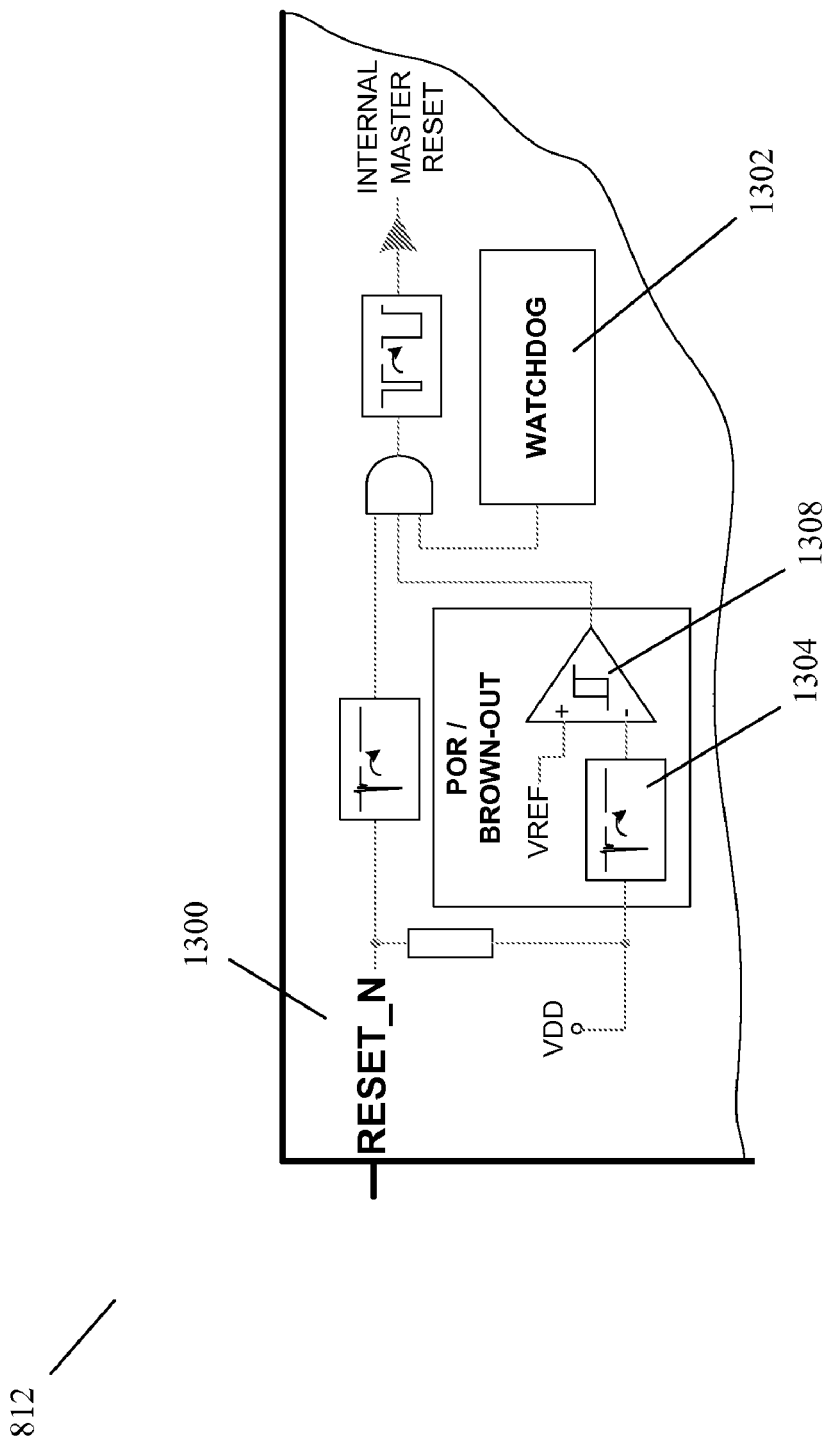
FIG. 13 shows a simplified block diagram of an internal reset circuit.

FIG. 13 shows a simplified block diagram of an internal reset circuit 812. For example all pats of node 100 are reset when one or more of the following conditions are true: 1) Reset 1300 is low, 2) When POR/brown-out detection circuit detects low supply voltage, 3) When WATCHDOG 1302 times out. The reset may be an asynchronous input with internal pull-up, schmitt trigger, and glitch protection. The signal may be synchronized internally so that the reset may be asserted and deasserted asynchronously. The POR circuit may also contain a low pass filter 1304 for glitch protection and hysteresis 1308 for noise and transient stability. In Sleep mode the POR may go into a low power mode that protects the circuit against brown-out while keeping the power consumption at an absolute minimum. During master reset all GPIO 808 pins may be configured as inputs and the RF Transceiver 802 may be set in power down condition.

Figure 14:
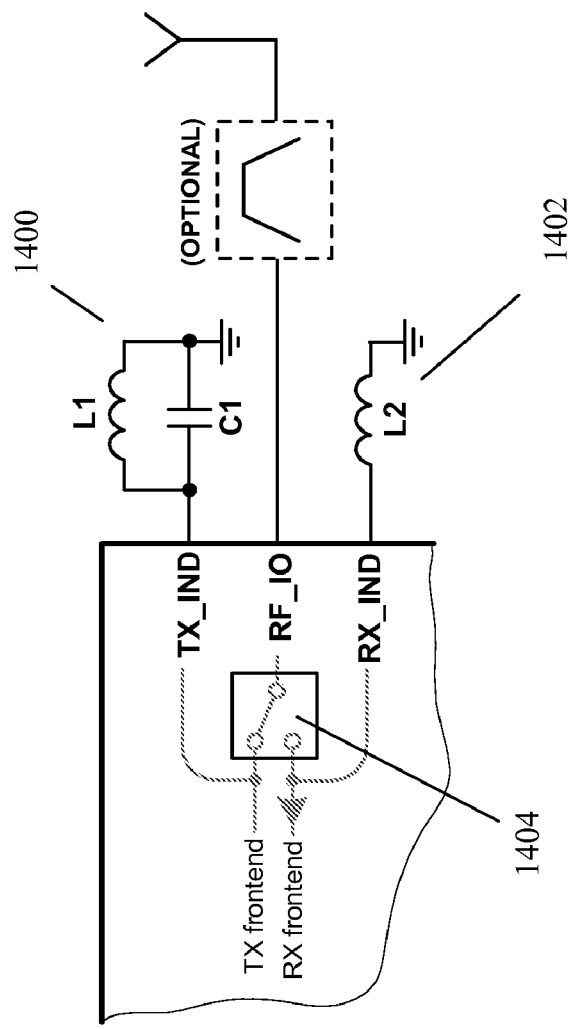
FIG. 14 shows the RF connections in a typical application.

FIG. 14 shows the RF connections in a typical application. RF transceiver 802 may require very few external passive components 1400, 1402 for input and output matching. IN this embodiment an internal T/R switch circuit 1404 makes it possible to match the receive (RX) and transmit (TX) independently. L1/C1 1400 is used for matching the transmitter output to 50 Ω. L2 1402 may be used for matching the receiver input to 50 Ω. The values of the matching components may depend on the actual PCB layout. Moreover the matching components should be placed as close as possible with efficient grounding in order to achieve best performance. Additional external filter components may be added in order to filter the RF harmonics (if necessary) and improve the blocking performance.

Figure 15:
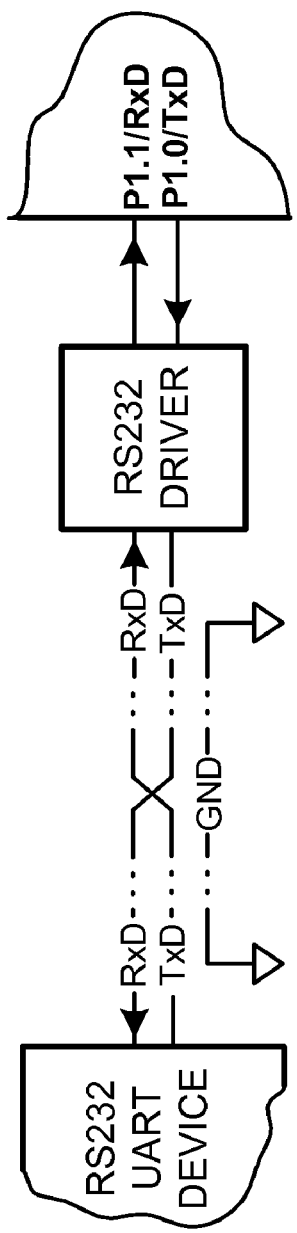
FIG. 15 shows a typical RS232 UART application circuit.
Figure 16:
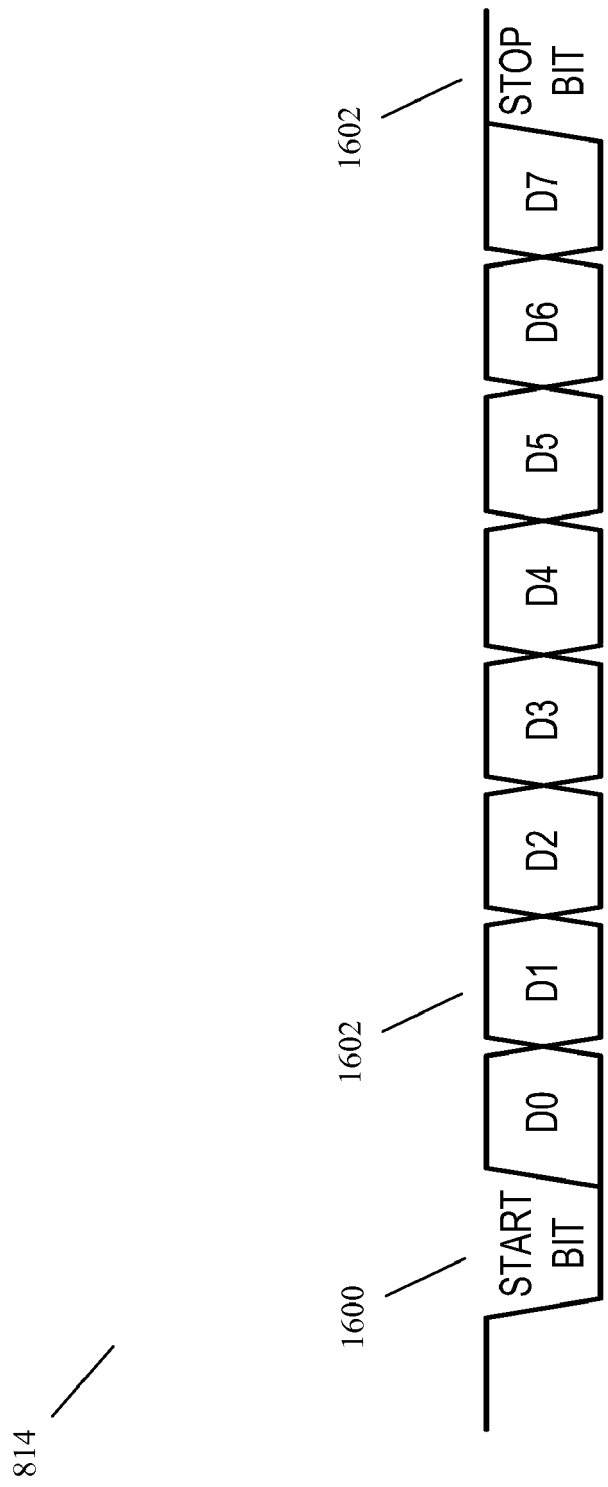
FIG. 16 gives a waveform of a serial byte.

UART 814 interfaces with external components. For example UART 814 interfaces with a data rate of 9.6 kbaud, 38.4 kbaud, or 115.2 kbaud, with 8-bit words, one start bit, one stop bit and no parity. FIG. 15 shows a typical RS232 UART application circuit. FIG. 16 gives a waveform of a serial byte. UART 814 shifts data in and out in the following order: start bit 1600, data bits 1602 (LSB first) and stop bit 1604. For noise rejection, the serial port may establish the content of each received bit by a majority voting on the sampled input. This is especially true for the start bit. If the falling edge on RxD is not verified by the majority voting over the start bit then the serial port stops reception and waits for another falling edge on RxD. After ⅔ of the stop bit time, the serial port waits for another high-to-low transition (start bit) on the RxD pin.

Figure 17:
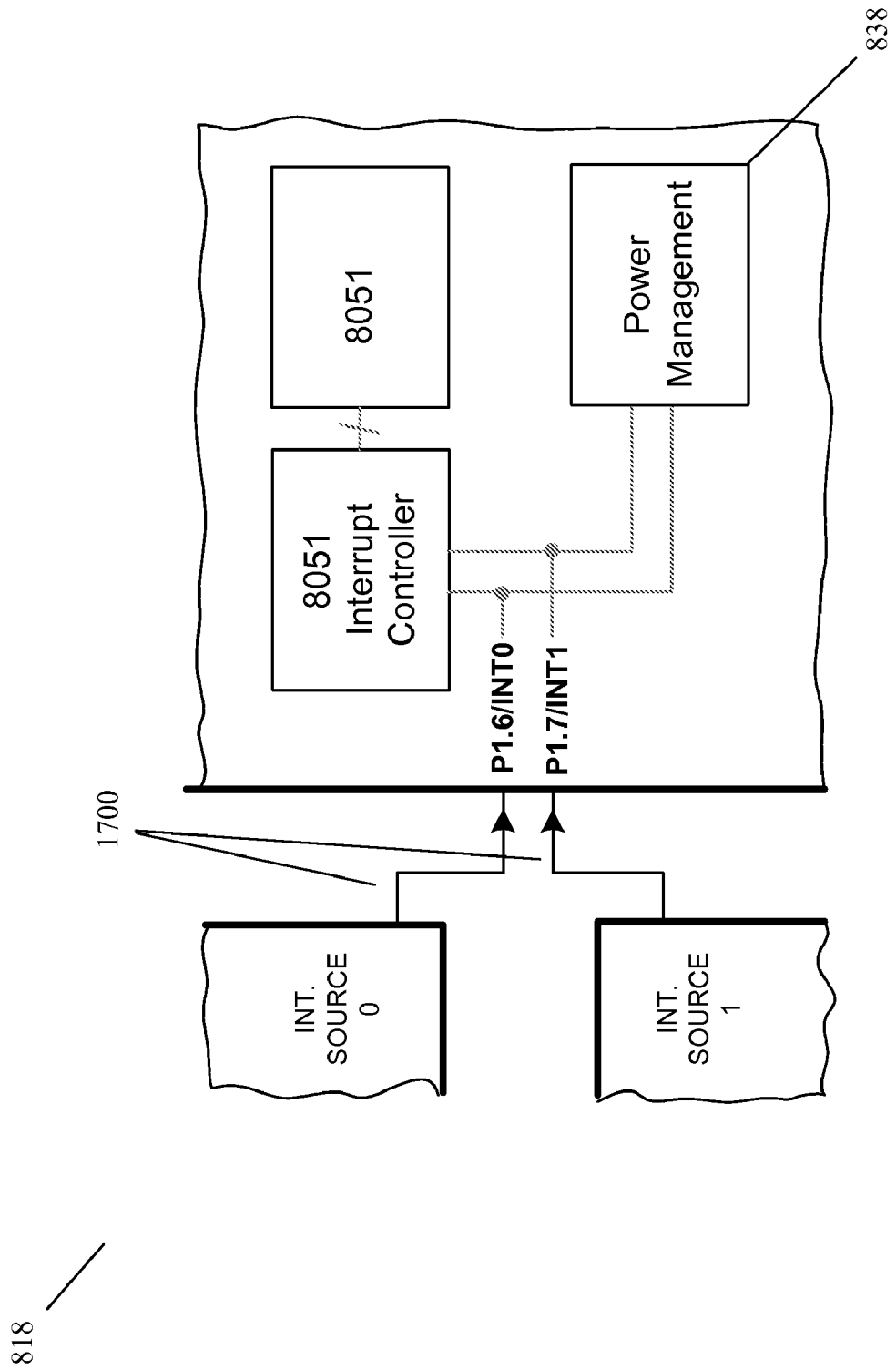
FIG. 17 shows external interrupts.

Single chip embodiment of network node 100 supports external interrupts 818 to MCU 830 as shown in FIG. 17. For example, Interrupts 1700 may be programmed to be either level-triggered (high/low) or edge-triggered (rising/falling). Also, interrupt(s) to Power Management 838 may enable wake up from sleep mode. Interrupts may be used to wake up the chip from sleep mode. The interrupts to the Power Management 838 may be level-triggered (high/low). When the chip wakes up from Sleep mode the clock oscillator may start up before program execution starts.

Figure 18:
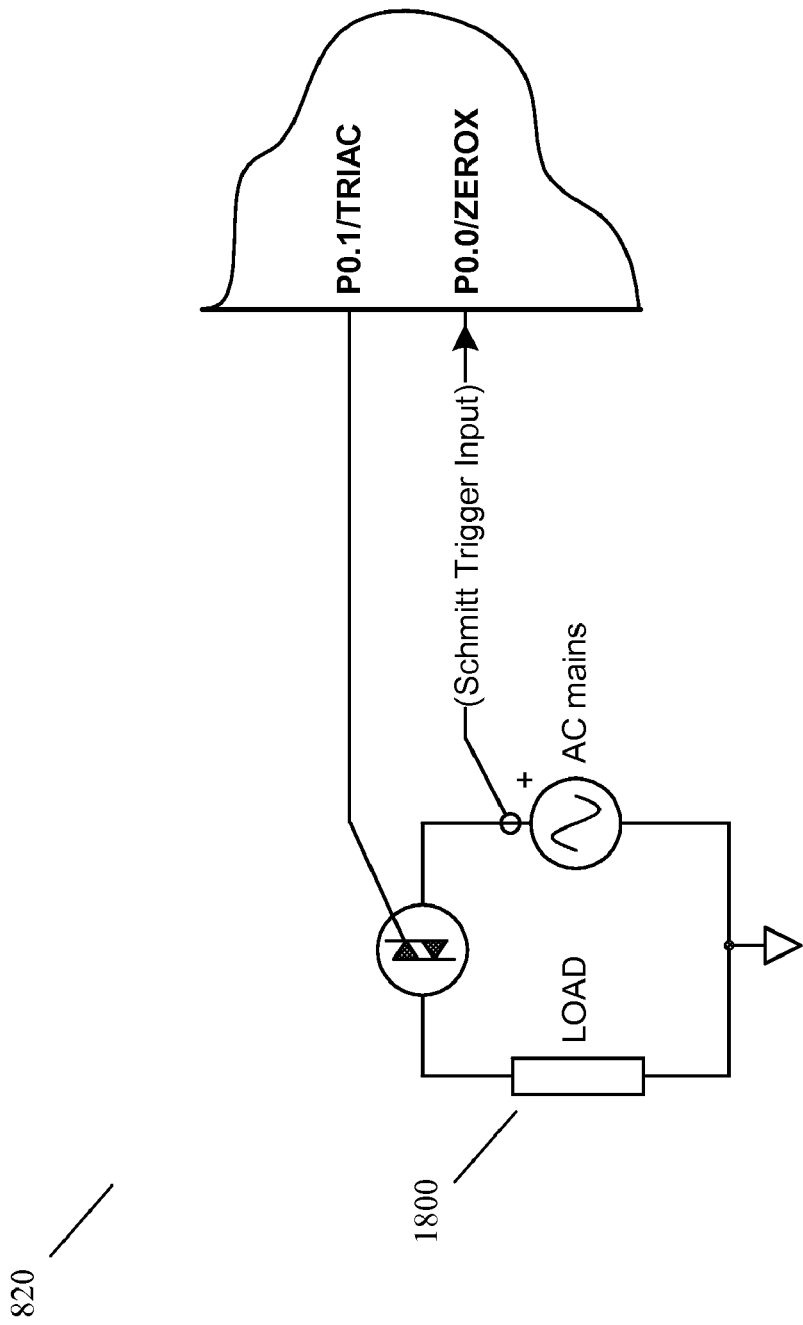
FIG. 18 shows a simplified Triac application circuit.
Figure 19:
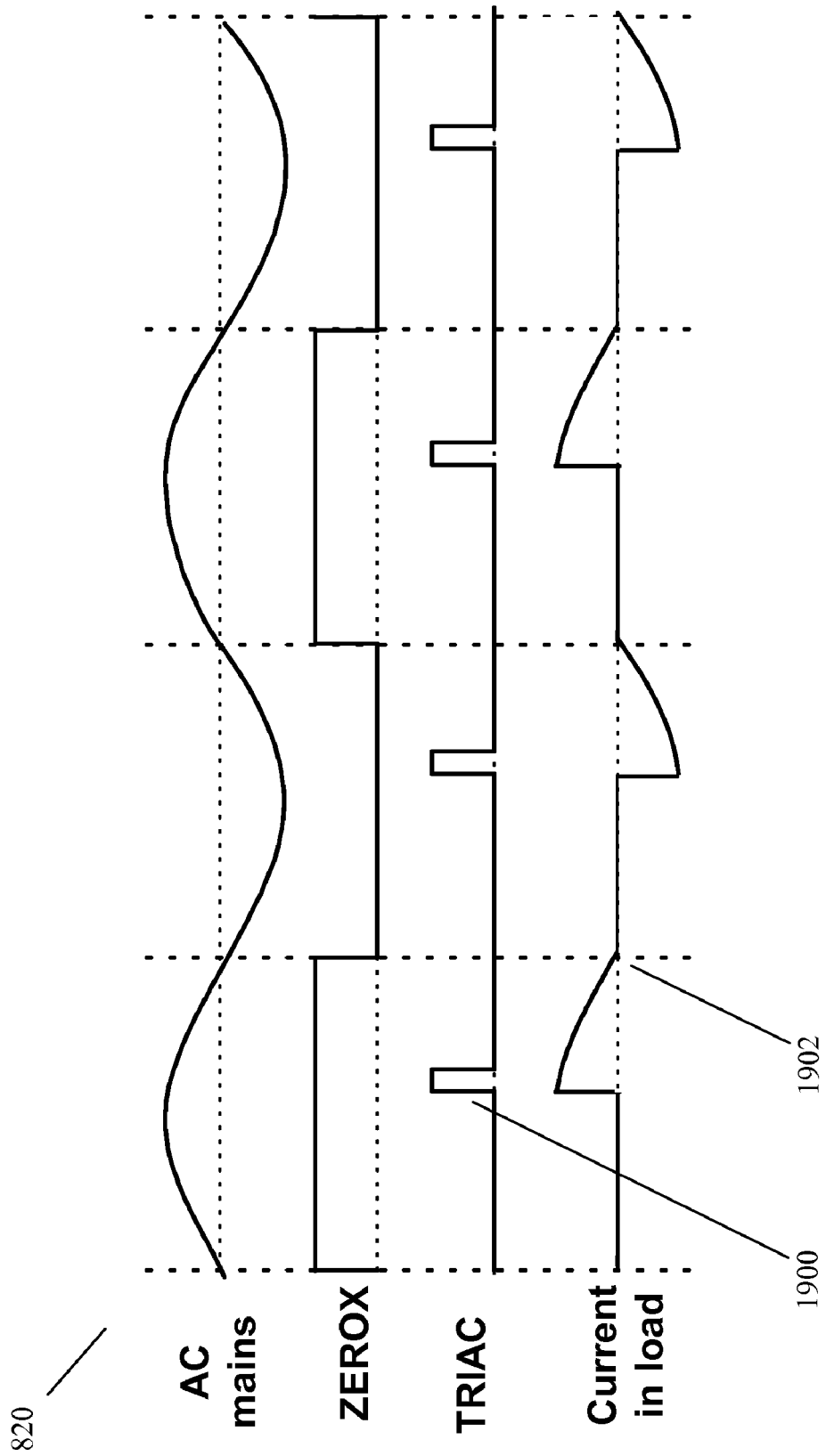
FIG. 19 shows typical Triac waveforms.
Figure 20:
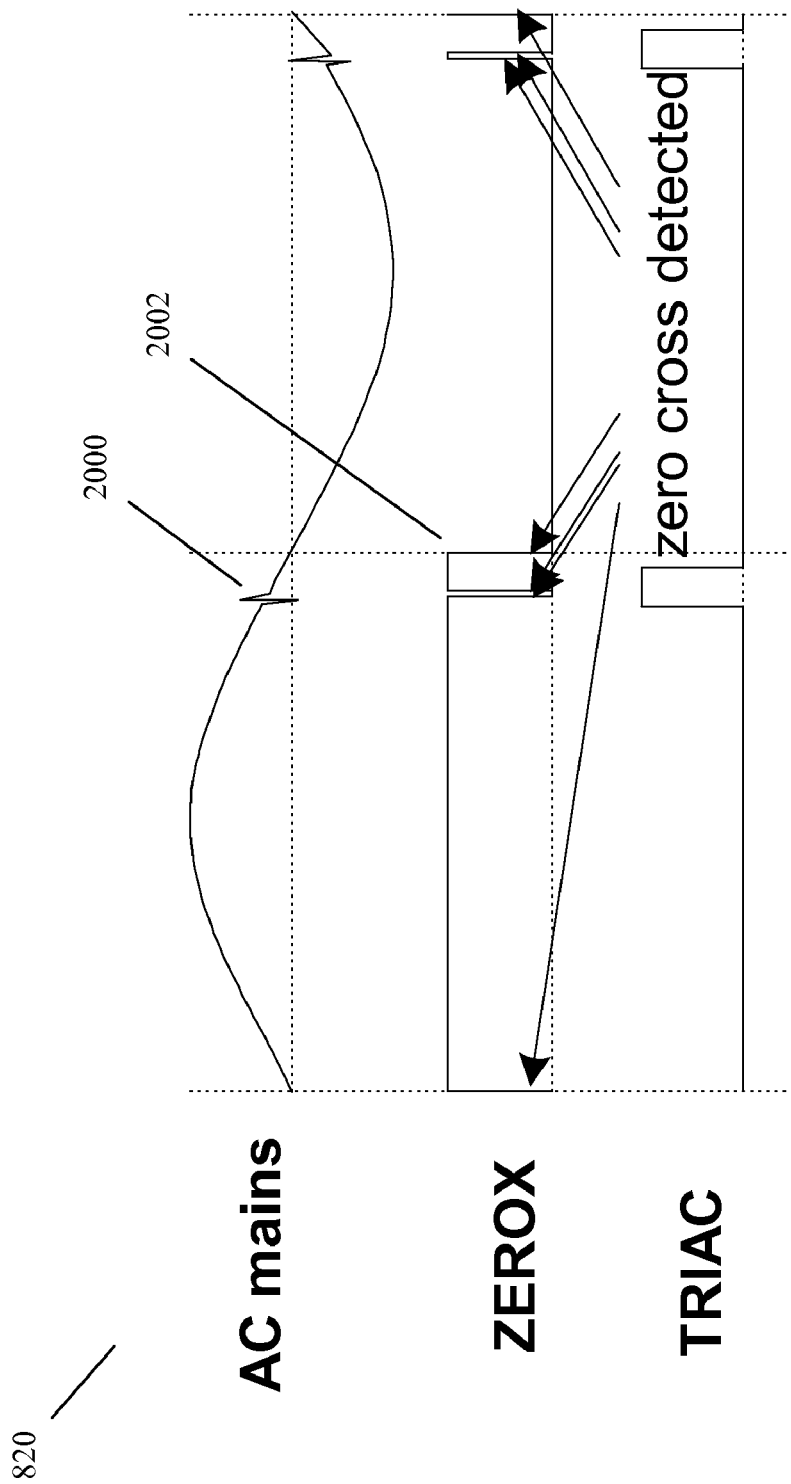
FIG. 20 shows zero cross detection disturbed by noise.
Figure 21:
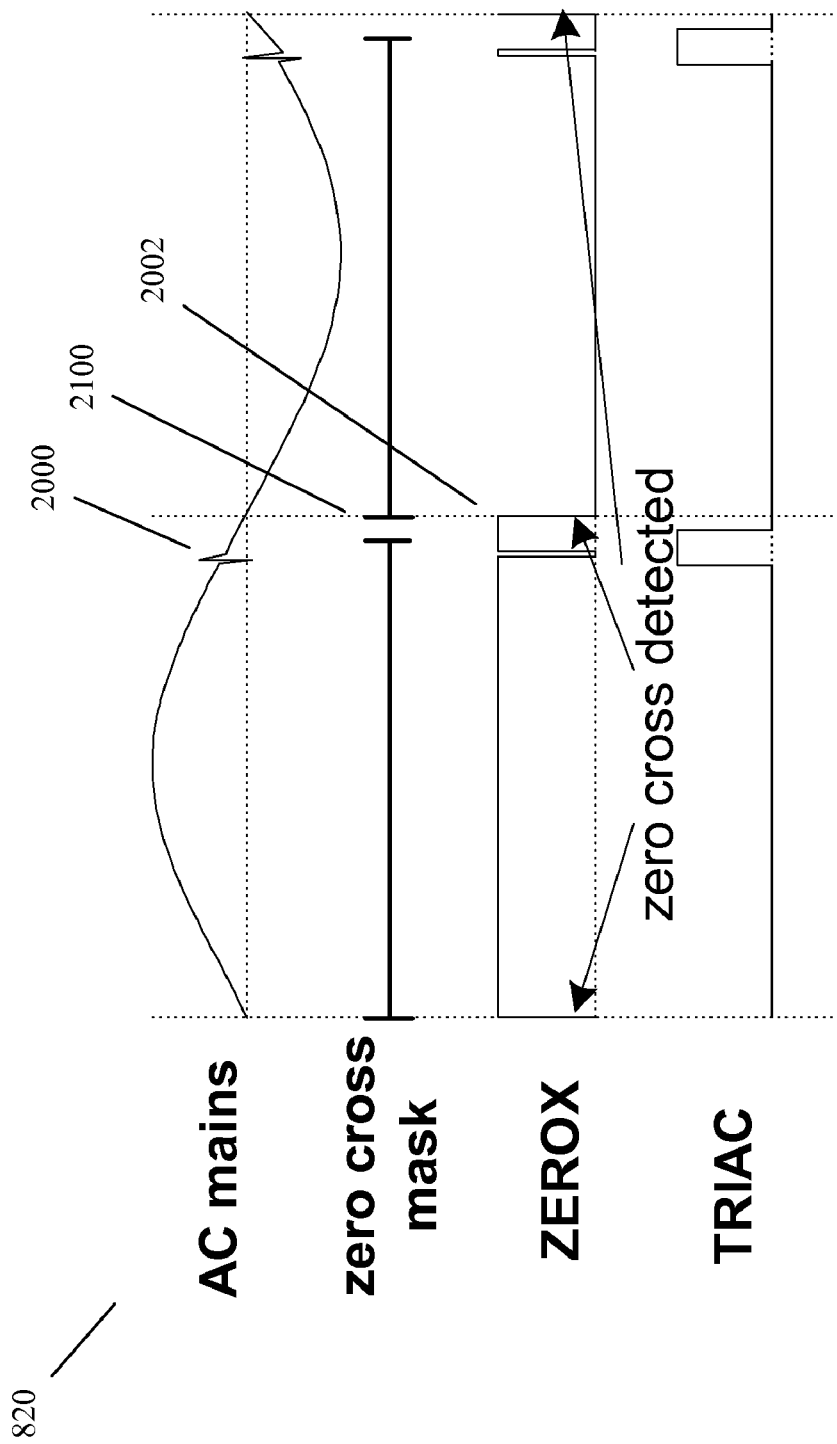
FIG. 21 shows a masking of zero cross detection.
Figure 22:
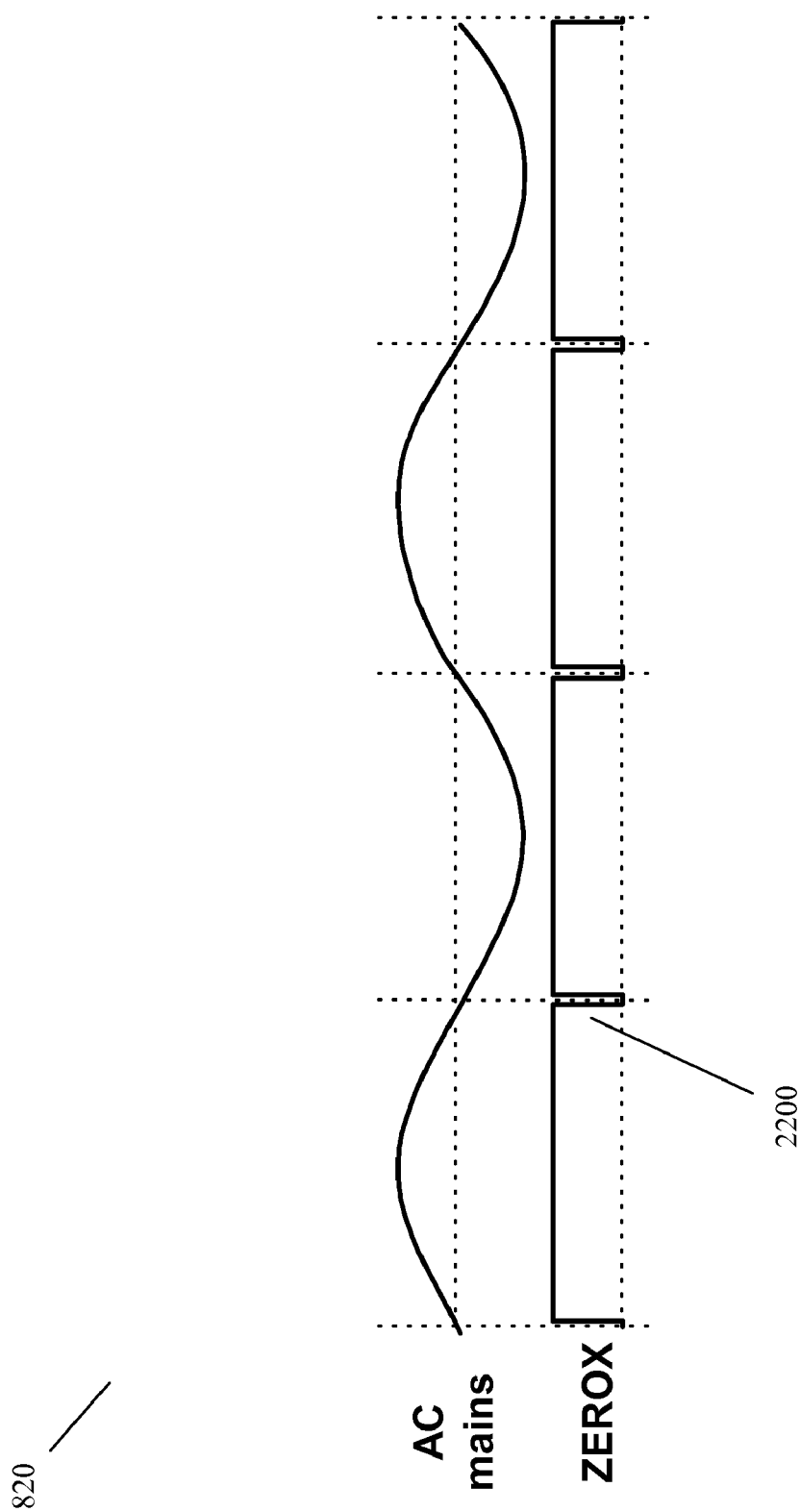
FIG. 22 shows the timing of a zero cross detect output.
Figure 23:
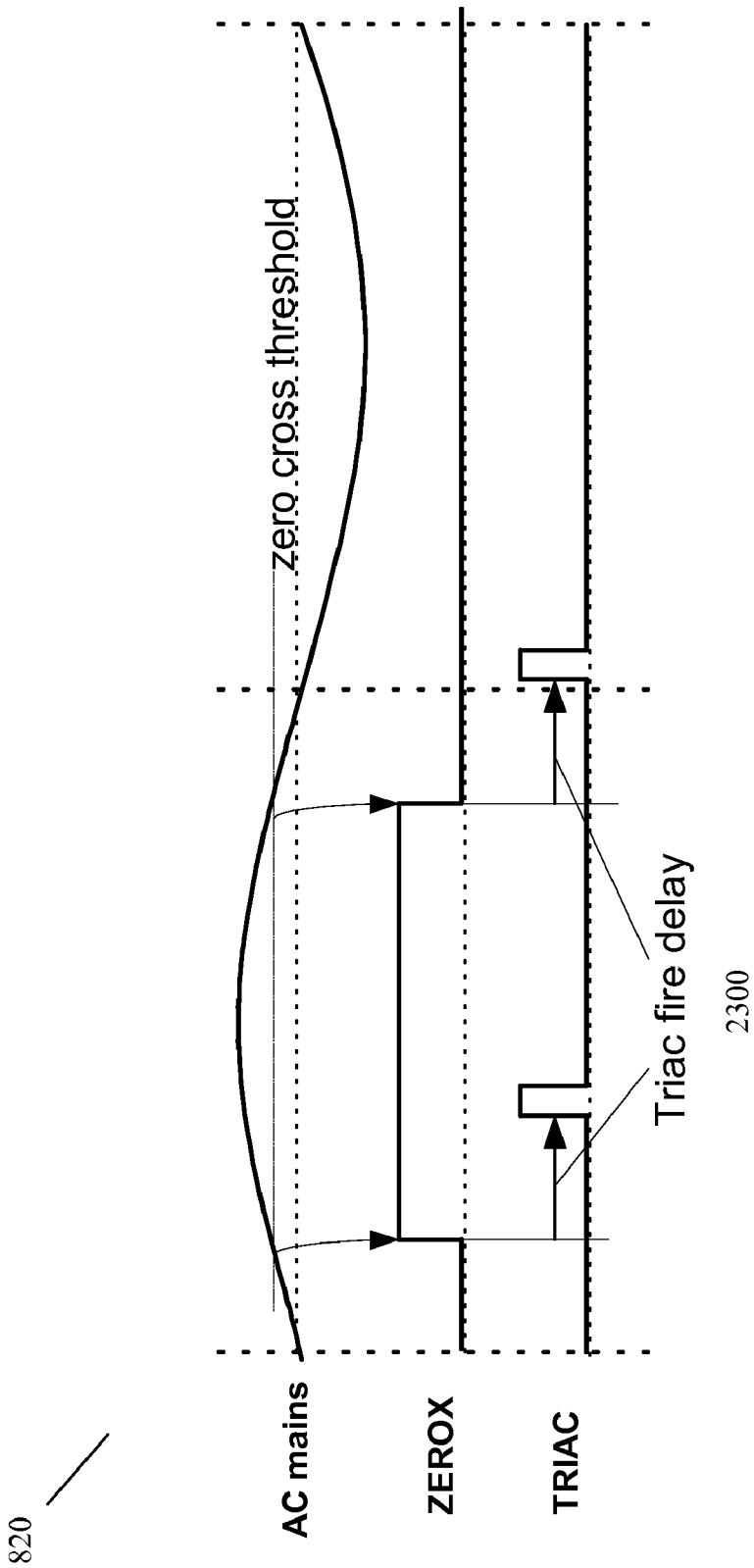
FIG. 23 shows Triac fire delay from zero cross detect.
Figure 24:
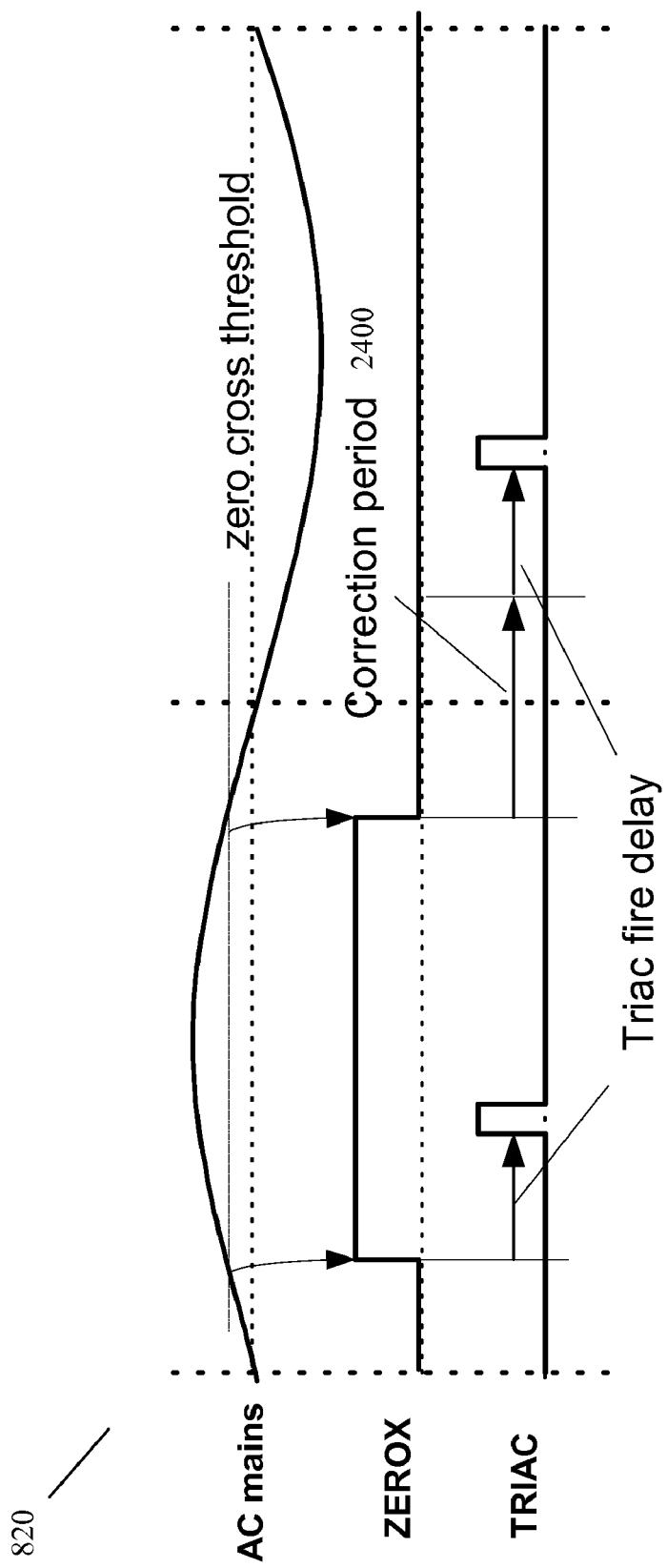
FIG. 24 shows Triac fire delay of FIG. 23 with a correction period.

This implementation may have a Triac Controller 820, which uses phase control for power regulation of resistive loads 1800 and to some degree non-resistive loads. FIG. 18 shows a simplified application circuit. The phase control method may conduct power during a specific time period in each half of the AC power cycle. FIG. 19 shows typical Triac waveforms. A Triac is commonly used to switch on and off the power to the load in the AC power system application. A gate voltage 1900 may be required to turn on the Triac (fire pulse). Once "on", the Triac may stay "on" until the AC sine wave reaches zero 1902 current regardless of the gate voltage. The power regulation is performed by controlling the fire angle (turn on start time). The Triac may deliver the power to the load after the fire angle and turn off at the zero-crossing point. The fire pulse must be of a certain duration in order to 1) provide sufficient charge for the Triac to turn on and 2) ensure that is does not subsequently switch off due to potential noise. The duration of the fire pulse may be programmed in SW. The zero cross detection may be disturbed by noise 2000 on the AC line. In case this noise is strong enough it could worst case cause additional triggering 2002 on the ZEROX as shown in FIG. 20. In order to avoid these extra zero crossing triggers a noise mask 2100 has been implemented in the Triac Controller. The mask masks out zero crossings from the true zero cross until a period before the next true zero cross, as shown in FIG. 21. The zero cross detector may either be programmed to use both the rising edge and the falling edge of the zero cross signal 1900 (like the ZEROX signal in FIG. 19) or it may be programmed to only use the rising edge of the zero cross signal 2200 (like the ZEROX signal in FIG. 22). The Triac Controller may be programmed to generate an interrupt request to the MCU whenever it detects a zero cross. When detecting zero crosses on both rising and falling edges then the detection moments may be offset 2300 due to the threshold level of the ZEROX input, as shown in FIG. 23. Because of this offset the Triac fire pulse may not be fired at the same distance from the beginning of the positive period and from the beginning of the negative period. It means that the AC load, which the Triac controls, may have a DC voltage different from 0V. To make this DC voltage negligible, the Triac Controller may be programmed with a variable correction 2400 period to correct for the offset, as shown in FIG. 24.

In order to control a Triac, two signals are important. The ZEROX signal, which reflects the zero crossing of the mains signal, and the TRIAC signal, which is used to fire the Triac. The ZEROX signal is used to generate a fire pulse (TRIAC signal) for every half period, that is, both the rising edge and the falling edge are used as time base for generating the fire pulse. The zero-cross detection logic isn't toggling exactly on the zero crossing because of the threshold level of the input buffer of the ZEROX pin. Therefore the fire pulse in the "negative" half period will be slightly earlier than the fire pulse in the "positive" half period. This difference generates an unwanted DC current in the connected appliance. To correct for this difference; a programming register, TRICOR, can be used to skew the time for the generation of the fire pulse in the negative half period, thus removing the difference and avoid DC in the controlled load. A benefit of this Triac control functionality is avoiding DC in the controlled load (specifically a problem for inductive loads).

Figure 25:
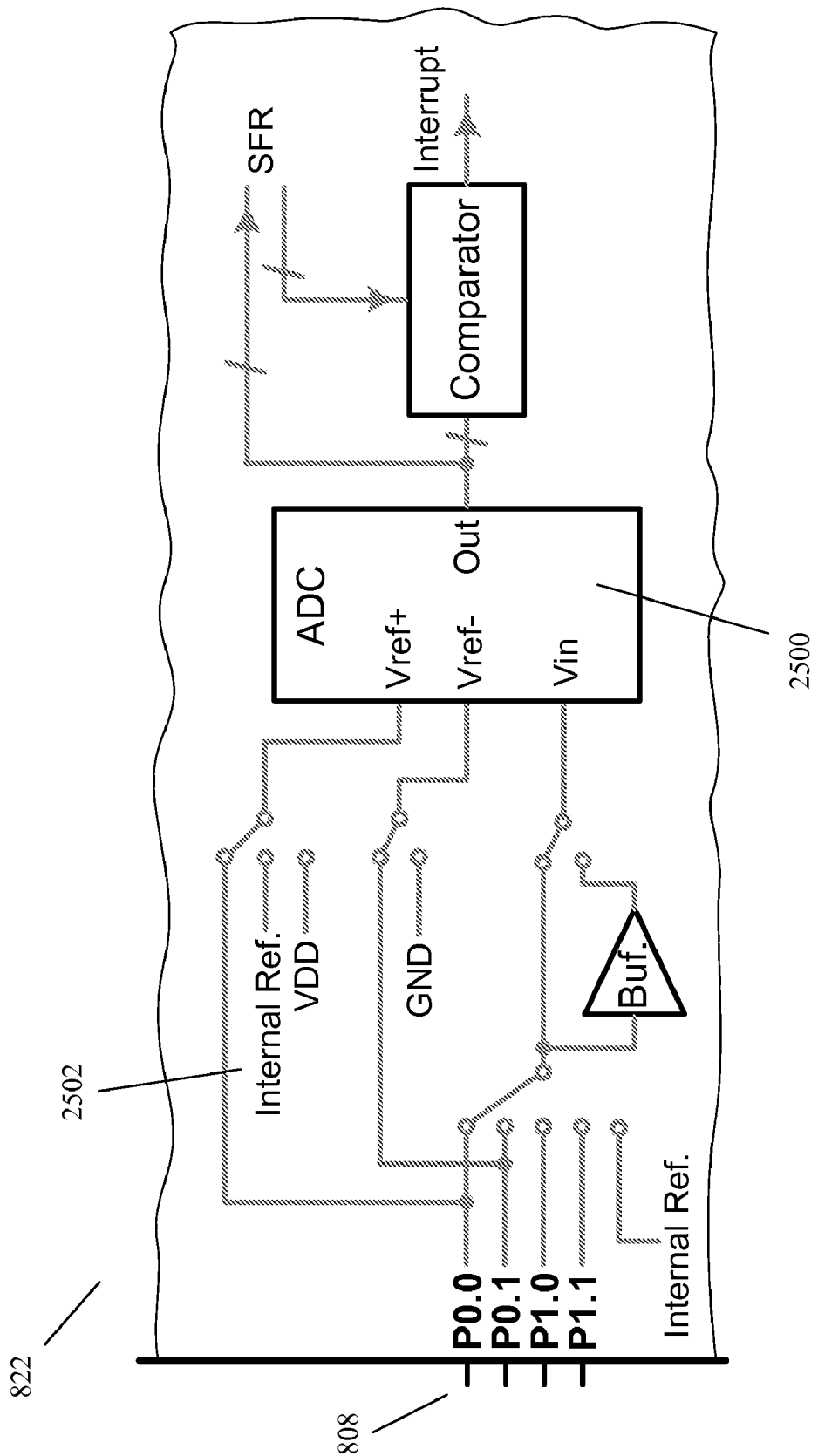
FIG. 25 illustrates an overview of the internal ADC block.

External interfaces are required for the ADC 822. ADC 822 may be a versatile rail-to-rail converter, which may operate in high-resolution 12-bit mode or a fast 8-bit mode. The ADC may be connected to the external circuit using GPIO 808 pins. The ADC may sample an analogue signal on any of the pins. The ADC is able to perform single conversion or continuous multi conversion. The ADC block may be programmed to generate an interrupt to the 8051 W when a certain high or low threshold is exceeded. FIG. 25 gives an overview of the internal ADC block. The ADC may also be used for monitoring the supply level. In this set-up the Internal Reference 2502 is measured with reference to the supply level. The ADC input signal may be loaded by an internal sampling capacitor. In 8-bit mode the sampling time may be configured to fit the source impedance and frequency contents of the input signal. Alternatively an internal buffer may be switched in between the external source and the ADC to reduce capacitive loading of the input.

Figure 26:
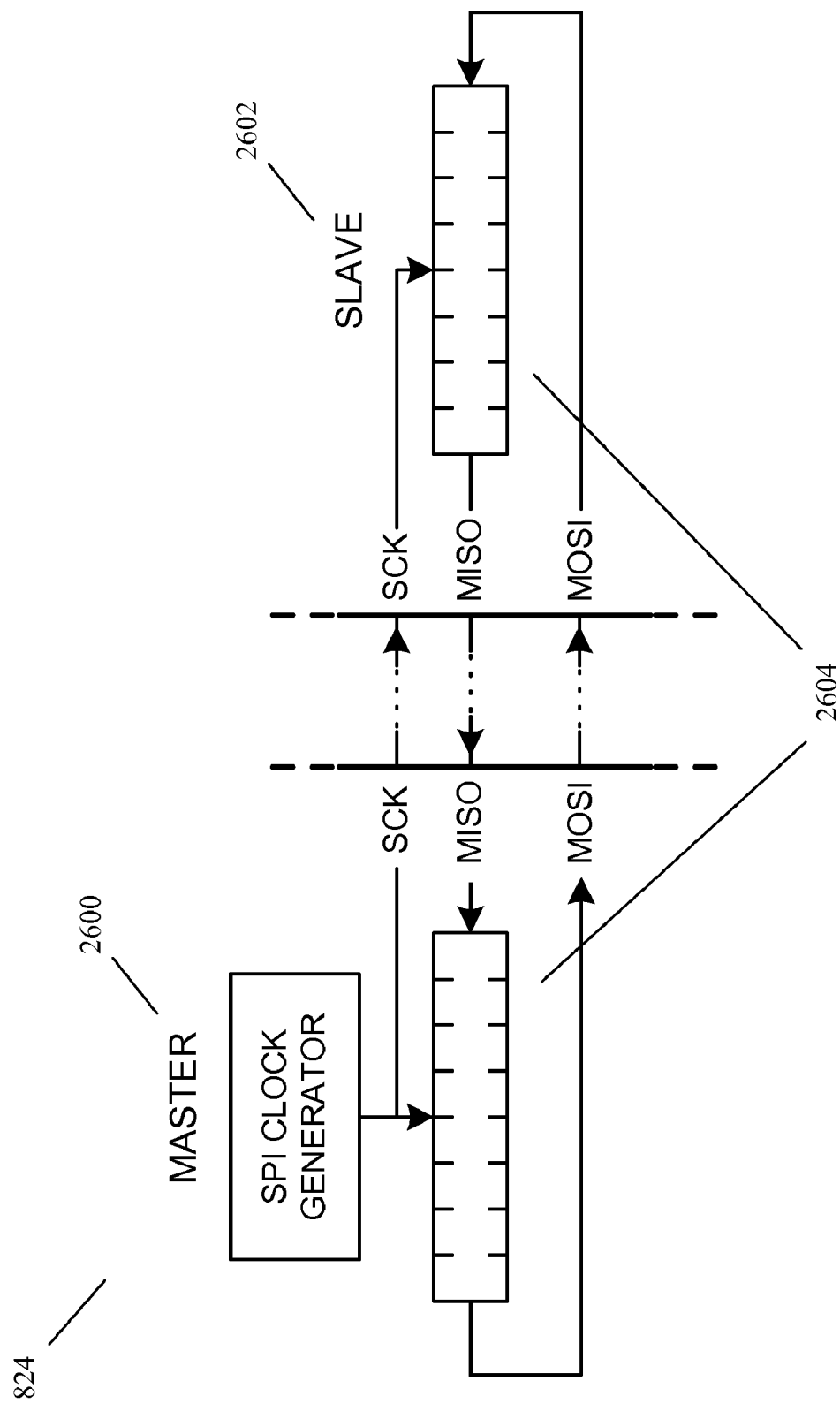
FIG. 26 shows two registers connected as one distributed shift register.
Figure 27:
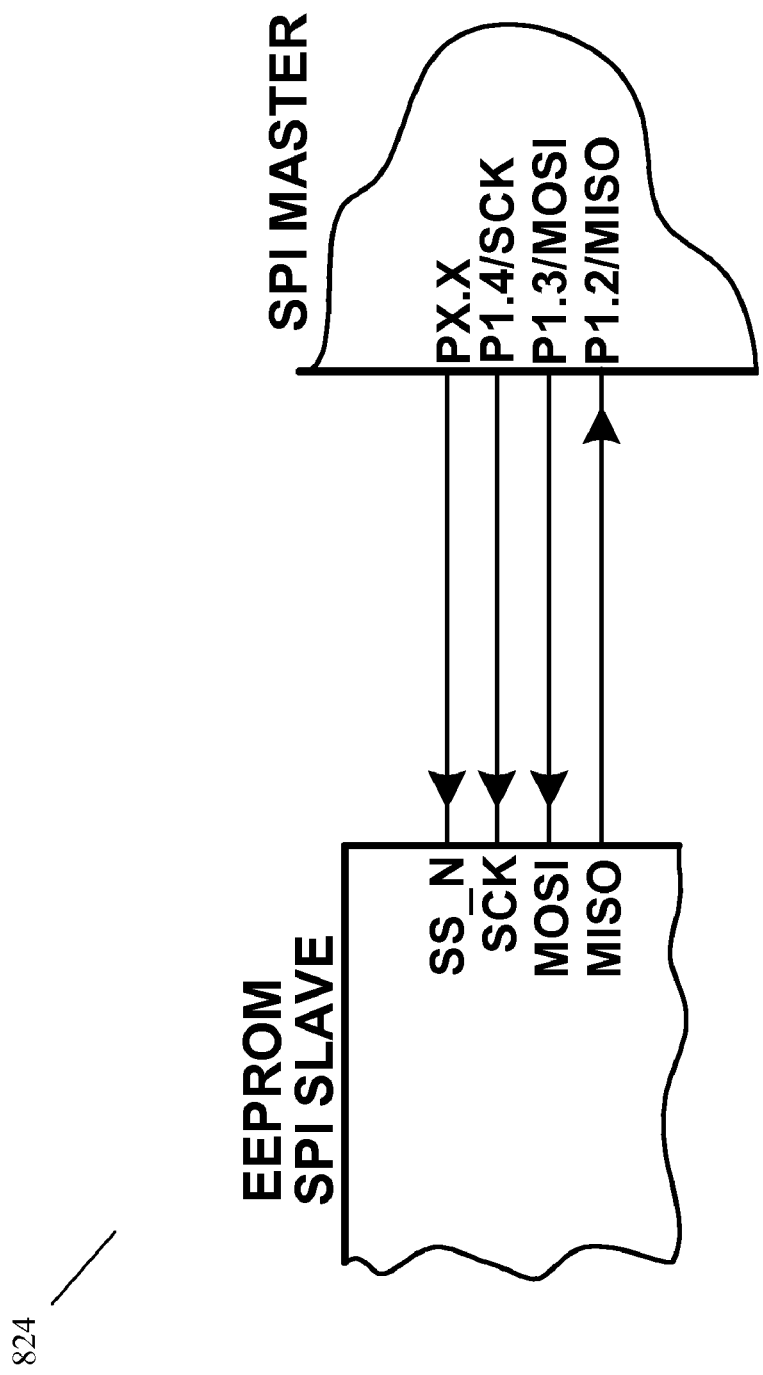
FIG. 27 shows a typical interface application of an EEPROM.

SPI 824 may be used for synchronous data transfer between the single chip 100 device and an external memory, used by some node types, or between a programming unit and the device. The SPI may not be available to the external application. Mater mode 2600 is activated when interfacing to an external EEPROM and slave 2602 during programming mode. The programming mode may be enabled by setting Reset low for an extended period. The SCK may be the clock output in master mode and is the clock input in slave mode. During data transmission the SCK may clock the data from a slave register into a master register. At the same time data may be clocked in the opposite direction from master to the slave connection. Consequently the two registers 2604 may be considered as one distributed circular shift register as illustrated in FIG. 26. After 8 clock cycles the two registers will have swapped contents. FIG. 27 shows a typical interface application to an EEPROM.

Figure 28:
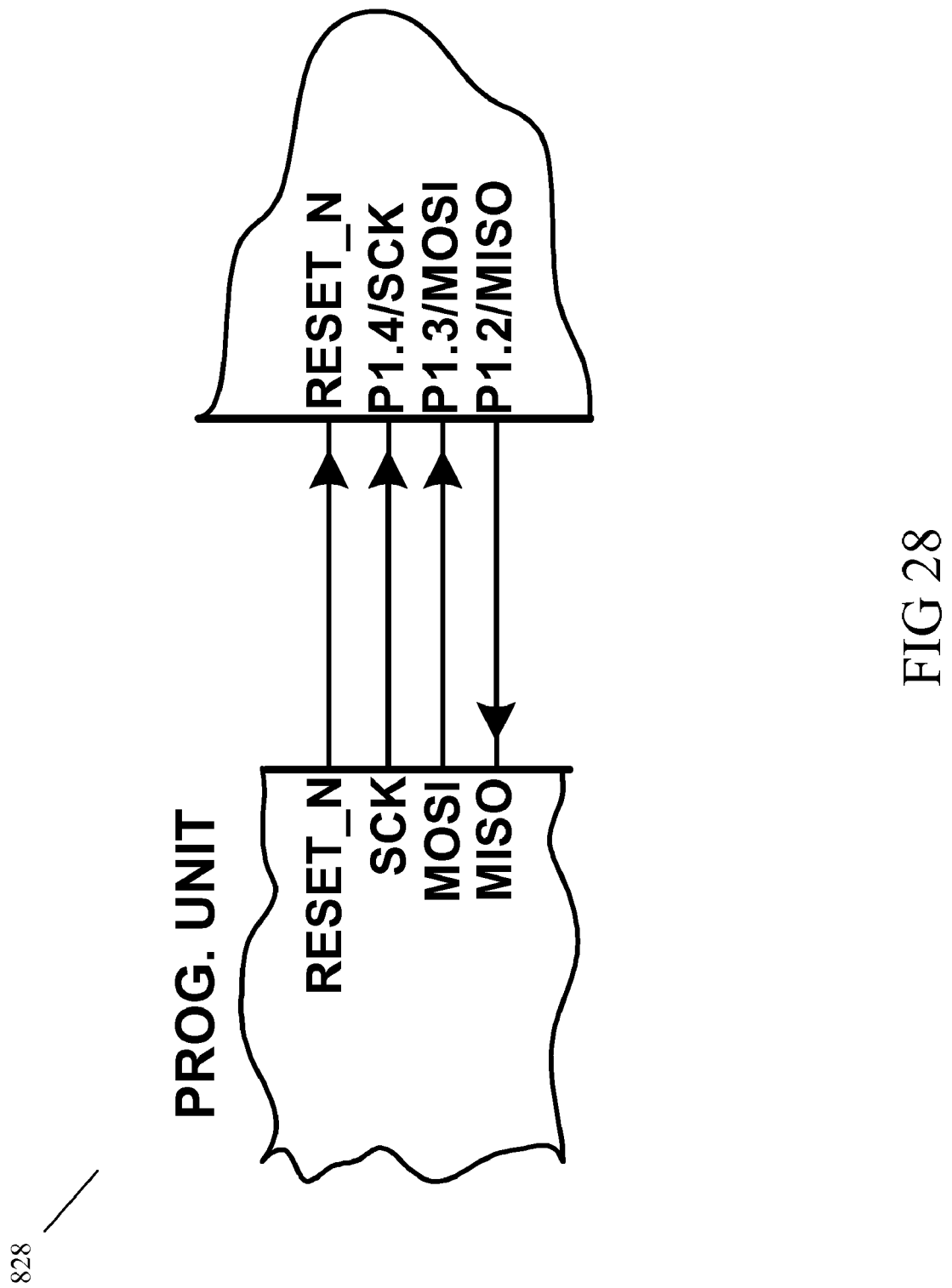
FIG. 28 illustrates a simplified block diagram of a typical interface to programming equipment.

An embodiment may contain a function for programming external memory, such as external Flash memory. In flash programming mode an external master may control the SPI bus, causing node 100 to act as slave. In programming mode the flash may be erased, read, and/or written. Moreover it is possible to read a signature byte identifying the chip, enable/disable read/write protection, and/or read/write the Home ID. Flash programming mode may be entered by setting and keeping the Reset pin low. When the Reset has been held low for two XTAL periods then the SPI may accept a Programming Enable command. The chip may not enter programming mode until the two first bytes of the Programming Enable has been accepted. After the chip has entered programming mode the device may stay in programming mode as long as the Reset pin is held. When the Reset pin is set high the chip may generate an internal master reset pulse and normal program execution may start up. The watchdog function may be disabled as long as the chip is in programming mode and all other GPIO's 808 than the SPI 824 interface may be tri-stated. FIG. 28 gives a simplified block diagram of a typical interface to programming equipment.

While the invention has been disclosed in connection with certain preferred embodiments, other embodiments will be recognized by those of ordinary skill in the art, and all such variations, modifications, and substitutions are intended to fall within the scope of this disclosure. Thus, the invention is to be understood with reference to the following claims, which are to be interpreted in the broadest sense allowable by law. All documents referenced herein are hereby incorporated by reference.

What is claimed is:

1. A method comprising:
providing a primary controller in a mesh network to instruct a static update controller to enable node information server functionality to form a static update controller information server, wherein
the static update controller holds a copy of a network topology and changes to a network,
the primary controller optionally sends updated node information to the static update controller when at least one of a node is added to the network, a node is deleted from the network, and a routing change occurs in the network,
the updated node information is sent to the static update controller as a result of an automatic detection of a change in the topology of the network, including at least one of a user adding, deleting, and relocating a node within the mesh network, and
the user enables the automatic detection only through at least one of the relocation of the node, the powering up of the node, and the powering down of the node, wherein the primary controller further functions as a first inclusion controller.

2. The method of claim 1, wherein the information server is a server communicating identification information.

3. The method of claim 1, wherein the information server is a server communicating installation information.

4. The method of claim 1, further comprising associating a second inclusion controller with the static update controller information server.

5. The method of claim 1, wherein the information server is associated with network command protocols.

6. A method comprising:
providing a static update controller in a mesh network with an enabled node information server functionality to form a static update controller information server; and
using the static update controller information server to enable inclusion controllers in the mesh network to command nodes in the mesh network on behalf of the static update controller information server, wherein
the static update controller information server holds a copy of a network topology and changes to a network,
one of the inclusion controllers sends updated node information to the static update controller information server when at least one of a node is added to the network, a node is deleted from the network, and a routing change occurs in the network,
the static update controller information server transmits a free node ID in response to a request from the one of the inclusion controllers,
the updated node information is sent to the static update controller as a result of an automatic detection of a change in the topology of the network, including at least one of a user adding, deleting, and relocating a node within the mesh network, and
the user enables the automatic detection only through at least one of the relocation of the node, the powering up of the node, and the powering down of the node.

7. The method of claim 6, wherein the information server is a server communicating identification information.

8. The method of claim 6, wherein the command relates to including a node in the mesh network.

9. The method of claim 6, wherein the command relates to excluding a node in the mesh network.

10. The method of claim 6, wherein the information server is associated with network command protocols.

11. A method comprising:
using a static update controller information server to distribute an installation process to a plurality of controllers in a mesh network;
providing an installation assignment to a first controller in a mesh network to install new nodes in the mesh network; and
enabling the installation assignment to be transferred from the first controller to a second controller, wherein
the static update controller information server holds a copy of a network topology and changes to a network,
one of the plurality of controllers sends updated node information to the static update controller information server when at least one of a node is added to the network, a node is deleted from the network, and a routing change occurs in the network,
the static update controller information server transmits a free node ID in response to a request from the one of the one of the plurality of controllers,
the updated node information is sent to the static update controller as a result of an automatic detection of a change in the topology of the network, including at least one of a user adding, deleting, and relocating a node within the mesh network, and
the user enables the automatic detection only through at least one of the relocation of the node, the powering up of the node, and the powering down of the node.

12. The method of claim 11, further comprising associating at least one inclusion controller with the static update controller information server.

13. The method of claim 11, wherein the plurality of controllers includes a static controller.

14. The method of claim 11, wherein the installation assignment can be transferred from one node to another during the lifetime of the network.

15. A method comprising:
associating a static update controller with an inclusion controller within a mesh network;
associating the inclusion controller with a node slave within the mesh network;
transmitting a first data between the static update controller and the inclusion controller, wherein the first data relates at least in part to the node slave; and
transmitting a second data between the inclusion controller and the node slave, wherein the second data relates at least in part to the first data transmitted, wherein
the static update controller holds a copy of a network topology and changes to a network,
the inclusion controller sends updated node information to the static update controller when at least one of a node is added to the network, a node is deleted from the network, and a routing change occurs in the network,
the updated node information is sent to the static update controller as a result of an automatic detection of a change in the topology of the network, including at least one of a user adding, deleting, and relocating a node within the mesh network, and
the user enables the automatic detection only through at least one of the relocation of the node, the powering up of the node, and the powering down of the node.

16. The method of claim 15, wherein the first data is a topology update.

17. The method of claim 15, wherein the first data is related to adding a new node to a mesh network.

18. A system comprising:
a providing facility adapted to provide a static update controller in a mesh network with an enabled node information server functionality to form a static update controller information server; and
a usage facility adapted to use the static update controller information server to enable other controllers in the mesh network to command other nodes in the mesh network on behalf of the static update controller information server, wherein
the static update controller information server is adapted to hold a copy of a network topology and changes to a network,
one of the other controllers is adapted to send updated node information to the static update controller information server when at least one of a node is added to the network, a node is deleted from the network, and a routing change occurs in the network,
the static update controller information server is adapted to transmit a free node ID in response to a request from the one of the other controllers,
the updated node information is sent to the static update controller as a result of an automatic detection of a change in the topology of the network, including at least one of a user adding, deleting, and relocating a node within the mesh network, and
the user enables the automatic detection only through at least one of the relocation of the node, the powering up of the node, and the powering down of the node.

19. A system comprising:
a usage facility adapted to use a static update controller information server to distribute an installation process to a plurality of controllers in a mesh network;
a providing facility adapted to provide an installation assignment to a first controller in a mesh network to install new nodes in the mesh network; and
an enabling facility adapted to enable the installation assignment to be transferred from the first controller to a second controller, wherein
the static update controller information server is adapted to hold a copy of a network topology and changes to a network,
one of the plurality of controllers is adapted to send updated node information to the static update controller information server when at least one of a node is added to the network, a node is deleted from the network, and a routing change occurs in the network,
the static update controller information server is adapted to transmit a free node ID in response to a request from the one of the plurality of controllers,
the updated node information is sent to the static update controller as a result of an automatic detection of a change in the topology of the network, including at least one of a user adding, deleting, and relocating a node within the mesh network, and
the user enables the automatic detection only through at least one of the
relocation of the node, the powering up of the node, and the powering down of the node.

20. A system comprising:
a first associating facility adapted to associate a static update controller with an inclusion controller within a mesh network;
a second associating facility adapted to associate the inclusion controller with a node slave within the mesh network;
a first transmitting facility adapted to transmit a first data between the static
update controller and the inclusion controller, wherein the first data relates at least in part to the node slave; and
a second transmitting facility adapted to transmit a second data between the inclusion controller and the node slave, wherein the second data relates at least in part to the first data transmitted, wherein
the static update controller is adapted to hold a copy of a topology of the mesh network and changes to the mesh network,
the inclusion controller sends updated node information to the static update controller when at least one of a node is added to the mesh network, a node is deleted from the mesh network, and a routing change occurs in the mesh network,
the updated node information is sent to the static update controller as a result of an automatic detection of a change in the topology of the network, including at least one of a user adding, deleting, and relocating a node within the mesh network, and
the user enables the automatic detection only through at least one of the relocation of the node, the powering up of the node, and the powering down of the node.

* * * * *